(12) United States Patent
Sakurabu et al.

(10) Patent No.: US 12,457,407 B2
(45) Date of Patent: Oct. 28, 2025

(54) IMAGE PROCESSING DEVICE, IMAGING APPARATUS, IMAGE PROCESSING METHOD, AND PROGRAM

(71) Applicant: FUJIFILM Corporation, Tokyo (JP)

(72) Inventors: Hitoshi Sakurabu, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 255 days.

(21) Appl. No.: 18/146,451

(22) Filed: Dec. 26, 2022

(65) Prior Publication Data

US 2023/0127668 A1 Apr. 27, 2023

Related U.S. Application Data

(63) Continuation of application No. PCT/JP2021/021753, filed on Jun. 8, 2021.

(30) Foreign Application Priority Data

Jun. 30, 2020 (JP) .................. 2020-113521

(51) Int. Cl.
*H04N 23/611* (2023.01)
*G06V 10/25* (2022.01)
(Continued)

(52) U.S. Cl.
CPC ........... *H04N 23/611* (2023.01); *G06V 10/25* (2022.01); *G06V 10/26* (2022.01); *G06V 10/44* (2022.01);
(Continued)

(58) Field of Classification Search
CPC ............... H04N 23/611; H04N 23/632; H04N 23/635; H04N 23/675; H04N 23/633;
(Continued)

(56) References Cited

U.S. PATENT DOCUMENTS 10,909,697 B2 2/2021 Oami et al.
10,979,624 B2 4/2021 Liu et al.
(Continued)

FOREIGN PATENT DOCUMENTS

| JP | 2008252713 | * 10/2008 |
|---|---|---|
| JP | 2012253723 | 12/2012 |

(Continued)

OTHER PUBLICATIONS

"Office Action of Japan Counterpart Application", issued on Nov. 28, 2023, with English translation thereof, p. 1-p. 14.
(Continued)

*Primary Examiner* — Albert H Cutler
(74) *Attorney, Agent, or Firm* — JCIPRNET

(57) ABSTRACT

An image processing device includes a processor and a memory connected to or built in the processor. The processor recognizes a subject included in a subject group based on image data obtained by imaging the subject group with an imaging apparatus, displays an image indicated by the image data on a display, and displays a plurality of subject regions, which are included in the image, correspond to a plurality of subjects included in the subject group, and satisfy a predetermined condition, in the image in an aspect that is capable of being identified as one object based on a result of recognizing the subject.

33 Claims, 53 Drawing Sheets

(51) Int. Cl.
  *G06V 10/26* (2022.01)
  *G06V 10/44* (2022.01)
  *G06V 20/52* (2022.01)
  *G06V 40/16* (2022.01)
  *G06V 40/20* (2022.01)
  *H04N 23/63* (2023.01)
  *H04N 23/67* (2023.01)

(52) U.S. Cl.
  CPC ............ *G06V 20/53* (2022.01); *G06V 40/161* (2022.01); *G06V 40/20* (2022.01); *H04N 23/632* (2023.01); *H04N 23/635* (2023.01); *H04N 23/675* (2023.01)

(58) Field of Classification Search
  CPC ........ H04N 23/63; G06V 10/25; G06V 10/26; G06V 10/44; G06V 20/53; G06V 40/161; G06V 40/20; G03B 15/00; G03B 17/18
  See application file for complete search history.

(56) References Cited

U.S. PATENT DOCUMENTS

| | | | |
|---|---|---|---|
| 11,403,771 B2 | 8/2022 | Oami et al. | |
| 2012/0057028 A1* | 3/2012 | Tanaka | H04N 23/61 348/169 |
| 2013/0314562 A1* | 11/2013 | Shibuya | H04N 23/62 348/222.1 |
| 2014/0098996 A1* | 4/2014 | Fujimatsu | G06T 7/254 382/103 |
| 2014/0104313 A1* | 4/2014 | Matsumoto | G06V 40/103 345/632 |
| 2015/0022627 A1 | 1/2015 | Sato et al. | |
| 2015/0070526 A1* | 3/2015 | Kinoshita | H04N 23/80 348/222.1 |
| 2016/0057354 A1* | 2/2016 | Shigemura | G06F 18/24 348/148 |
| 2016/0065832 A1* | 3/2016 | Kim | H04N 13/128 348/207.11 |
| 2017/0148178 A1* | 5/2017 | Oami | G06T 7/292 |
| 2019/0206067 A1 | 7/2019 | Oami et al. | |
| 2021/0303834 A1 | 9/2021 | Ozaki | |

FOREIGN PATENT DOCUMENTS

| | | |
|---|---|---|
| JP | 2014192770 | 10/2014 |
| JP | 2015023512 | 2/2015 |
| JP | 2017531950 | 10/2017 |
| JP | 2018007082 | 1/2018 |
| JP | 2018097380 | 6/2018 |
| JP | 2018163365 | 10/2018 |
| JP | 2019201387 | 11/2019 |
| JP | 2020013220 | 1/2020 |
| JP | 2020078058 | 5/2020 |

OTHER PUBLICATIONS

"International Search Report (Form PCT/ISA/210) of PCT/JP2021/021753," mailed on Sep. 7, 2021, with English translation thereof, pp. 1-7.

"Written Opinion of the International Searching Authority (Form PCT/ISA/237) of PCT/ JP2021/021753," mailed on Sep. 7, 2021, with English translation thereof, pp. 1-12.

* cited by examiner

FIG. 28
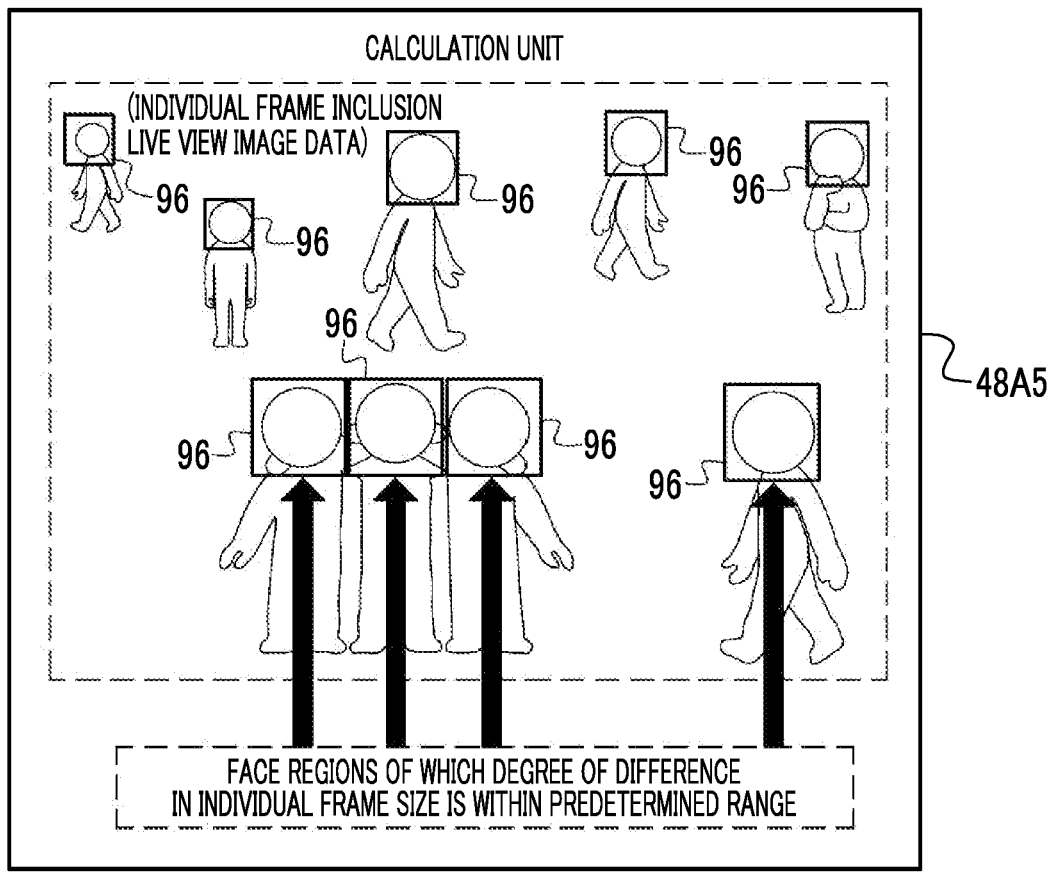
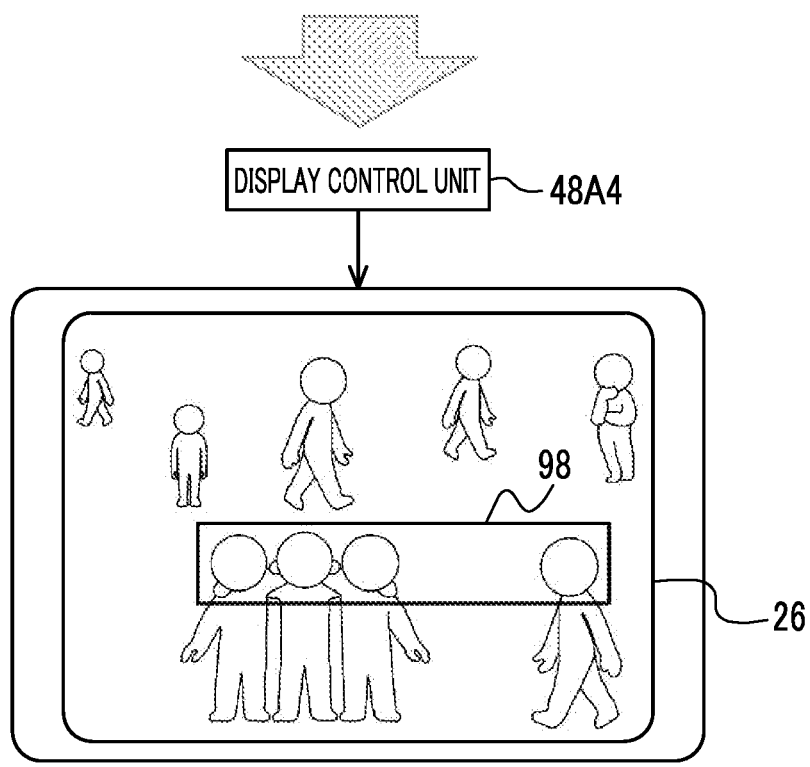

FIG. 31
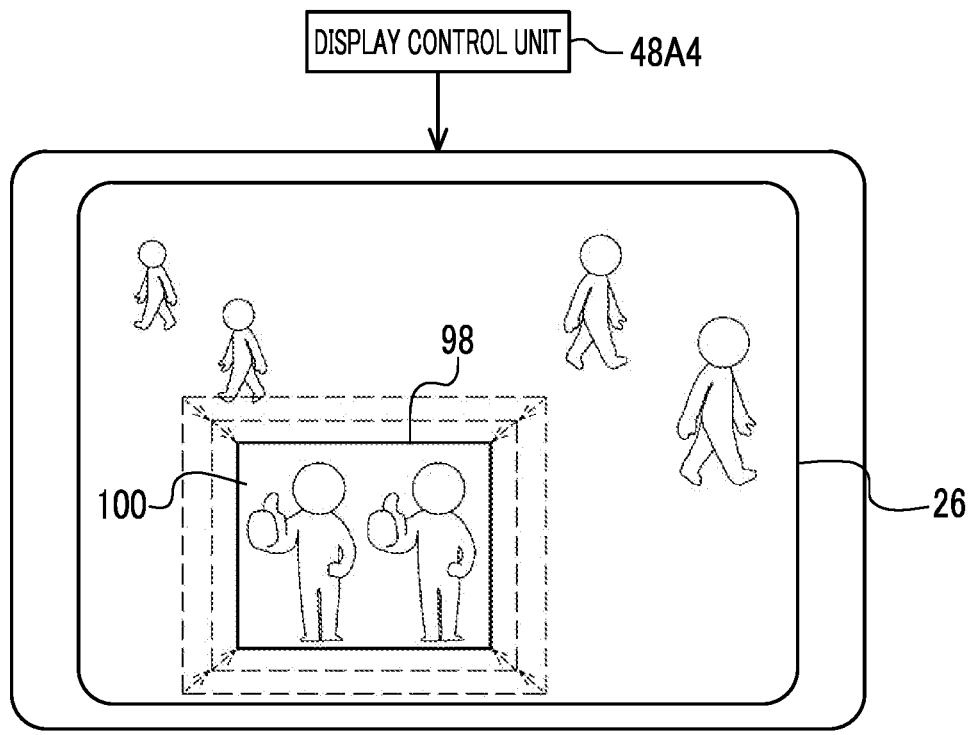
[EXAMPLE OF DYNAMICAL CHANGE FROM OUTSIDE OF OUTER CONTOUR OF GROUPED IMAGED REGION]
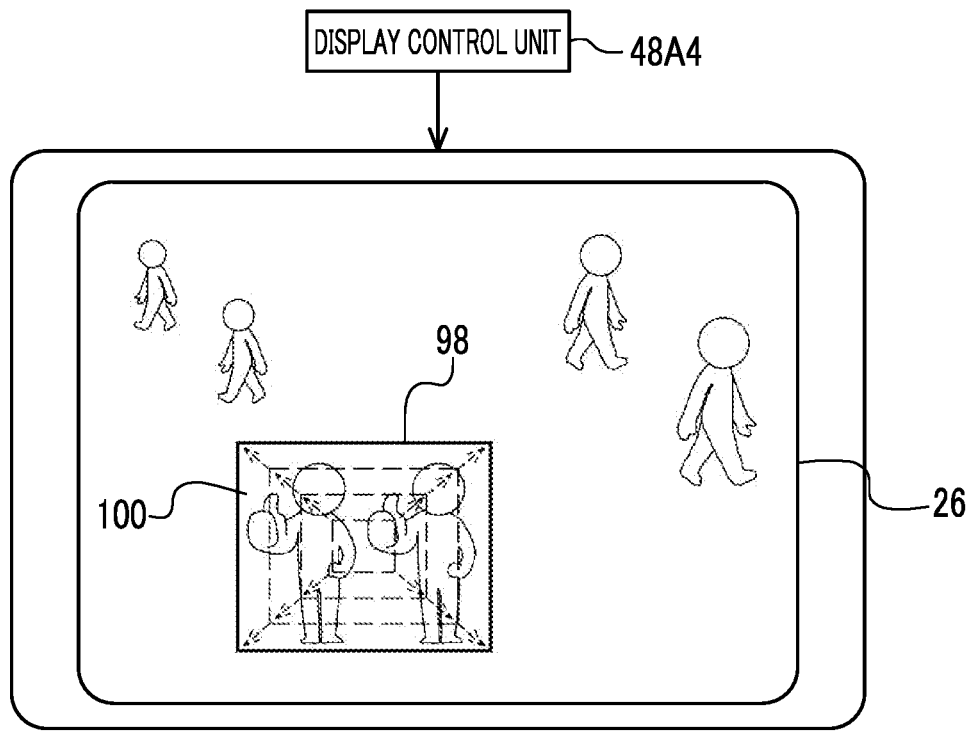
[EXAMPLE OF DYNAMICAL CHANGE FROM INSIDE OF OUTER CONTOUR OF GROUPED IMAGED REGION]

FIG. 35
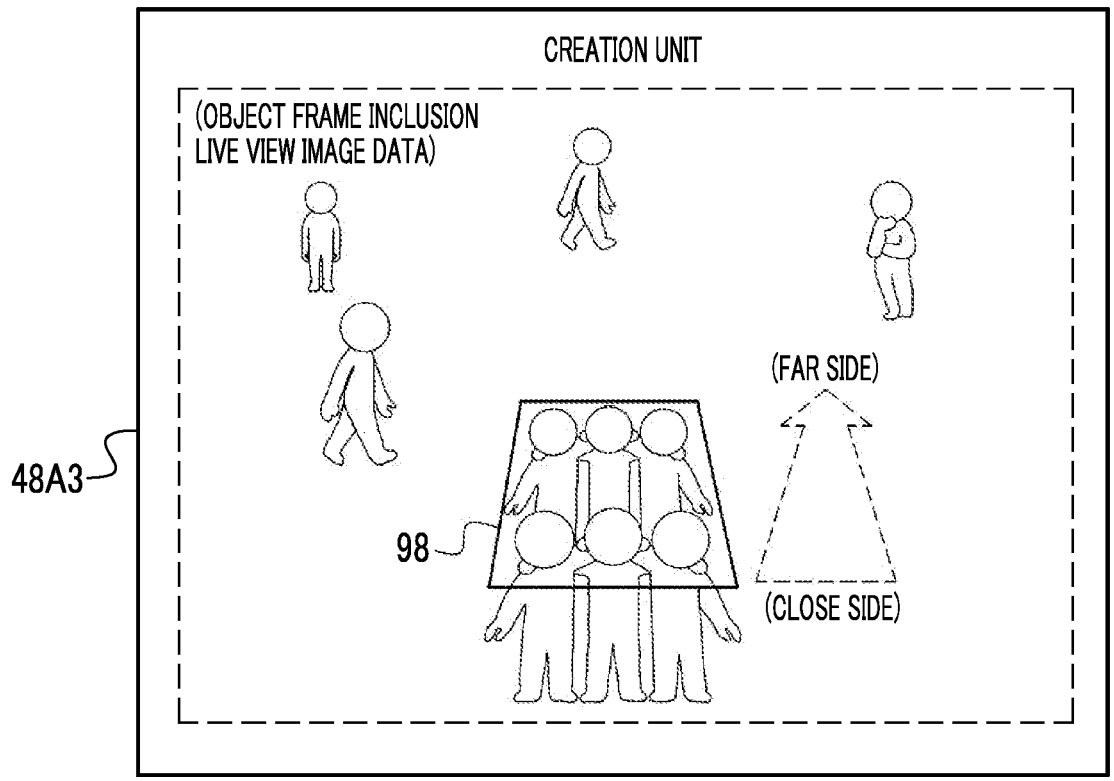
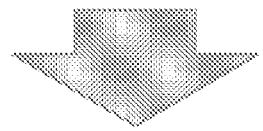
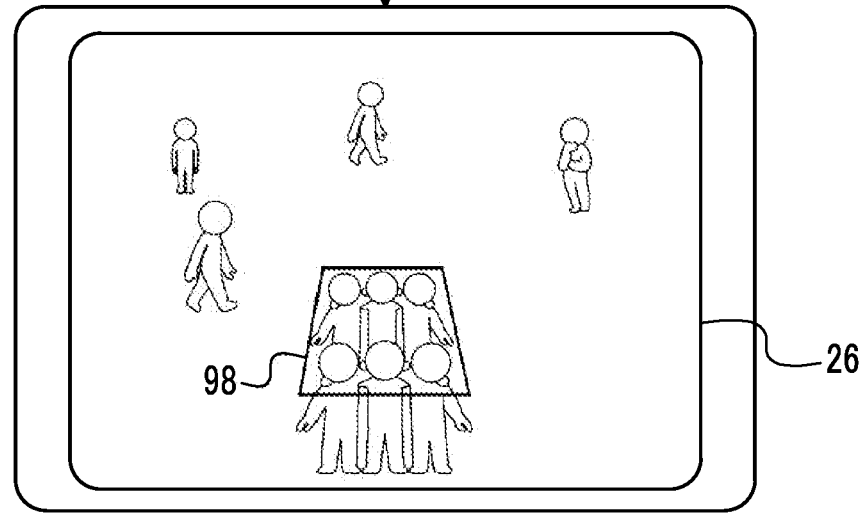

[ INDIVIDUAL FRAME ⇒ FADE-IN DISPLAY & OBJECT FRAME ⇒ FADE-OUT DISPLAY ]

IMAGE PROCESSING DEVICE, IMAGING APPARATUS, IMAGE PROCESSING METHOD, AND PROGRAM

CROSS-REFERENCE TO RELATED APPLICATIONS

This application is a continuation application of International Application No. PCT/JP2021/021753, filed Jun. 8, 2021, the disclosure of which is incorporated herein by reference in its entirety. Further, this application claims priority under 35 USC 119 from Japanese Patent Application No. 2020-113521 filed Jun. 30, 2020, the disclosure of which is incorporated by reference herein.

BACKGROUND

1. Technical Field

The technology of the present disclosure relates to an image processing device, an imaging apparatus, an image processing method, and a program.

2. Related Art

JP2018-097380A discloses an imaging apparatus including a detection unit that detects a subject from an image obtained through a lens unit, a selection unit that selects a main subject from a plurality of subjects detected by the detection unit, a setting unit that sets a plurality of focus detection regions corresponding to the plurality of subjects detected by the detection unit, a focus detection unit that performs focus detection in the plurality of focus detection regions set by the setting unit, and a control unit.

In the imaging apparatus disclosed in JP2018-097380A, in a case in which the main subject is in focus, in a case in which the main subject is selected by the selection unit based on a user instruction to select the main subject, regardless of a difference between a result of focus detection for the focus detection region corresponding to the main subject and a result of focus detection for the focus detection region corresponding to the subject other than the main subject within a predetermined depth of field of the lens unit, the control unit controls focus display for the subject within the predetermined depth of field to be displayed such that a display form of focus display for the main subject is different from a display form of focus display for the subject other than the main subject. In addition, in a case in which the main subject is not selected by the selection unit based on the user instruction to select the main subject, the control unit controls the focus display for the subject including the main subject within the predetermined depth of field to be displayed in the same display form.

JP2018-007082A discloses an image playback device comprising a reading unit that reads an image file including image data and accessory information indicating a focal plane distance, a main subject, and a distance map from an imaging apparatus, a detection unit that analyzes the image data to detect a subject in which a difference between a distance from an imaging element and the focal plane distance is smaller than a predetermined value in accordance with the distance map, a calculation unit that calculates an overlap ratio between a position of the main subject a position of the subject detected by the detection unit, and a display control unit that controls to display an image based on the image data by selectively superimposing a predetermined frame on the position of the subject detected by the detection unit in accordance with the overlap ratio.

SUMMARY

One embodiment according to the technology of the present disclosure provides an image processing device, an imaging apparatus, an image processing method, and a program capable of more easily visually grasping a plurality of specific subjects than in a case in which results of recognizing all the subjects are displayed individually for each of all the subjects.

A first aspect according to the technology of the present disclosure relates to an image processing device comprising a processor, and a memory connected to or built in the processor, in which the processor recognizes a subject included in a subject group based on image data obtained by imaging the subject group with an imaging apparatus, displays an image indicated by the image data on a display, and displays a plurality of subject regions, which are included in the image, correspond to a plurality of subjects included in the subject group, and satisfy a predetermined condition, in the image in an aspect that is capable of being identified as one object based on a result of recognizing the subject.

A second aspect according to the technology of the present disclosure relates to the image processing device according to the first aspect, in which the processor displays a grouped image region, which is obtained by grouping the plurality of subject regions satisfying the predetermined condition, in the image in the aspect that is capable of being identified as the one object.

A third aspect according to the technology of the present disclosure relates to the image processing device according to the second aspect, in which the processor displays the plurality of subject regions in the image in the aspect that is capable of being identified as the one object by displaying a boundary line indicating a boundary of the grouped image region in the image.

A fourth aspect according to the technology of the present disclosure relates to the image processing device according to the third aspect, in which the boundary line is a contour line indicating an outer contour of the grouped image region.

A fifth aspect according to the technology of the present disclosure relates to the image processing device according to the fourth aspect, in which the contour line is an object frame which surrounds the plurality of subject regions.

A sixth aspect according to the technology of the present disclosure relates to the image processing device according to the first aspect, in which the processor displays the plurality of subject regions in the image in the aspect that is capable of being identified as the one object by displaying an object frame, which surrounds the plurality of subject regions satisfying the predetermined condition, in the image.

A seventh aspect according to the technology of the present disclosure relates to the image processing device according to the fifth aspect, in which the processor creates the object frame by dynamically changing a size of a frame from an outside or an inside of the outer contour to the outer contour in the image.

An eighth aspect according to the technology of the present disclosure relates to the image processing device according to any one of the fifth to seventh aspects, in which the processor acquires a distance from the imaging apparatus to each of the plurality of subjects, and changes a display aspect of the object frame in accordance with the distances acquired for the plurality of subjects.

A ninth aspect according to the technology of the present disclosure relates to the image processing device according to the eighth aspect, in which the object frame is a frame having a shape which is narrowed from the subject region on a side on which the distance is shortest among the plurality of subject regions to the subject region on a side on which the distance is longest among the plurality of subject regions in the image.

A tenth aspect according to the technology of the present disclosure relates to the image processing device according to any one of the fifth to ninth aspects, in which the image is a first video, and the processor deforms the object frame in a case in which a first interval between a part of the plurality of subject regions and a remaining subject region is equal to or larger than a first predetermined interval in the first video.

An eleventh aspect according to the technology of the present disclosure relates to the image processing device according to the tenth aspect, in which the processor deforms the object frame in a form in which the part of the subject regions is separated from the object frame on a condition that a state in which the first interval is equal to or larger than the first predetermined interval is maintained for a time equal to or longer than a predetermined time.

A twelfth aspect according to the technology of the present disclosure relates to the image processing device according to any one of the fifth to eleventh aspects, in which the processor displays, in the image, a plurality of individual frames, which individually surround at least the plurality of subject regions satisfying the predetermined condition among a plurality of constituent element image regions indicating a plurality of constituent elements constituting the subject group, and the object frame.

A thirteenth aspect according to the technology of the present disclosure relates to the image processing device according to the twelfth aspect, in which the processor acquires characteristics of the plurality of constituent elements, and changes display aspects of the plurality of individual frames in accordance with the acquired characteristics.

A fourteenth aspect according to the technology of the present disclosure relates to the image processing device according to the thirteenth aspect, in which the characteristic includes a characteristic including at least one of the number, a size, a type, or a speed of the constituent elements.

A fifteenth aspect according to the technology of the present disclosure relates to the image processing device according to any one of the twelfth to fourteenth aspects, in which, in a case in which an imaging mode of the imaging apparatus is activated, the processor displays the object frame earlier than the individual frame in the image.

A sixteenth aspect according to the technology of the present disclosure relates to the image processing device according to any one of the twelfth to fifteenth aspects, in which the processor selectively performs parallel display processing of displaying the individual frames and the object frame in parallel in the image and selective display processing of selectively displaying the individual frames and the object frame in the image.

A seventeenth aspect according to the technology of the present disclosure relates to the image processing device according to the sixteenth aspect, in which the processor selectively performs the parallel display processing and the selective display processing in accordance with at least one of movement of the plurality of subjects, movement of the imaging apparatus, or a depth of field.

An eighteenth aspect according to the technology of the present disclosure relates to the image processing device according to any one of the first to seventeenth aspects, in which the processor displays the plurality of subject regions in the image in the aspect that is capable of being identified as the one object by displaying the plurality of subject regions using a peaking method.

A nineteenth aspect according to the technology of the present disclosure relates to the image processing device according to any one of the first to seventeenth aspects, in which the processor displays the plurality of subject regions in the image in the aspect that is capable of being identified as the one object by displaying the plurality of subject regions using a segmentation method.

A twentieth aspect according to the technology of the present disclosure relates to the image processing device according to any one of the first to nineteenth aspects, in which the processor extracts a contour line of at least one specific subject region among the plurality of subject regions, and displays the extracted contour line on the image.

A twenty-first aspect according to the technology of the present disclosure relates to the image processing device according to the twentieth aspect, in which the processor changes a display aspect of the contour line in accordance with a distance between a subject indicated by the specific subject region and the imaging apparatus.

A twenty-second aspect according to the technology of the present disclosure relates to the image processing device according to any one of the first to twenty-first aspects, in which the processor displays one of a target subject region designated from among the plurality of subject regions and a subject region other than the target subject region in a more enhanced manner than the other.

A twenty-third aspect according to the technology of the present disclosure relates to the image processing device according to the twentieth or twenty-first aspect, in which the processor acquires positional information indicating a position of the contour line in the image, and stores the positional information in a storage medium.

A twenty-fourth aspect according to the technology of the present disclosure relates to the image processing device according to any one of the first to twenty-third aspects, in which the predetermined condition is a condition including a focusing condition that focusing is performed on the plurality of subjects.

A twenty-fifth aspect according to the technology of the present disclosure relates to the image processing device according to any one of the first to twenty-fourth aspects, in which the predetermined condition is a condition including a subject size condition that a degree of difference in a size between the plurality of subject regions is within a predetermined range.

A twenty-sixth aspect according to the technology of the present disclosure relates to the image processing device according to the twenty-fifth aspect, in which the subject region is a face region indicating a face, and the size is a size of a face frame which surrounds the face region.

A twenty-seventh aspect according to the technology of the present disclosure relates to the image processing device according to the twenty-sixth aspect, in which the predetermined range varies depending on a ratio of the size of the face frame between the plurality of subject regions.

A twenty-eighth aspect according to the technology of the present disclosure relates to the image processing device according to any one of the first to twenty-seventh aspects, in which the predetermined condition is a condition including a subject interval condition that a second interval between the plurality of subjects is smaller than a second predetermined interval.

A twenty-ninth aspect according to the technology of the present disclosure relates to the image processing device according to any one of the first to twenty-eighth aspects, in which the predetermined condition is a condition including a gesture common condition that gestures expressed by the plurality of subject regions are common.

A thirtieth aspect according to the technology of the present disclosure relates to the image processing device according to any one of the first to twenty-ninth aspects, in which the predetermined condition is a condition including a movement direction same condition that movement directions of the plurality of subject regions are the same.

A thirty-first aspect according to the technology of the present disclosure relates to the image processing device according to any one of the first to thirtieth aspects, in which the processor selects whether or not to include the plurality of subject regions in the one object in accordance with a given instruction.

A thirty-second aspect according to the technology of the present disclosure relates to the image processing device according to any one of the first to thirty-first aspects, in which the image is a second video, and the processor executes specific processing in a case in which the predetermined condition is satisfied in a state in which the second video is displayed on the display.

A thirty-third aspect according to the technology of the present disclosure relates to the image processing device according to the thirty-second aspect, in which the predetermined condition is a condition including an individual subject region interval condition that a third interval between a first individual subject region indicating a first individual subject in the subject group and a second individual subject region indicating a second individual subject is within a third predetermined interval in the image, and the processor executes the specific processing in a case in which the individual subject region interval condition is satisfied.

A thirty-fourth aspect according to the technology of the present disclosure relates to the image processing device according to the thirty-third aspect, in which the processor displays, in the second video, a first individual frame which surrounds the first individual subject region and a second individual frame which surrounds the second individual subject region, and in a case in which an area of an overlap region between the first individual frame and the second individual frame is equal to or larger than a predetermined area, the third interval is within the third predetermined interval.

A thirty-fifth aspect according to the technology of the present disclosure relates to an imaging apparatus comprising the image processing device according to any one of the first to thirty-fourth aspects, and an image sensor that images an imaging region including the subject group.

A thirty-sixth aspect according to the technology of the present disclosure relates to the imaging apparatus according to the thirty-fifth aspect, further comprising an imaging optical system that includes a focus lens which is movable in an optical axis direction, in which the processor performs focusing on the plurality of subjects by moving the focus lens in the optical axis direction.

A thirty-seventh aspect according to the technology of the present disclosure relates to the imaging apparatus according to the thirty-sixth aspect, in which the predetermined condition is a condition including a close-side focusing condition that the focusing is performed on a close side with respect to a predetermined depth of field.

A thirty-eighth aspect according to the technology of the present disclosure relates to an image processing method comprising recognizing a subject included in a subject group based on image data obtained by imaging the subject group with an imaging apparatus, displaying an image indicated by the image data on a display, and displaying a plurality of subject regions, which are included in the image, correspond to a plurality of subjects included in the subject group, and satisfy a predetermined condition, in the image in an aspect that is capable of being identified as one object based on a result of recognizing the subject.

A thirty-ninth aspect according to the technology of the present disclosure relates to a program causing a computer to execute a process comprising recognizing a subject included in a subject group based on image data obtained by imaging the subject group with an imaging apparatus, displaying an image indicated by the image data on a display, and displaying a plurality of subject regions, which are included in the image, correspond to a plurality of subjects included in the subject group, and satisfy a predetermined condition, in the image in an aspect that is capable of being identified as one object based on a result of recognizing the subject.

BRIEF DESCRIPTION OF THE DRAWINGS

Exemplary embodiments of the technology of the disclosure will be described in detail based on the following figures, wherein:

FIG. 28 is a conceptual diagram used for describing a subject size condition;

FIG. 31 is a conceptual diagram showing an example of an aspect in which the object frame is created by dynamically changing a size of a frame from an outside or an inside of an outer contour of a grouped image region to the outer contour of the grouped image region;

FIG. 35 is a conceptual diagram showing an example of an aspect in which the object frame of which a display aspect is changed in accordance with a subject distance acquired for each of the plurality of subjects is displayed on a live view image in a superimposed manner;

DETAILED DESCRIPTION

In the following, an example of an embodiment of an image processing device, an imaging apparatus, an image processing method, and a program according to the technology of the present disclosure will be described with reference to accompanying drawings.

First, the terms used in the following description will be described.

CPU refers to an abbreviation of "Central Processing Unit". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". I/F refers to an abbreviation of "Interface". UI refers to an abbreviation of "User Interface". TOF refers to an abbreviation of "Time of Flight". fps refers to an abbreviation of "frame per second". MF refers to an abbreviation of "Manual Focus". AF refers to an abbreviation of "Auto Focus". CMOS refers to an abbreviation of "Complementary Metal Oxide Semiconductor". CCD refers to an abbreviation of "Charge-Coupled Device". In the following, for convenience of description, a CPU is described as an example of a "processor" according to the technology of the present disclosure. However, the "processor" according to the technology of the present disclosure may be a combination of a plurality of processing devices, such as the CPU and a GPU. In a case in which the combination of the CPU and the GPU is applied as an example of the "processor" according to the technology of the present disclosure, the GPU is operated under the control of the CPU and is responsible for executing the image processing.

In the description of the present specification, "vertical" refers to the verticality in the sense of including an error generally allowed in the technical field to which the technology of the present disclosure belongs, in addition to the exact verticality. In the description of the present specification, "match" refers to the match in the sense of including an error generally allowed in the technical field to which the technology of the present disclosure belongs, in addition to the exact match.

Figure 1:
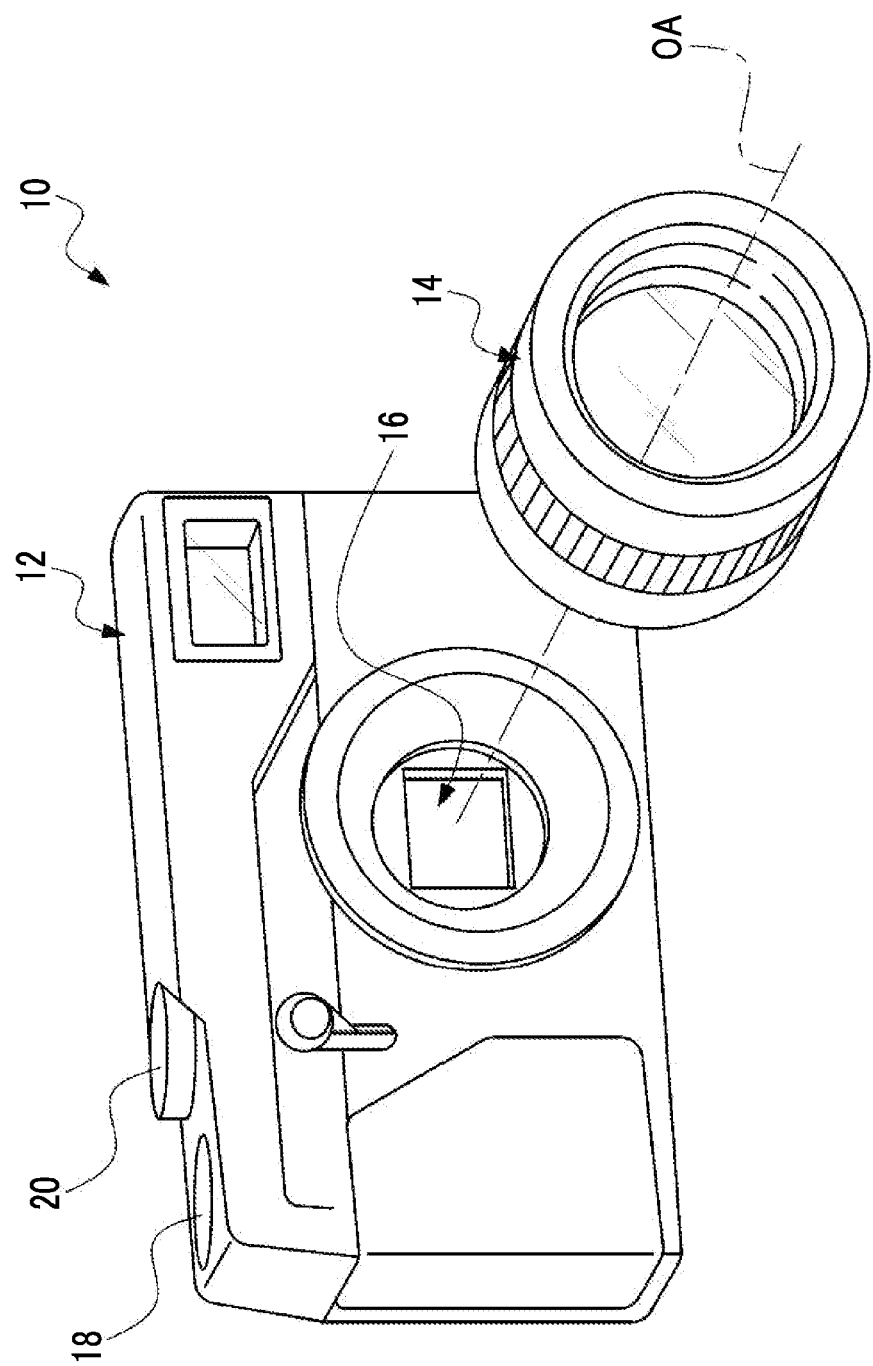
FIG. 1 is a perspective view showing an example of an appearance of an imaging apparatus.

As an example, as shown in FIG. 1, an imaging apparatus 10 is a digital camera having an interchangeable lens and omitting a reflex mirror. The imaging apparatus 10 comprises an imaging apparatus body 12 and an interchangeable lens 14 that is interchangeably mounted on the imaging apparatus body 12. It should be noted that, here, as an example of the imaging apparatus 10, the digital camera having the interchangeable lens and omitting the reflex mirror is described, but the technology of the present disclosure is not limited to this. A digital camera having a stationary lens may be used, a digital camera in which the reflex mirror is not omitted may be used, or a digital camera built in various electronic apparatuses, such as a monitor (for example, a monitor connected to a personal computer or a television receiver), a smart device, a wearable terminal, a cell observation device, an ophthalmologic observation device, and a surgical microscope, may be used. In addition, a digital camera that images a space in which a population density is changed, such as an inside of a vehicle (for example, an inside of a vehicle, such as a train or a bus), a room (for example, a conference room or an event hall), a passage, or a road, may be used.

An image sensor 16 is provided in the imaging apparatus body 12. The image sensor 16 is a CMOS image sensor. The image sensor 16 images an imaging region including a subject group. In a case in which the interchangeable lens 14 is mounted on the imaging apparatus body 12, subject light indicating a subject is transmitted through the interchangeable lens 14 and imaged on the image sensor 16, so that image data indicating the image of the subject is generated by the image sensor 16.

It should be noted that, in the present embodiment, the CMOS image sensor is described as the image sensor 16, but the technology of the present disclosure is not limited to this. For example, the technology of the present disclosure is established even in a case in which the image sensor 16 is another type of image sensor, such as a CCD image sensor.

A release button 18 and a dial 20 are provided on an upper surface of the imaging apparatus body 12. The dial 20 is operated in a case of setting an operation mode of an imaging system, an operation mode of a playback system, and the like, and by operating the dial 20, the imaging apparatus 10 selectively sets an imaging mode and a playback mode as the operation modes.

The release button 18 functions as an imaging preparation instruction unit and an imaging instruction unit, and a push operation of two stages of an imaging preparation instruction state and an imaging instruction state can be detected. For example, the imaging preparation instruction state refers to a state in which the release button 18 is pushed to an intermediate position (half push position) from a standby position, and the imaging instruction state refers to a state in which the release button 18 is pushed to a final push position (full push position) beyond the intermediate position. It should be noted that, in the following, the "state in which release button 18 is pushed to the half push position from the standby position" will be referred to as a "half push state", and the "state in which the release button 18 is pushed to the full push position from the standby position" will be referred to as a "full push state". Depending on the configuration of the imaging apparatus 10, the imaging preparation instruction state may be a state in which a finger of a user is in contact with the release button 18, and the imaging instruction state may be a state in which the finger of the user who performs operation proceeds from the state of being in contact with the release button 18 to a state of being separated from the release button 18.

Figure 2:
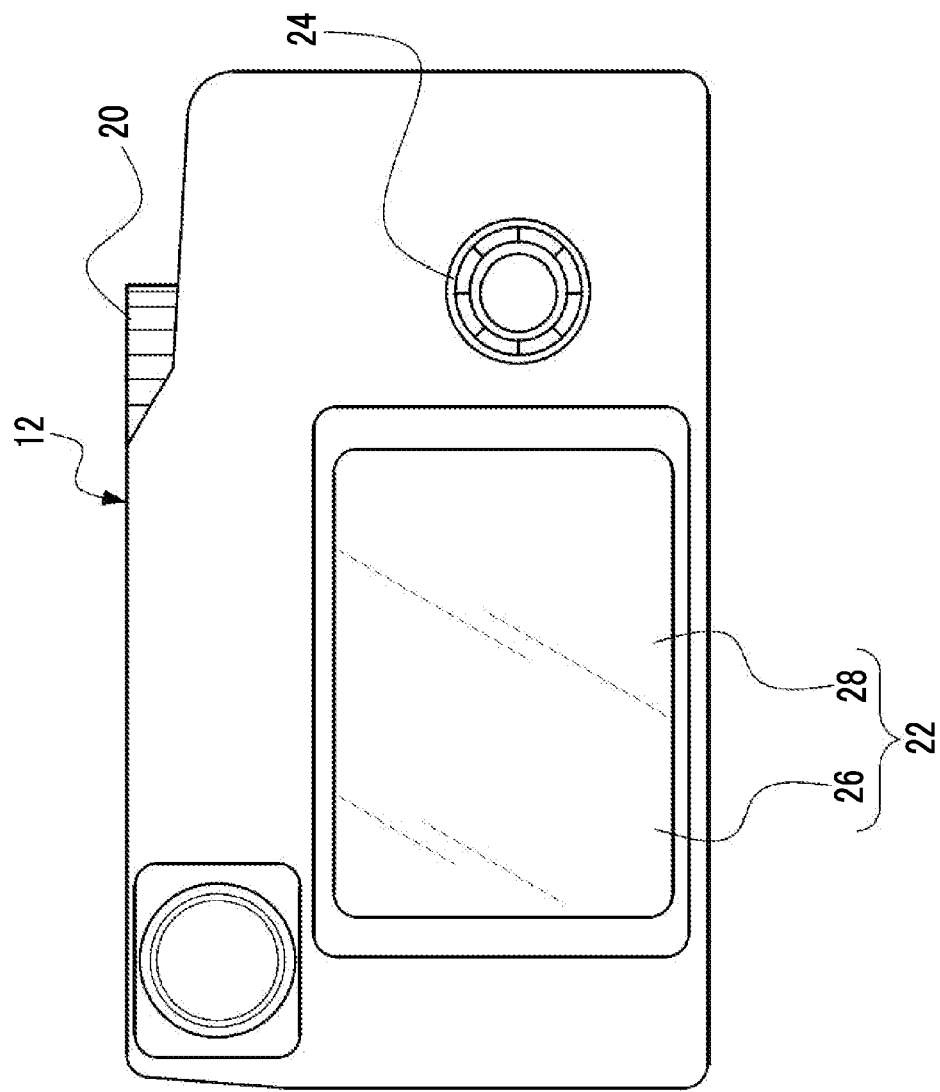
FIG. 2 is a rear view showing an example of an appearance of a rear side of the imaging apparatus shown in FIG. 1.

As an example, as shown in FIG. 2, a touch panel display 22 and an instruction key 24 are provided on a rear surface of the imaging apparatus body 12.

Figure 3:
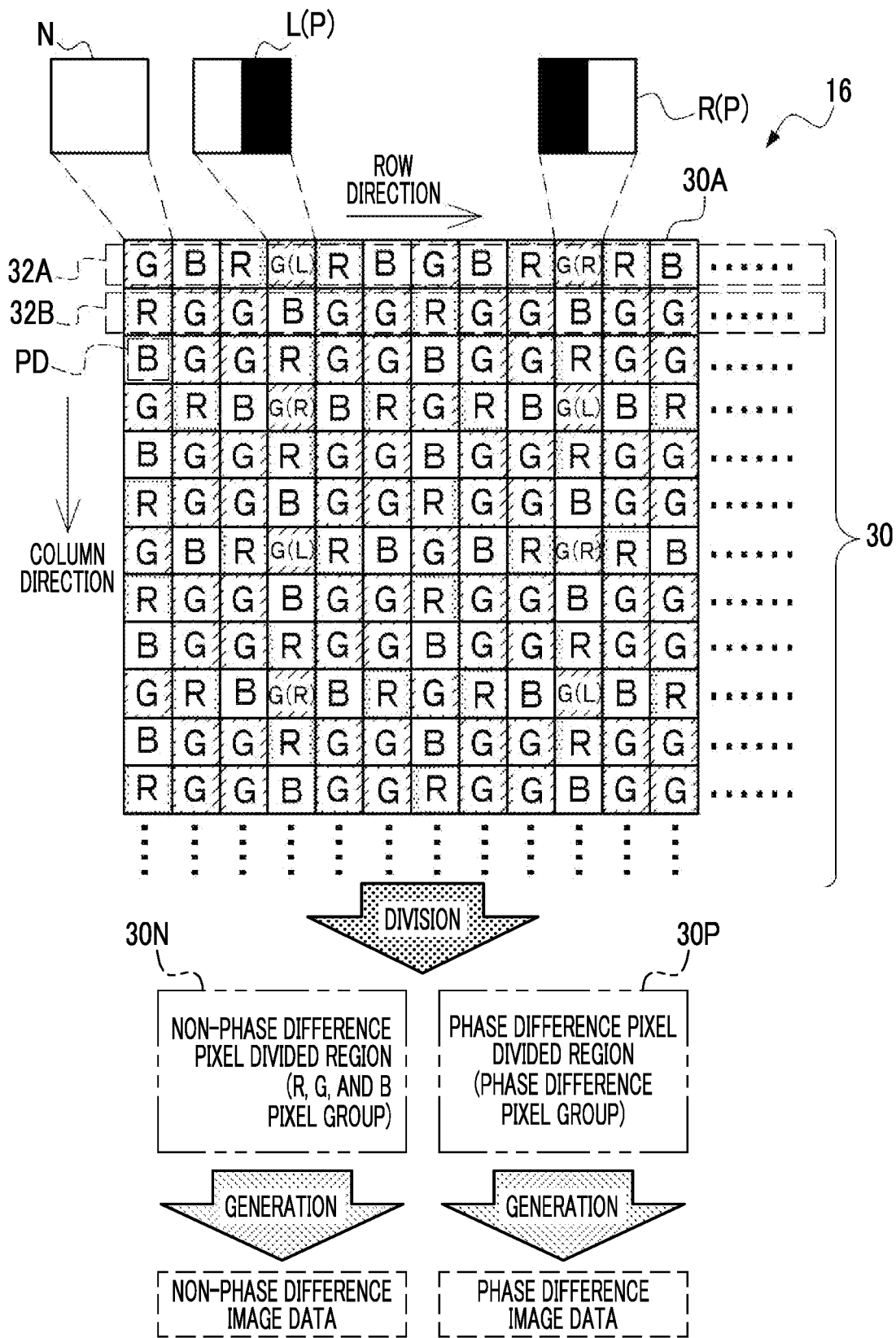
FIG. 3 is a schematic view showing an example of the disposition of pixels included in a photoelectric conversion element of the imaging apparatus.

The touch panel display 22 comprises a display 26 and a touch panel 28 (see also FIG. 3). Examples of the display 26 include an organic EL display. The display 26 may not be the organic EL display, but may be another type of display, such as a liquid crystal display or an inorganic EL display. It should be noted that, although the display 26 is described here, the technology of the present disclosure is not limited to this, and an image (for example, an image obtained by applying the technology of the present disclosure) may be displayed on a separate display instead of the display 26 or together with the display 26.

The display 26 displays an image and/or text information. The display 26 is used for imaging for the live view image, that is, for displaying the live view image obtained by performing the continuous imaging in a case in which the imaging apparatus 10 is in the imaging mode. The imaging for the live view image (hereinafter, also referred to as "imaging for the live view image") is performed in accordance with, for example, a frame rate of 60 fps. 60 fps is merely an example, and a frame rate smaller than 60 fps may be used or a frame rate exceeding 60 fps may be used.

Here, the "live view image" refers to a video for display based on the image data obtained by the imaging performed by the image sensor 16. The live view image is also generally referred to as a live preview image. It should be noted that the live view image is an example of a "first video" and a "second video" according to the technology of the present disclosure.

The display 26 is also used for displaying the still picture obtained by performing the imaging for the still picture in a case in which the instruction for the imaging for the still picture is given to the imaging apparatus 10 via the release button 18. Further, the display 26 is used for displaying a playback image and displaying a menu screen and the like in a case in which the imaging apparatus 10 is in the playback mode.

The touch panel 28 is a transmissive touch panel, and is superimposed on a surface of a display region of the display 26. The touch panel 28 receives an instruction from the user by detecting a contact of an indicator, such as a finger or a stylus pen. It should be noted that, in the present embodiment, the imaging accompanied by main exposure is started by the user turning on a soft key for starting the imaging displayed on the display 26 via the touch panel 28 or by the user touching a region surrounded by an object frame 98 (see FIG. 16) described below via the touch panel 28. It should be noted that, in the following, for convenience of description, the "full push state" described above also includes a state in which the user turns on the soft key for starting the imaging via the touch panel 28 and a state in which the user touches the region surrounded by the object frame 98 (see FIG. 16) described below via the touch panel 28.

It should be noted that, in the present embodiment, examples of the touch panel display 22 include an out-cell type touch panel display in which the touch panel 28 is superimposed on the surface of the display region of the display 26, but this is merely an example. For example, the on-cell type or in-cell type touch panel display can be applied as the touch panel display 22.

The instruction key 24 receives various instructions. Here, the "various instructions" refers to various instructions, for example, an instruction for displaying a menu screen on which various menus can be selected, an instruction for selecting one or a plurality of menus, an instruction for confirming a selected content, an instruction for deleting the selected content, zooming in, zooming out, and frame advance. In addition, these instructions may be given by the touch panel 28.

As an example, as shown in FIG. 3, the image sensor 16 comprises a photoelectric conversion element 30. The photoelectric conversion element 30 has a light-receiving surface 30A. The photoelectric conversion element 30 is disposed in the imaging apparatus body 12 (see FIG. 1) such that the center of the light-receiving surface 30A and an optical axis OA (see FIG. 1) match each other. The photoelectric conversion element 30 has a plurality of photosensitive pixels disposed in a matrix, and the light-receiving surface 30A is formed by the plurality of photosensitive pixels. The photosensitive pixel is a pixel having a photodiode PD, photoelectrically converts the received light, and outputs an electric signal in accordance with a light-receiving amount. The type of the photosensitive pixel included in the photoelectric conversion element 30 is two types of a phase difference pixel P, which is so-called an image plane phase difference pixel, and a non-phase difference pixel N which is a pixel different from the phase difference pixel P.

A color filter is disposed on the photodiode PD. The color filters include a green (G) filter corresponding to a G wavelength range which most contributes to obtaining a brightness signal, a red (R) filter corresponding to an R wavelength range, and a blue (B) filter corresponding to a B wavelength range.

Generally, the non-phase difference pixel N is also referred to as a normal pixel. The photoelectric conversion element 30 has three types of photosensitive pixels of R pixel, G pixel, and B pixel, as the non-phase difference pixel N. The R pixel, the G pixel, the B pixel, and the phase difference pixel P are regularly disposed with a predetermined periodicity in a row direction (for example, a horizontal direction in a state in which a bottom surface of the imaging apparatus body 12 is in contact with a horizontal surface) and a column direction (for example, a vertical direction which is a direction vertical to the horizontal direction). The R pixel is a pixel corresponding to the photodiode PD in which the R filter is disposed, the G pixel and the phase difference pixel P are pixels corresponding to the photodiode PD in which the G filter is disposed, and the B pixel is a pixel corresponding to the photodiode PD in which the B filter is disposed.

A plurality of phase difference pixel lines 32A and a plurality of non-phase difference pixel lines 32B are arranged on the light-receiving surface 30A. The phase difference pixel line 32A is a horizontal line including the phase difference pixels P. Specifically, the phase difference pixel line 32A is the horizontal line in which the phase difference pixels P and the non-phase difference pixels N are mixed. The non-phase difference pixel line 32B is a horizontal line including only a plurality of non-phase difference pixels N.

On the light-receiving surface 30A, the phase difference pixel lines 32A and the non-phase difference pixel lines 32B for a predetermined number of lines are alternately disposed along the column direction. For example, the "predetermined number of lines" used herein refers to two lines. It should be noted that, here, the predetermined number of lines is described as two lines, but the technology of the present disclosure is not limited to this, and the predetermined number of lines may be three or more lines, dozen lines, a few tens of lines, a few hundred lines, and the like.

The phase difference pixel lines 32A are arranged in the column direction by skipping two lines from the first row to the last row. A part of the pixels of the phase difference pixel lines 32A is the phase difference pixel P. Specifically, the phase difference pixel line 32A is a horizontal line in which the phase difference pixels P and the non-phase difference pixels N are periodically arranged. The phase difference pixels P are roughly divided into a first phase difference pixel L and a second phase difference pixel R. In the phase difference pixel lines 32A, the first phase difference pixels L and the second phase difference pixels R are alternately disposed at intervals of several pixels in a line direction as the G pixels.

The first phase difference pixels L and the second phase difference pixels R are disposed to be alternately present in the column direction. In the example shown in FIG. 3, in the fourth column, the first phase difference pixel L, the second phase difference pixel R, the first phase difference pixel L, and the second phase difference pixel R are disposed in this order along the column direction from the first row. That is, the first phase difference pixels L and the second phase difference pixels R are alternately disposed along the column direction from the first row. In addition, in the example shown in FIG. 3, in the tenth column, the second phase difference pixel R, the first phase difference pixel L, the second phase difference pixel R, and the first phase difference pixel L are disposed in this order along the column direction from the first row. That is, the second phase difference pixels R and the first phase difference pixels L are alternately disposed along the column direction from the first row.

The photoelectric conversion element 30 is divided into two regions. That is, the photoelectric conversion element 30 includes a non-phase difference pixel divided region 30N and a phase difference pixel divided region 30P. The phase difference pixel divided region 30P is a phase difference pixel group composed of a plurality of phase difference pixels P, and receives the subject light to generate phase difference image data as the electric signal in accordance with the light-receiving amount. The phase difference image data is used, for example, for distance measurement. The non-phase difference pixel divided region 30N is a non-phase difference pixel group composed of the plurality of non-phase difference pixels N, and receives the subject light to generate non-phase difference image data as the electric signal in accordance with the light-receiving amount. The non-phase difference image data is displayed on the display 26 (see FIG. 2) as, for example, a visible light image.

Figure 4:
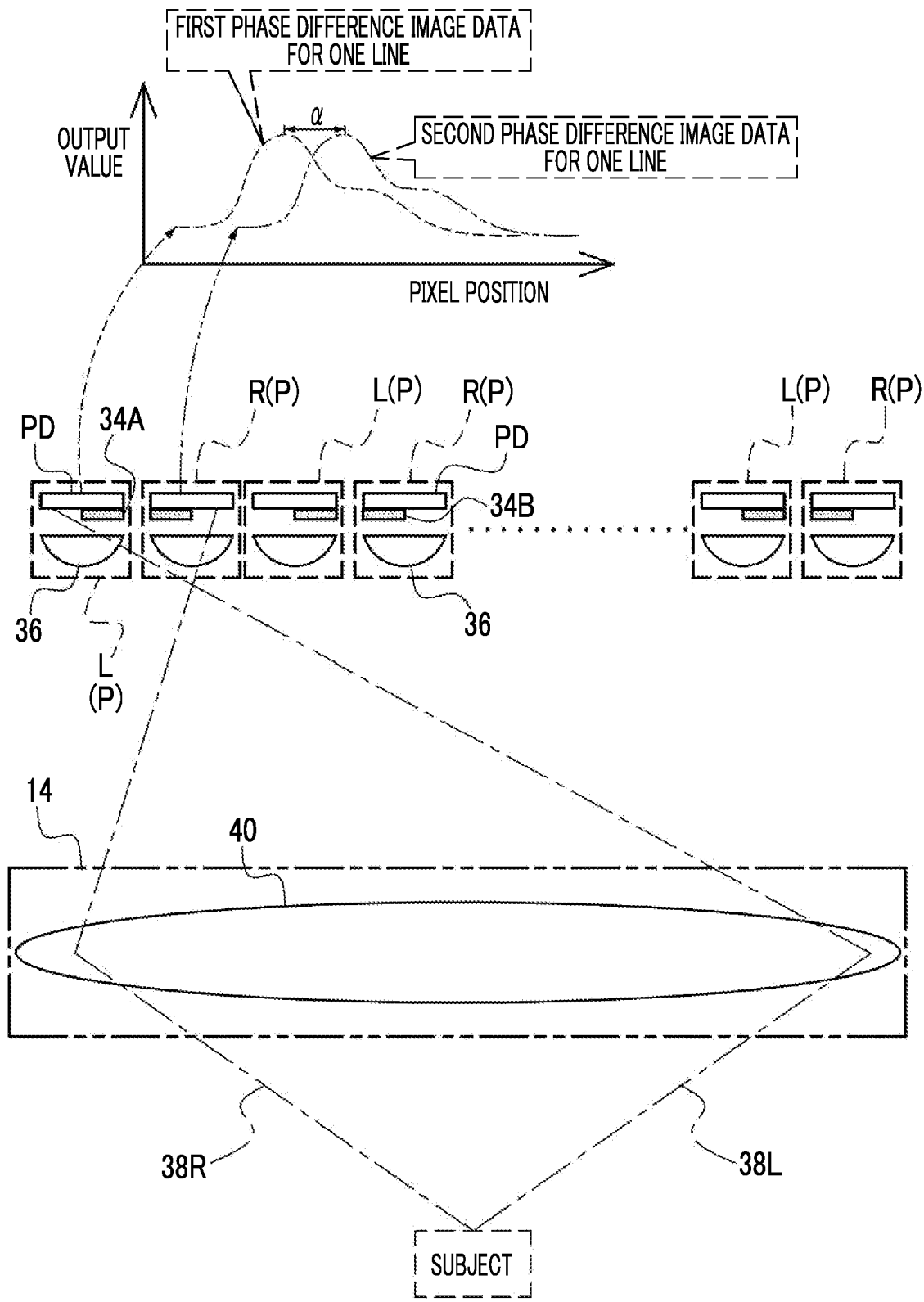
FIG. 4 is a conceptual diagram showing an example of an incidence characteristic of subject light on a first phase difference pixel and a second phase difference pixel included in the photoelectric conversion element shown in FIG. 3.

As an example, as shown in FIG. 4, the first phase difference pixel L comprises a light shielding member 34A, a microlens 36, and the photodiode PD. In the first phase difference pixel L, the light shielding member 34A is disposed between the microlens 36 and the light-receiving surface of the photodiode PD. A left half (left side in a case of facing the subject from the light-receiving surface (in other words, a right side in a case of facing the light-receiving surface from the subject)) of the light-receiving surface of the photodiode PD in the row direction is shielded against the light by the light shielding member 34A.

The second phase difference pixel R comprises a light shielding member 34B, the microlens 36, and the photodiode PD. In the second phase difference pixel R, the light shielding member 34B is disposed between the microlens 36 and the light-receiving surface of the photodiode PD. A right half (right side in a case of facing the subject from the light-receiving surface (in other words, a left side in a case of facing the light-receiving surface from the subject)) of the light-receiving surface of the photodiode PD in the row direction is shielded against the light by the light shielding member 34B. It should be noted that, in the following, for convenience of description, in a case in which the distinction is not needed, the light shielding members 34A and 34B are referred to as a "light shielding member" without designating the reference numeral.

The interchangeable lens 14 comprises an imaging lens 40. Luminous flux passing through an exit pupil of the imaging lens 40 is roughly divided into left region passing light 38L and right region passing light 38R. The left region passing light 38L refers to the left half luminous flux of the luminous flux passing through the exit pupil of the imaging lens 40 in a case of facing the subject side from the phase difference pixel P side. The right region passing light 38R refers to the right half luminous flux of the luminous flux passing through the exit pupil of the imaging lens 40 in a case of facing the subject side from the phase difference pixel P side. The luminous flux passing through the exit pupil of the imaging lens 40 is divided into the right and left by the microlens 36, the light shielding member 34A, and the light shielding member 34B functioning as a pupil division unit. The first phase difference pixel L receives the left region passing light 38L as the subject light, and the second phase difference pixel R receives the right region passing light 38R as the subject light. As a result, first phase difference image data corresponding to the subject image corresponding to the left region passing light 38L and second phase difference image data corresponding to the subject image corresponding to the right region passing light 38R are generated by the photoelectric conversion element 30.

In the imaging apparatus 10, for example, in the same phase difference pixel line 32A, the distance to the subject based on a deviation amount a (hereinafter, also simply referred to as a "deviation amount a") between the first phase difference image data for one line and the second phase difference image data for one line, that is, a subject distance is measured. It should be noted that, since a method of deriving the subject distance from the deviation amount a is a known technology, the detailed description thereof will be omitted here.

Figure 5:
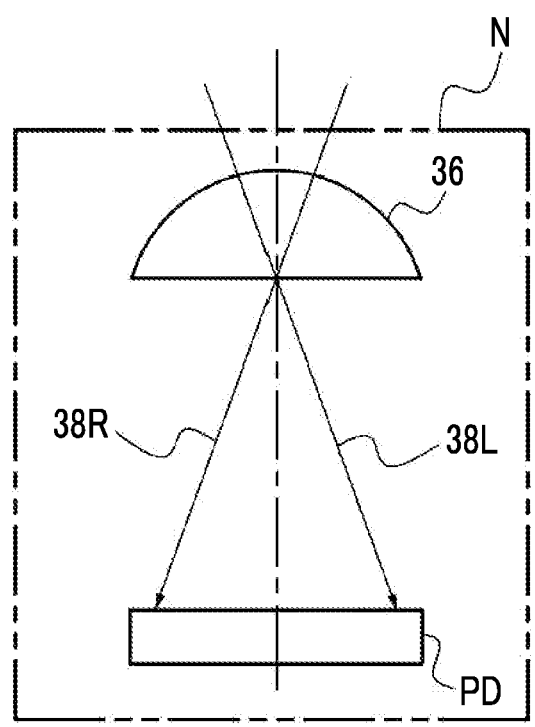
FIG. 5 is a schematic configuration diagram showing an example of a configuration of a non-phase difference pixel included in the photoelectric conversion element shown in FIG. 3.

As an example, as shown in FIG. 5, the non-phase difference pixel N is different from the phase difference pixel Pin that the light shielding member is not provided. The photodiode PD of the non-phase difference pixel N receives the left region passing light 38L and the right region passing light 38R as the subject light.

Figure 6:
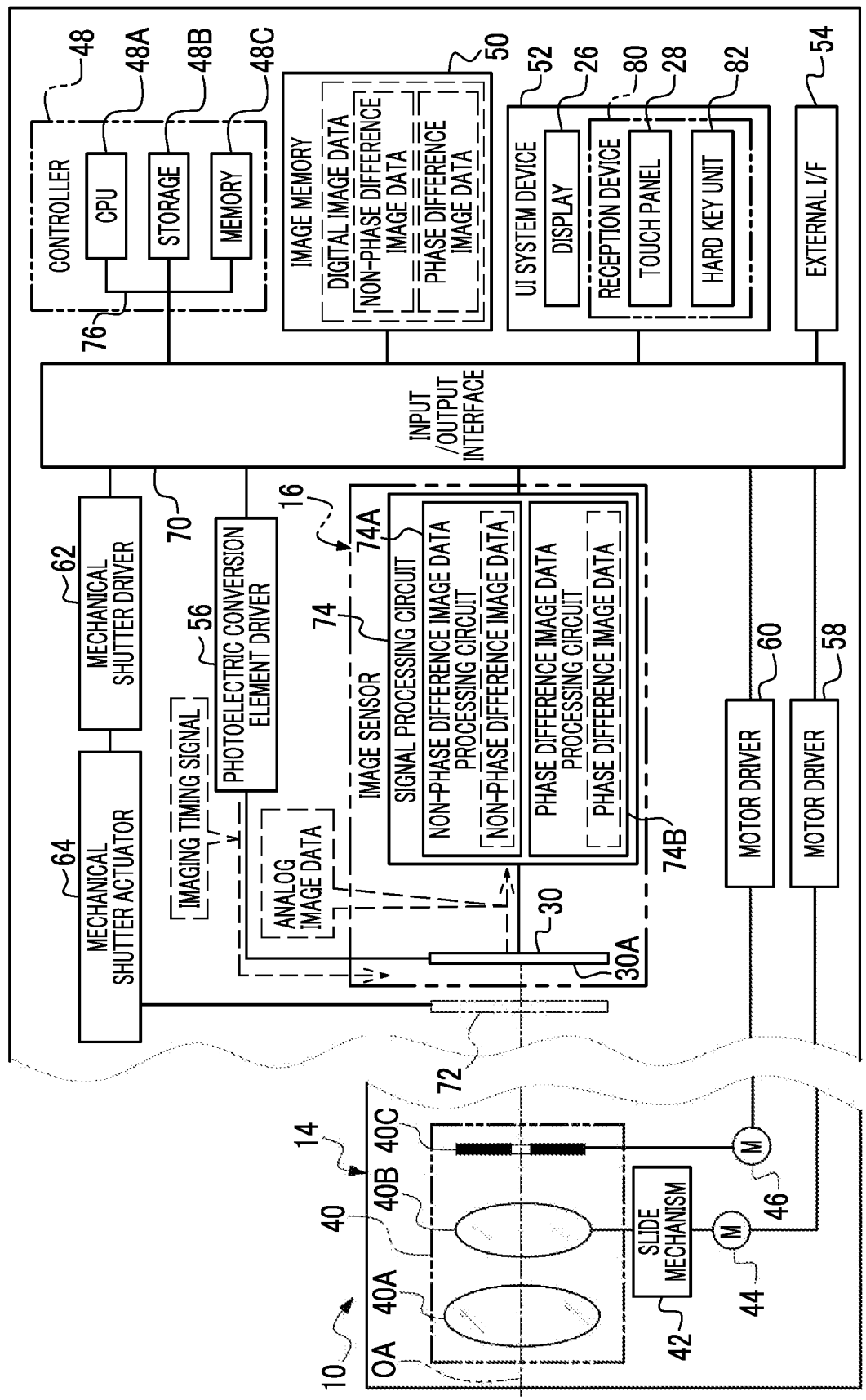
FIG. 6 is a schematic configuration diagram showing an example of a hardware configuration of the imaging apparatus.

As an example, as shown in FIG. 6, the imaging lens 40 is an example of an "imaging optical system" according to the technology of the present disclosure, and comprises an objective lens 40A, a focus lens 40B, and a stop 40C.

The objective lens 40A, the focus lens 40B, and the stop 40C are disposed in an order of the objective lens 40A, the focus lens 40B, and the stop 40C along the optical axis OA from the subject side (object side) to the imaging apparatus body 12 side (image side).

In addition, the interchangeable lens 14 comprises a slide mechanism 42, a motor 44, and a motor 46. The focus lens 40B is attached to the slide mechanism 42 in a slidable manner along the optical axis OA. In addition, the motor 44 is connected to the slide mechanism 42, and the slide mechanism 42 moves the focus lens 40B along the optical axis OA by receiving power of the motor 44 to operate. The stop 40C is a stop with an aperture having a variable size. The motor 46 is connected to the stop 40C, and the stop 40C adjusts exposure by receiving the power of the motor 46 to operate. It should be noted that a structure and/or an operation method of the interchangeable lens 14 can be changed as needed.

The motors 44 and 46 are connected to the imaging apparatus body 12 via a mount (not shown), and driving of the motors 44 and 46 is controlled in accordance with a command from the imaging apparatus body 12. It should be noted that, in the present embodiment, stepping motors are adopted as an example of the motors 44 and 46. Therefore, the motors 44 and 46 operate in synchronization with a pulse signal in accordance with the command from the imaging apparatus body 12. In addition, in the example shown in FIG. 6, the example is shown in which the motors 44 and 46 are provided in the interchangeable lens 14, but the technology of the present disclosure is not limited to this. One of the motors 44 and 46 may be provided in the imaging apparatus body 12, or both the motors 44 and 46 may be provided in the imaging apparatus body 12.

In the imaging apparatus 10, in a case of the imaging mode, an MF mode and an AF mode are selectively set in accordance with an instruction given to the imaging apparatus body 12. The MF mode is an operation mode for manually focusing. In the MF mode, for example, in a case in which a focus ring of the interchangeable lens 14 is operated by the user, the focus lens 40B is moved along the optical axis OA with a movement amount corresponding to an operation amount of the focus ring to adjust the focus.

In the AF mode, the imaging apparatus body 12 calculates a focus position in accordance with the subject distance, and moves the focus lens 40B toward the calculated focus position to adjust the focus. Here, the "focus position" refers to a position of the focus lens 40B on the optical axis OA in an in-focus state.

It should be noted that, in the following, for convenience of description, the control of aligning the focus lens 40B with the focus position is also referred to as an "AF control". In addition, in the following, for convenience of description, the calculation of the focus position is also referred to as an "AF calculation". In the imaging apparatus 10, a CPU 48A described below performs the AF calculation to detect the focus for a plurality of subjects. Moreover, the CPU 48A described below performs focusing on the subject based on a result of the AF calculation, that is, a detection result of the focus.

The imaging apparatus body 12 comprises the image sensor 16, a controller 48, an image memory 50, a UI system device 52, an external I/F 54, a photoelectric conversion element driver 56, a motor driver 58, a motor driver 60, a mechanical shutter driver 62, and a mechanical shutter actuator 64. In addition, the imaging apparatus body 12 comprises a mechanical shutter 72. In addition, the image sensor 16 comprises a signal processing circuit 74.

An input/output interface 70 is connected to the controller 48, the image memory 50, the UI system device 52, the external I/F 54, the photoelectric conversion element driver 56, the motor driver 58, the motor driver 60, the mechanical shutter driver 62, and the signal processing circuit 74.

The controller 48 comprises the CPU 48A, a storage 48B, and a memory 48C. The CPU 48A is an example of the "processor" according to the technology of the present disclosure, the memory 48C is an example of a "memory" according to the technology of the present disclosure, and the controller 48 is an example of an "image processing device" and a "computer" according to the technology of the present disclosure.

The CPU 48A, the storage 48B, and the memory 48C are connected via a bus 76, and the bus 76 is connected to the input/output interface 70.

It should be noted that, in the example shown in FIG. 6, one bus is shown as the bus 76 for convenience of illustration, but a plurality of buses may be used. The bus 76 may be a serial bus, or may be a parallel bus, which includes a data bus, an address bus, a control bus, and the like.

Various parameters and various programs are stored in the storage 48B. The storage 48B is a non-volatile storage device. Here, an EEPROM is adopted as an example of the storage 48B. The EEPROM is merely an example, and an HDD and/or SSD or the like may be applied as the storage 48B instead of the EEPROM or together with the EEPROM. In addition, the memory 48C transitorily stores various pieces of information and is used as a work memory. Examples of the memory 48C include a RAM, but the technology of the present disclosure is not limited to this, and other types of storage devices may be used.

Various programs are stored in the storage 48B. The CPU 48A reads out a needed program from the storage 48B, and executes the read out program on the memory 48C. The CPU 48A controls the entire imaging apparatus body 12 in accordance with the program executed on the memory 48C. In the example shown in FIG. 6, the image memory 50, the UI system device 52, the external I/F 54, the photoelectric conversion element driver 56, the motor driver 58, the motor driver 60, and the mechanical shutter driver 62 are controlled by the CPU 48A.

The photoelectric conversion element driver 56 is connected to the photoelectric conversion element 30. The photoelectric conversion element driver 56 supplies an imaging timing signal for defining a timing of the imaging performed by the photoelectric conversion element 30 to the photoelectric conversion element 30 in accordance with an instruction from the CPU 48A. The photoelectric conversion element 30 performs reset, exposure, and output of the electric signal in response to the imaging timing signal supplied from the photoelectric conversion element driver 56. Examples of the imaging timing signal include a vertical synchronizing signal and a horizontal synchronizing signal.

In a case in which the interchangeable lens 14 is mounted on the imaging apparatus body 12, the subject light incident on the imaging lens 40 is imaged on the light-receiving surface 30A by the imaging lens 40. Under the control of the photoelectric conversion element driver 56, the photoelectric conversion element 30 photoelectrically converts the subject light received by the light-receiving surface 30A, and outputs the electric signal in accordance with the light amount of the subject light to the signal processing circuit 74 as analog image data indicating the subject light. Specifically, the signal processing circuit 74 reads out the analog image data from the photoelectric conversion element 30 in one frame unit and for each horizontal line by an exposure sequential read-out method. The analog image data is roughly divided into analog phase difference image data generated by the phase difference pixel P and analog non-phase difference image data generated by the non-phase difference pixel N.

The signal processing circuit 74 generates digital image data by digitizing the analog image data input from the photoelectric conversion element 30. The signal processing circuit 74 comprises a non-phase difference image data processing circuit 74A and a phase difference image data processing circuit 74B. The non-phase difference image data processing circuit 74A generates digital non-phase difference image data by digitizing the analog non-phase difference image data. The phase difference image data processing circuit 74B generates digital phase difference image data by digitizing the analog phase difference image data.

It should be noted that, in the following, for convenience of description, in a case in which the distinction is not needed, the digital non-phase difference image data and the digital phase difference image data are referred to as "digital image data". In addition, in the following, for convenience of description, in a case in which the distinction is not needed, the analog image data and the digital image data are referred to as "image data".

The mechanical shutter 72 is a focal plane shutter and is disposed between the stop 40C and the light-receiving surface 30A. The mechanical shutter 72 comprises a front curtain (not shown) and a rear curtain (not shown). Each of the front curtain and the rear curtain comprises a plurality of blades. The front curtain is disposed on the subject side with respect to the rear curtain.

The mechanical shutter actuator 64 is an actuator including a front curtain solenoid (not shown) and a rear curtain solenoid (not shown). The front curtain solenoid is a drive source for the front curtain, and is mechanically connected to the front curtain. The rear curtain solenoid is a drive source for the rear curtain, and is mechanically connected to the rear curtain. The mechanical shutter driver 62 controls the mechanical shutter actuator 64 in accordance with an instruction from the CPU 48A.

The front curtain solenoid selectively performs winding and pulling down of the front curtain by generating power under the control of the mechanical shutter driver 62 and giving the generated power to the front curtain. The rear curtain solenoid selectively performs winding and pulling down of the rear curtain by generating power under the control of the mechanical shutter driver 62 and giving the generated power to the rear curtain. In the imaging apparatus 10, the opening and closing of the front curtain and the opening and closing of the rear curtain are controlled by the CPU 48A, so that an exposure amount with respect to the photoelectric conversion element 30 is controlled.

In the imaging apparatus 10, the imaging for the live view image and the imaging for a recording image for recording the still picture and/or the video are performed by the exposure sequential read-out method (rolling shutter method). The image sensor 16 has an electronic shutter function, and the imaging for the live view image is realized by activating the electronic shutter function without operating the mechanical shutter 72 in the fully opened state.

On the other hand, the imaging for the still picture is realized by activating the electronic shutter function and operating the mechanical shutter 72 such that the mechanical shutter 72 transitions from the front curtain closed state to the rear curtain closed state.

The digital image data is stored in the image memory 50. That is, the non-phase difference image data processing circuit 74A stores the non-phase difference image data in the image memory 50, and the phase difference image data processing circuit 74B stores the phase difference image data in the image memory 50. The CPU 48A acquires the digital image data from the image memory 50 and executes various pieces of processing by using the acquired digital image data.

The UI system device 52 comprises the display 26, and the CPU 48A displays various pieces of information on the display 26. In addition, the UI system device 52 comprises a reception device 80. The reception device 80 comprises the touch panel 28 and a hard key unit 82. The hard key unit 82 is a plurality of hard keys including the instruction key 24 (see FIG. 2). The CPU 48A is operated in accordance with various instructions received by the touch panel 28. It should be noted that, here, although the hard key unit 82 is provided in the UI system device 52, the technology of the present disclosure is not limited to this, and for example, the hard key unit 82 may be connected to the external I/F 54.

The external I/F 54 controls the exchange of various pieces of information with the device (hereinafter, also referred to as an "external device") that is present outside the imaging apparatus 10. Examples of the external I/F 54 include a USB interface. External devices (not shown), such as a smart device, a personal computer, a server, a USB memory, a memory card, and/or a printer, are directly or indirectly connected to the USB interface.

The motor driver 58 is connected to the motor 44 and controls the motor 44 in accordance with the instruction from the CPU 48A. The position of the focus lens 40B on the optical axis OA is controlled via the slide mechanism 42 by controlling the motor 44. The focus lens 40B is moved in accordance with the instruction from the CPU 48A while avoiding a main exposure period by the image sensor 16.

The motor driver 60 is connected to the motor 46 and controls the motor 46 in accordance with the instruction from the CPU 48A. The size of the aperture of the stop 40C is controlled by controlling the motor 46.

Figure 7:
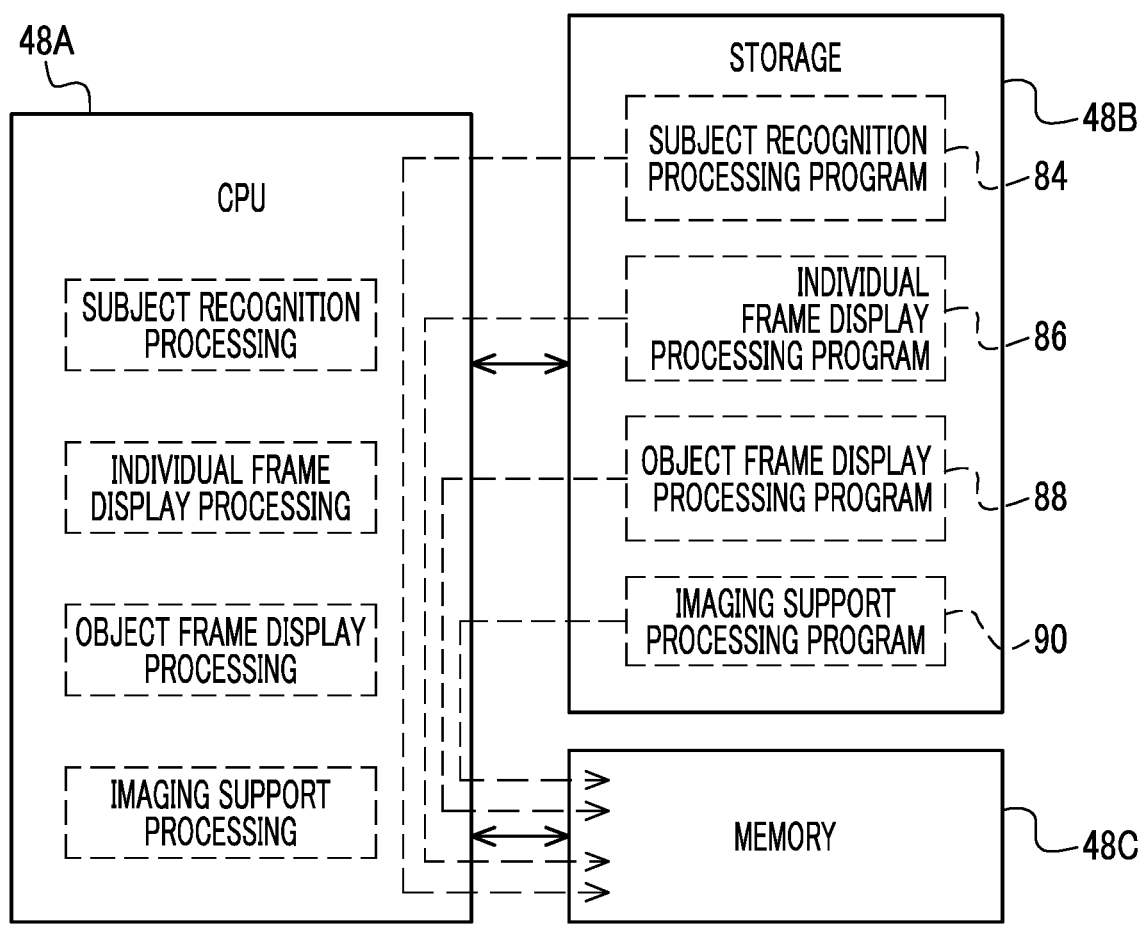
FIG. 7 is a block diagram showing an example of a configuration of a controller provided in the imaging apparatus.

As an example, as shown in FIG. 7, the storage 48B stores a subject recognition processing program 84, an individual frame display processing program 86, an object frame display processing program 88, and an imaging support processing program 90. In the following, in a case in which the distinction is not needed, the subject recognition processing program 84, the individual frame display processing program 86, the object frame display processing program 88, the imaging support processing program 90, an object frame deformation processing program (not shown) described below, and a display method setting processing program (not shown) described below are simply referred to as an "image processing program" without designating the reference numeral. It should be noted that the image processing program is an example of a "program" according to the technology of the present disclosure.

The CPU 48A reads out the image processing program from the storage 48B and executes the read out image processing program on the memory 48C. The CPU 48A performs subject recognition processing in accordance with the subject recognition processing program 84 executed on the memory 48C (see also FIG. 17). In addition, the CPU 48A performs individual frame display processing in accordance with the individual frame display processing program 86 executed on the memory 48C (see also FIG. 18). In addition, the CPU 48A performs object frame display processing in accordance with the object frame display processing program 88 executed on the memory 48C (see also FIG. 19A and FIG. 19B). Further, the CPU 48A performs imaging support processing in accordance with the imaging support processing program 90 executed on the memory 48C (see also FIG. 20). It should be noted that, in the following, for convenience of description, in a case in which the distinction is not needed, the subject recognition processing, the individual frame display processing, the object frame display processing, the imaging support processing, object frame deformation processing (see FIG. 38), and display method setting processing (see FIG. 47) are also referred to as "image processing".

The CPU 48A executes the subject recognition processing to recognize the subject included in the subject group based on the image data obtained by imaging the subject group with the imaging apparatus 10 and display the image indicated by the image data on the display 26. The CPU 48A executes the object frame display processing to display a plurality of subject regions, which are in the image, correspond to the plurality of subjects included in the subject group, and satisfy a predetermined condition, in the image in the aspect that is capable of being identified as one object based on a result of recognizing the subject. In the following, the processing contents will be described in more detail.

Figure 8:
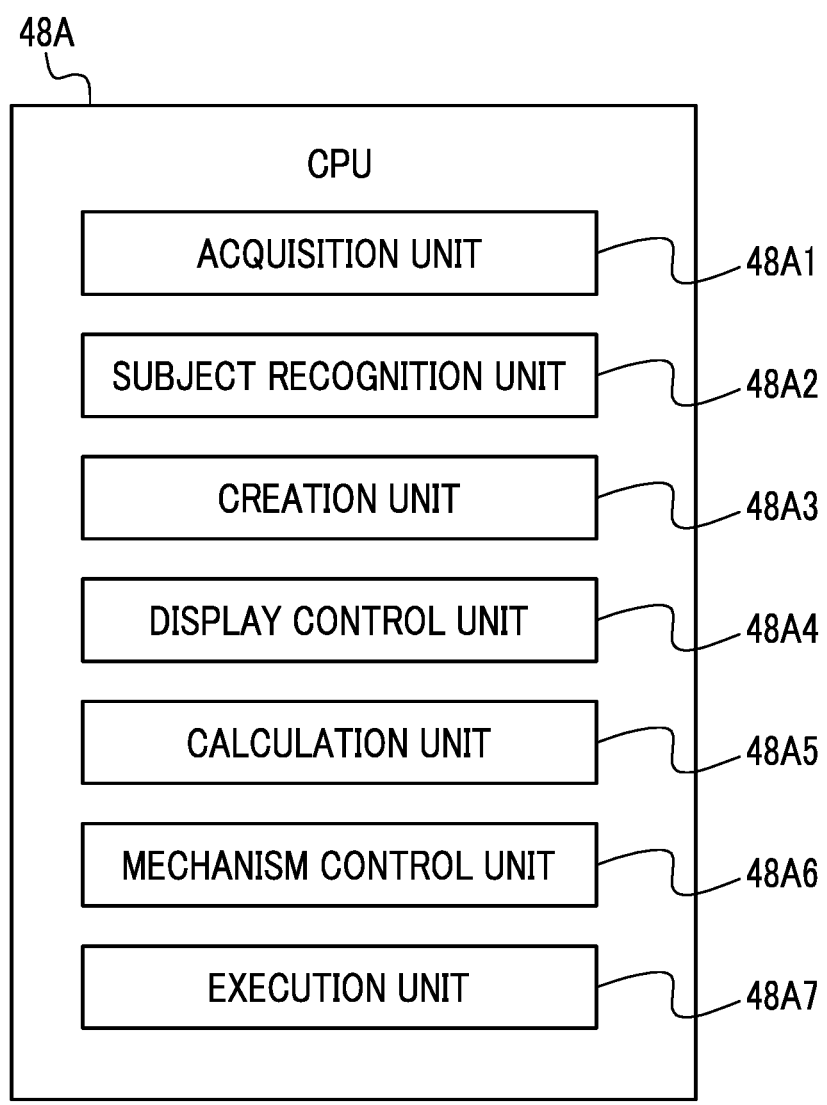
FIG. 8 is a block diagram showing an example of a main function of a CPU provided in the imaging apparatus.

As an example, as shown in FIG. 8, the CPU 48A executes the subject recognition processing program 84 to be operated as an acquisition unit 48A1 and a subject recognition unit 48A2. In addition, the CPU 48A executes the individual frame display processing program 86 to be operated as the acquisition unit 48A1, a creation unit 48A3, and a display control unit 48A4. In addition, the CPU 48A executes the object frame display processing program 88 to be operated as the creation unit 48A3, the display control unit 48A4, a calculation unit 48A5, and a mechanism control unit 48A6. Further, the CPU 48A executes the imaging support processing program 90 to be operated as an execution unit 48A7.

Figure 9:
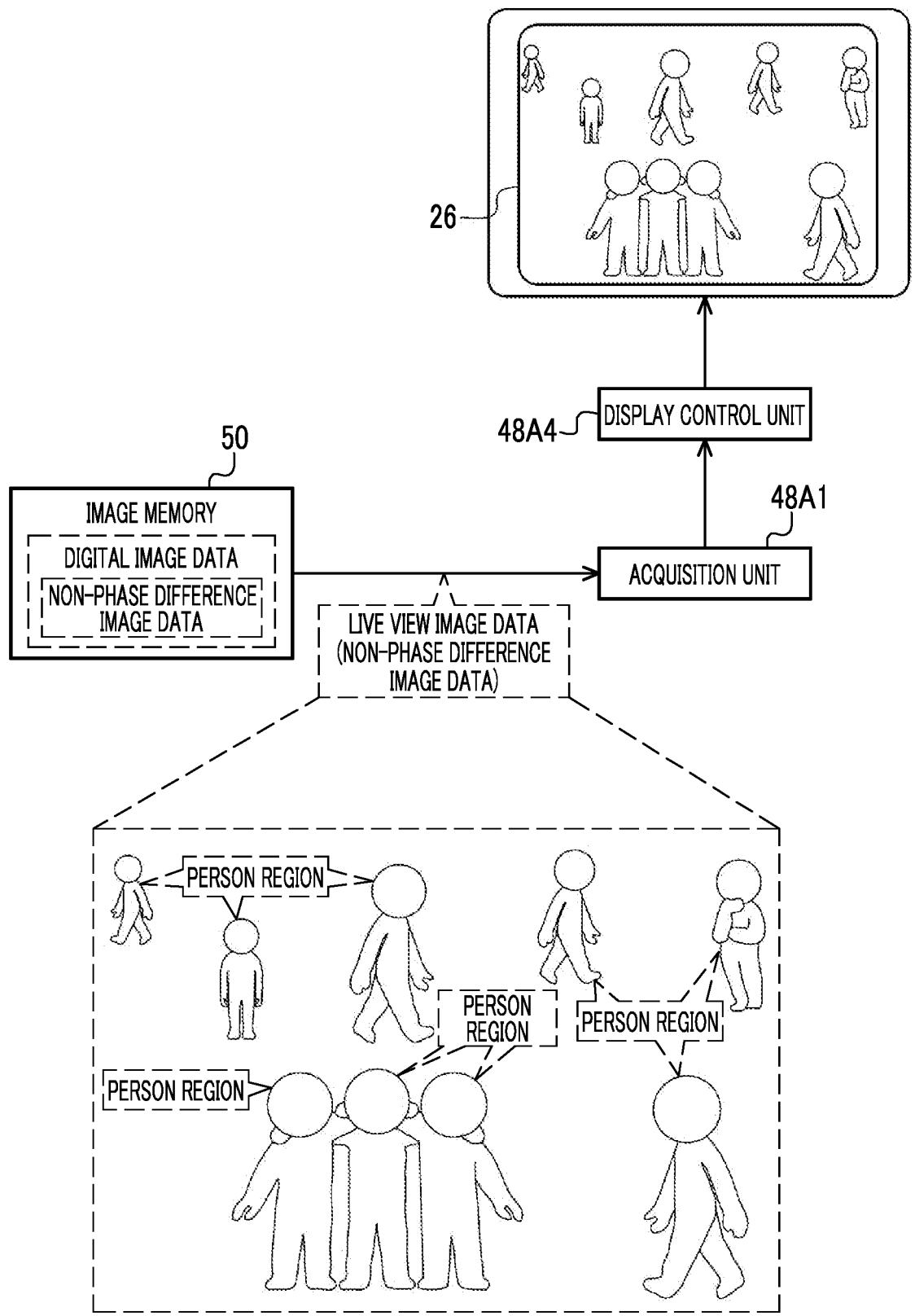
FIG. 9 is a conceptual diagram showing an example of processing contents in a case in which the CPU is operated as an acquisition unit and a display control unit.

As an example, as shown in FIG. 9, the acquisition unit 48A1 acquires the non-phase difference image data from the image memory 50 as live view image data. The live view image data is acquired by the acquisition unit 48A1 from the image memory 50 at a predetermined frame rate (for example, 60 fps). The live view image data is the image data obtained by imaging the imaging region including the subject group by the image sensor 16. In the present embodiment, for convenience of description, a plurality of persons are applied as an example of the subject group. Therefore, in the example shown in FIG. 9, the image data indicating the live view image including a person region for the plurality of persons is shown as the live view image data. Here, the person region refers to an image region indicating a person.

It should be noted that, here, for convenience of description, the plurality of persons are described as the subject group, but the technology of the present disclosure is not limited to this, and a vehicle, a small animal, an insect, a plant, a landscape, an organ of a living body, and/or a cell of the living body may be included in the subject group in addition to the person. In addition, the subject group does not have to include the person, and need only be the subject group that can be imaged by the image sensor 16.

Each time the acquisition unit 48A1 acquires the live view image data for one frame, the display control unit 48A4 displays the live view image indicated by the live view image data acquired by the acquisition unit 48A1 on the display 26.

Figure 10:
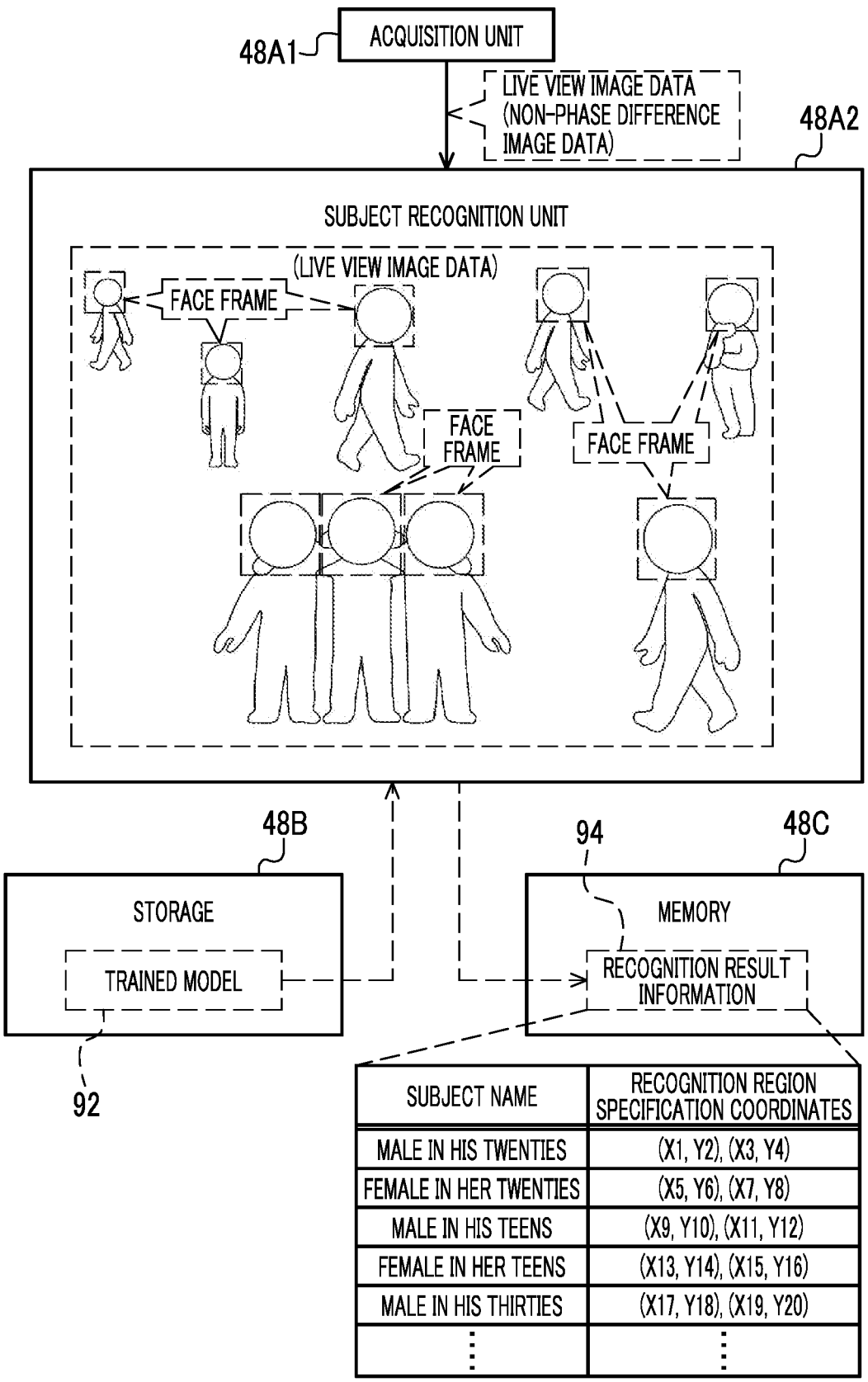
FIG. 10 is a conceptual diagram showing an example of processing contents in a case in which the CPU is operated as the acquisition unit and a subject recognition unit.

As an example, as shown in FIG. 10, the subject recognition unit 48A2 recognizes the subject included in the subject group in the imaging region based on the live view image data acquired by the acquisition unit 48A1. In the example shown in FIG. 10, a trained model 92 is stored in the storage 48B, and the subject recognition unit 48A2 recognizes the subject included in the subject group by using the trained model 92.

Examples of the trained model 92 include a trained model using a cascade classifier. The trained model using the cascade classifier is constructed as a trained model for image recognition, for example, by performing supervised machine learning on a neural network. It should be noted that the trained model 92 is not limited to the trained model using the cascade classifier, and may be a dictionary for pattern matching. That is, the trained model 92 may be any trained model as long as it is a trained model used in image analysis performed in a case in which the subject is recognized.

The subject recognition unit 48A2 recognizes the face of the person included in the imaging region as the subject by performing the image analysis on the live view image data. Here, the face of the person is an example of a "subject" according to the technology of the present disclosure, and the face of the person is an example of a "face" according to the technology of the present disclosure. In addition, a face region indicating the face of the person in the image (for example, the live view image) is an example of a "subject region" according to the technology of the present disclosure. It should be noted that, here, the example is described in which the face of the person is recognized as the subject by the subject recognition unit 48A2, but the technology of the present disclosure is not limited to this, and the entire person may be recognized as the subject by the subject recognition unit 48A2.

The subject recognition unit 48A2 specifies an age group and a gender of the person included in the imaging region, and also specifies a registered unique person using so-called face recognition technology.

The subject recognition unit 48A2 stores recognition result information 94 indicating a result of recognizing the face of the person in the memory 48C. The recognition result information 94 is overwritten and saved in the memory 48C in a one frame unit. The recognition result information 94 is stored in the memory 48C in a state in which a subject name and recognition region specification coordinates are associated with each other on a one-to-one basis. The subject name is information for specifying the person of which the face is recognized by the subject recognition unit 48A2. Examples of the information for specifying a general person include the age group and the gender. In addition, examples of the information for specifying the unique person include a name and an address.

The recognition region specification coordinates refer to coordinates indicating a position in the live view image of a quadrangular frame (hereinafter, also referred to as a "face frame") that surrounds the face region indicating the face of the person recognized by the subject recognition unit 48A2. In the example shown in FIG. 10, as an example of the recognition region specification coordinates, coordinates of two vertices on a diagonal line of the face frame (in the example shown in FIG. 10, a broken-line quadrangular frame) in the live view image (for example, coordinates of an upper left corner and coordinates of a lower right corner) are shown.

It should be noted that, as long as the shape of the face frame is quadrangular, the recognition region specification coordinates may be coordinates of three vertices or may be coordinates of four vertices. In addition, the shape of the face frame is not limited to be quadrangular and may be another shape. In this case as well, coordinates for specifying the position of the face frame in the live view image need only be used as the recognition region specification coordinates.

Figure 11:
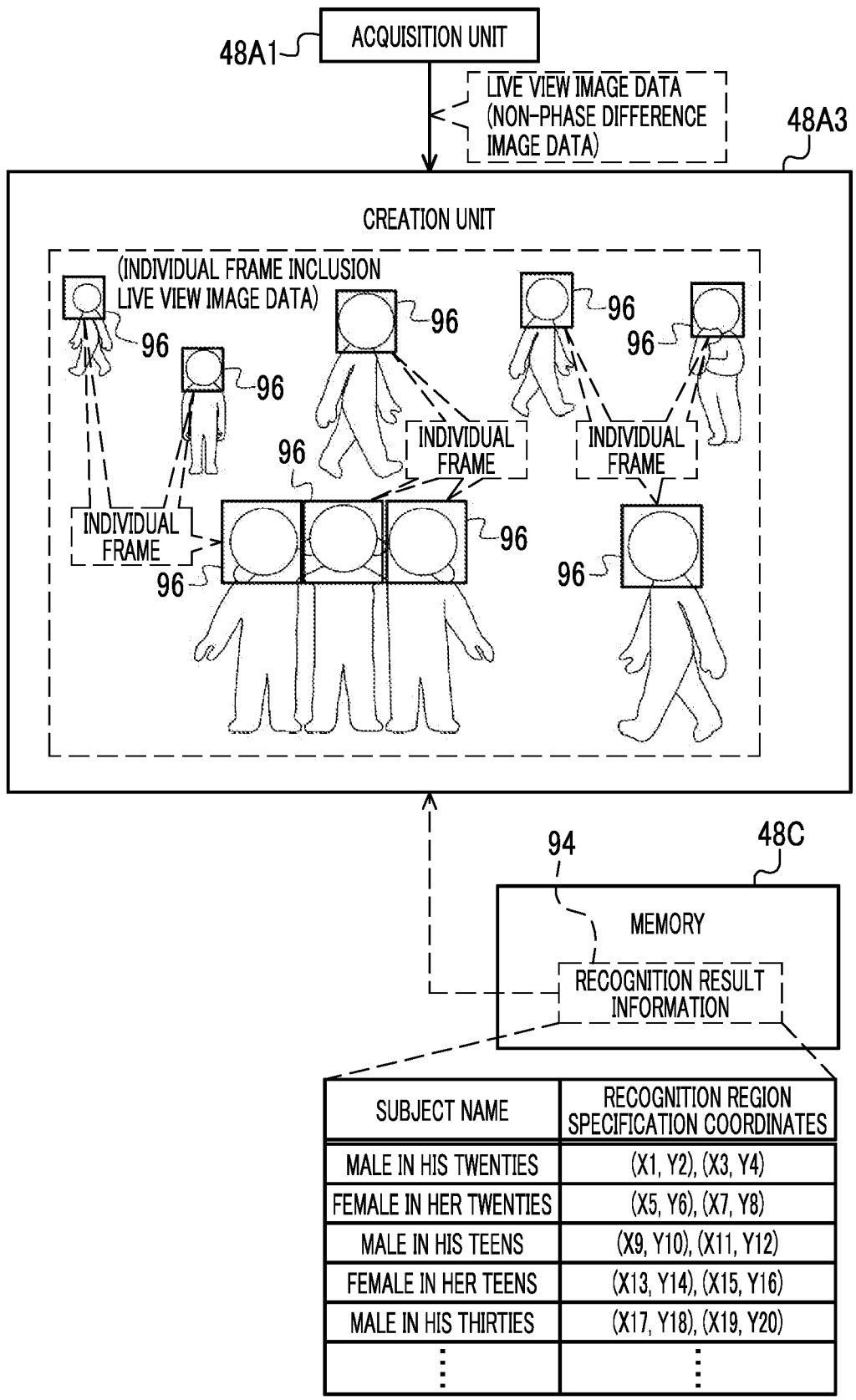
FIG. 11 is a conceptual diagram showing an example of processing contents in a case in which the CPU is operated as the acquisition unit and a creation unit.

As an example, as shown in FIG. 11, the creation unit 48A3 creates an individual frame 96 to be superimposed on the live view image. The individual frame 96 is a frame that individually surrounds a plurality of face regions. That is, the individual frame 96 is a frame corresponding to the face frame. The creation unit 48A3 generates individual frame inclusion live view image data from the live view image data which is acquired by the acquisition unit 48A1 based on the latest recognition result information 94 stored in the memory 48C. The individual frame inclusion live view image data is image data indicating the live view image (hereinafter, also referred to as an "individual frame inclusion live view image") on which the individual frame 96 is superimposed. The creation unit 48A3 generates the live view image data such that the individual frame 96 is superimposed on the live view image at the position specified by the recognition region specification coordinates included in the recognition result information 94.

Figure 12:
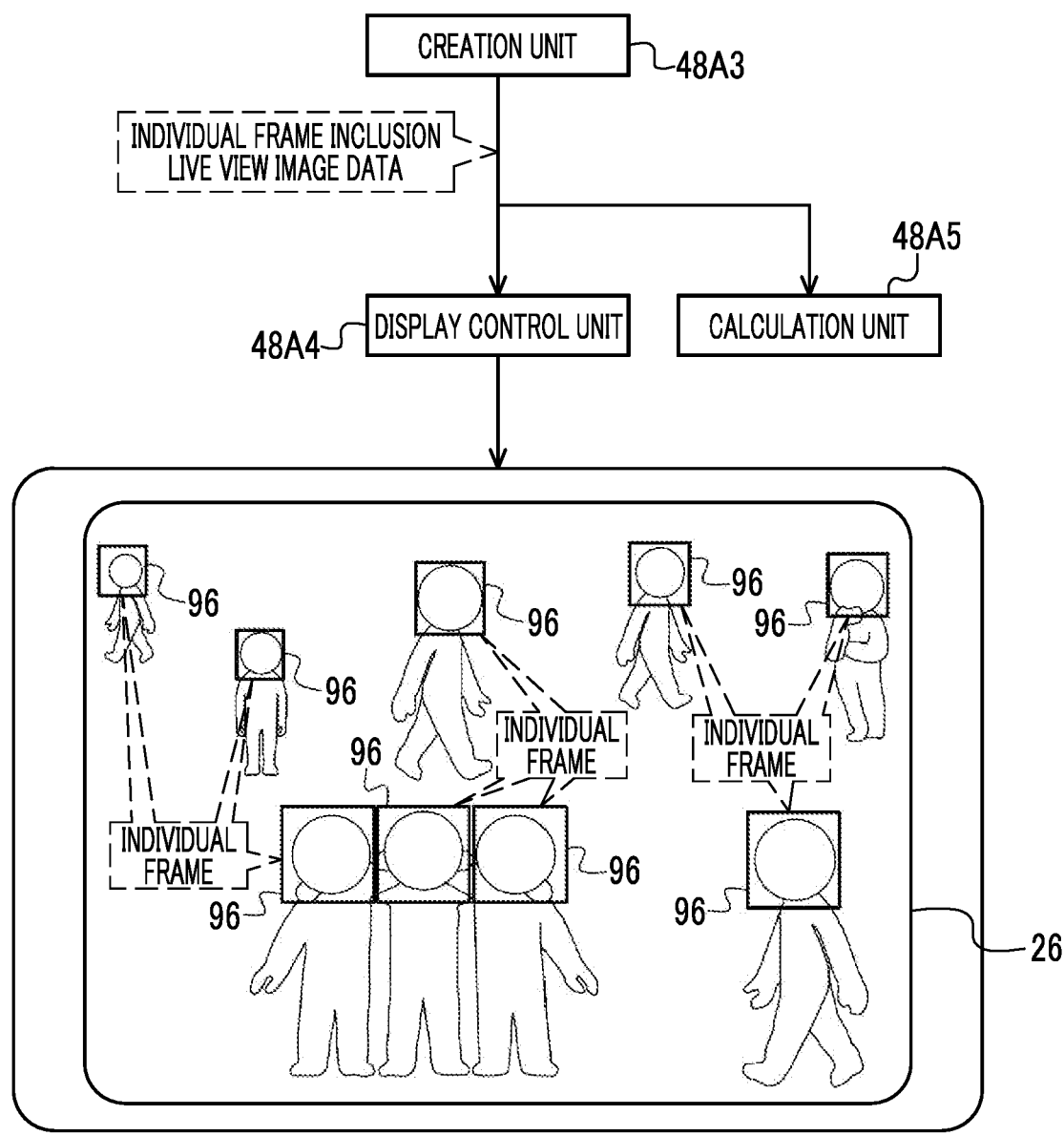
FIG. 12 is a conceptual diagram showing an example of processing contents in a case in which the CPU is operated as the creation unit, the display control unit, and a calculation unit.

As an example, as shown in FIG. 12, the creation unit 48A3 outputs the individual frame inclusion live view image data to the display control unit 48A4 and the calculation unit 48A5. The display control unit 48A4 displays the individual frame 96 in the live view image. That is, the display control unit 48A4 displays the individual frame inclusion live view image indicated by the individual frame inclusion live view image data input from the creation unit 48A3 on the display 26.

By the way, in the example shown in FIG. 12, a plurality of individual frames 96 are displayed on the display 26. Here, in a case in which the number of the individual frames 96 is increased, it is difficult to visually identify a set of face regions important to the user (for example, a face region corresponding to the face of the person which is a focusing target) and other face regions.

Therefore, in view of such circumstances, the CPU 48A executes the object frame display processing to cause the display 26 to display the plurality of face regions satisfying the predetermined condition in the live view image in the aspect that is capable of being identified as one object based on the recognition result information 94. Here, the predetermined condition is a condition including a focusing condition. The focusing condition refers to a condition that the focusing is performed on the faces of the plurality of persons.

Figure 13:
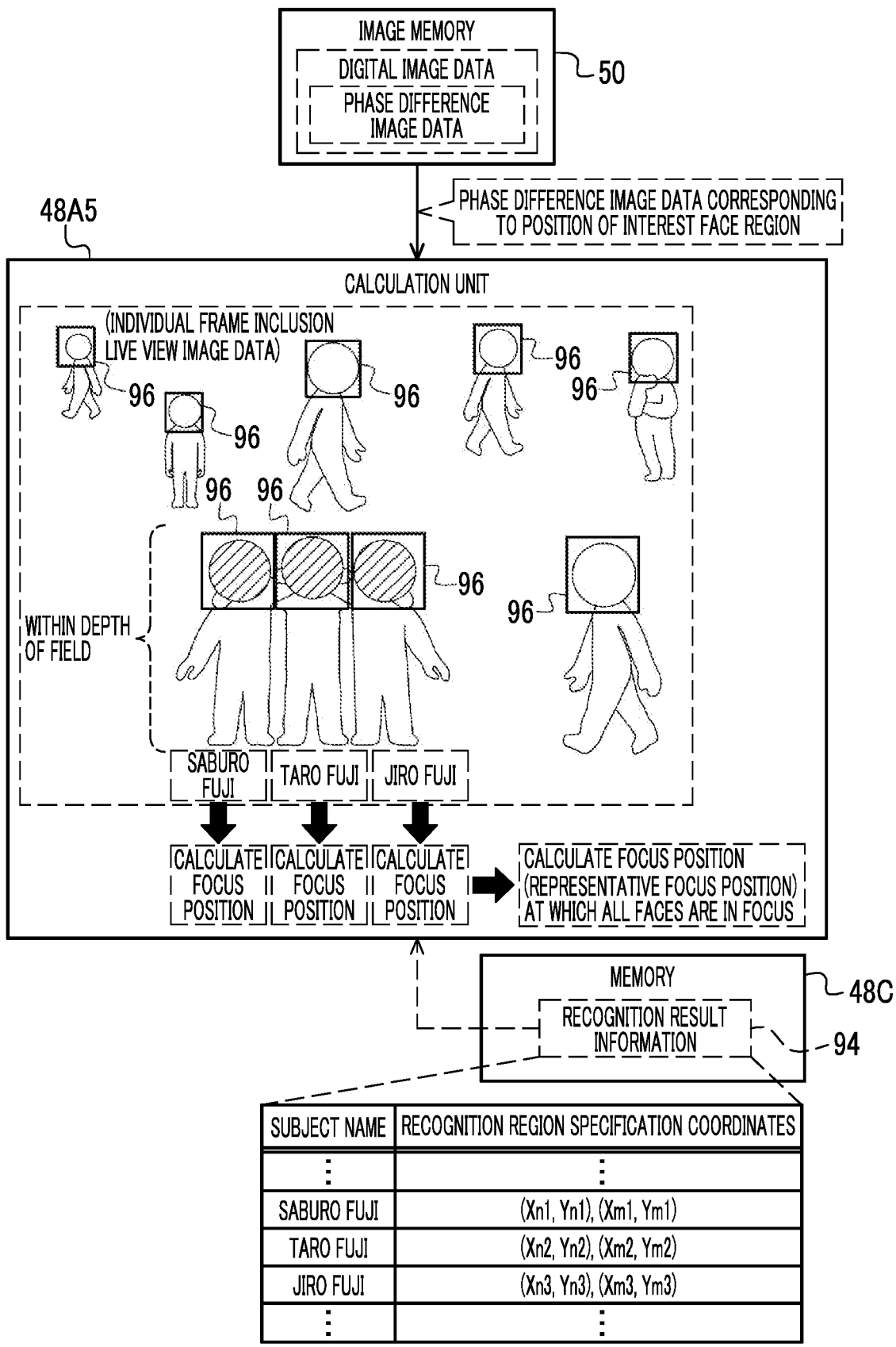
FIG. 13 is a conceptual diagram showing an example of processing contents in a case in which the CPU is operated as the calculation unit.

In the example shown in FIG. 13, hatching regions are shown as the plurality of face regions satisfying the focusing condition. As an example, as shown in FIG. 13, the subject which is a focusing target is the faces of the plurality of persons that are included within a predetermined depth of field (for example, a depth of field set at the present time).

The calculation unit 48A5 specifies an interest face region from the recognition result information 94, and calculates the focus position with respect to the face indicated by the specified interest face region (hereinafter, also referred to as an "interest face"). The interest face region refers to, for example, a face region registered in advance as a face region of interest by the user. In the example shown in FIG. 13, each face region in which the subject name indicated by the recognition result information 94 is "Taro Fuji", "Jiro Fuji", and "Saburo Fuji" is shown as the interest face region. The calculation unit 48A5 refers to the recognition region specification coordinates corresponding to each of the face of "Taro Fuji", the face of "Jiro Fuji", and the face of "Saburo Fuji", and acquires the phase difference image data corresponding to the positions of a plurality of interest face regions (in the example shown in FIG. 13, the position of the face region of "Taro Fuji", the position of the face region of "Jiro Fuji", and the position of the face region of "Saburo Fuji") from the image memory 50.

The calculation unit 48A5 performs the AF calculation for each of the plurality of interest faces by using the phase difference image data acquired from the image memory 50. That is, the calculation unit 48A5 calculates the focus position for each of the plurality of faces indicated by the plurality of interest face regions (in the example shown in FIG. 13, the face of "Taro Fuji", the face of "Jiro Fuji", and the face of "Saburo Fuji") by using the phase difference image data.

The calculation unit 48A5 calculates a focus position (hereinafter, also referred to as a "representative focus position") at which all the faces, that is, the face of "Taro Fuji", the face of "Jiro Fuji", and the face of "Saburo Fuji" are in focus. Examples of the representative focus position include an intermediate focus position among the focus position with respect to the face of "Taro Fuji", the focus position with respect to the face of "Jiro Fuji", and the focus position with respect to the face of "Saburo Fuji".

It should be noted that a first modification example of the representative focus position includes an intermediate position between a close-side focus position and an infinity-side focus position with respect to the face of "Taro Fuji", the face of "Jiro Fuji", and the face of "Saburo Fuji". In addition, a second modification example of the representative focus position includes an average value of the focus position with respect to the face of "Taro Fuji", the focus position with respect to the face of "Jiro Fuji", and the focus position with respect to the face of "Saburo Fuji". In addition, here, three subjects of the face of "Taro Fuji", the face of "Jiro Fuji", and the face of "Saburo Fuji" are described, but the technology of the present disclosure is not limited to this, and the subject on which the focusing is performed may be two or may be four or more.

Figure 14:
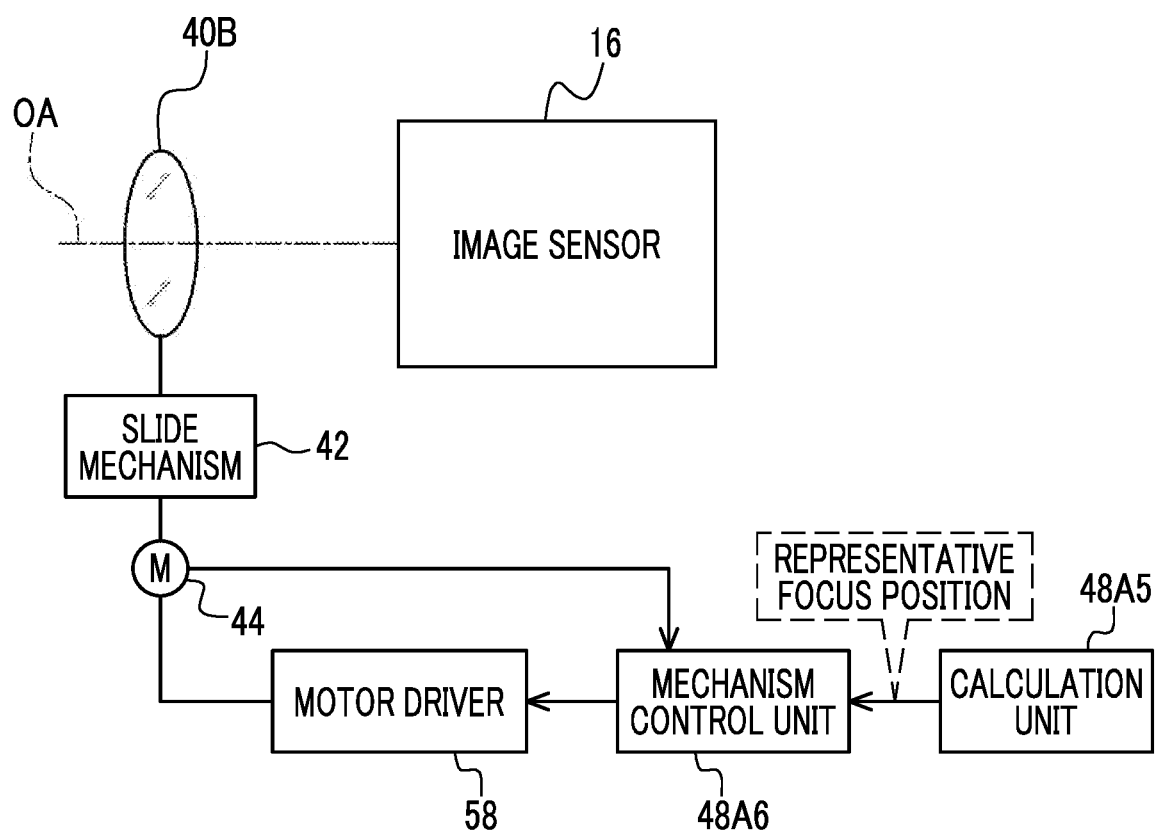
FIG. 14 is a conceptual diagram showing an example of processing contents in a case in which the CPU is operated as the calculation unit and a mechanism control unit.

As an example, as shown in FIG. 14, the mechanism control unit 48A6 operates the motor 44 by controlling the motor driver 58 to move the focus lens 40B to the representative focus position calculated by the calculation unit 48A5. As a result, the focus lens 40B is moved to the focus position at which the face of "Taro Fuji", the face of "Jiro Fuji", and the face of "Saburo Fuji" are included within the predetermined depth of field (here, as an example, the representative focus position), and as a result, the face of "Taro Fuji", the face of "Jiro Fuji", and the face of "Saburo Fuji" are in focus.

The mechanism control unit 48A6 monitors an operating state of the motor 44 and specifies the position of the focus lens 40B based on the operating state of the motor 44. Here, the mechanism control unit 48A6 determines whether or not the focusing condition is satisfied by determining whether or not the focus lens 40B has reached the representative focus position.

Figure 15:
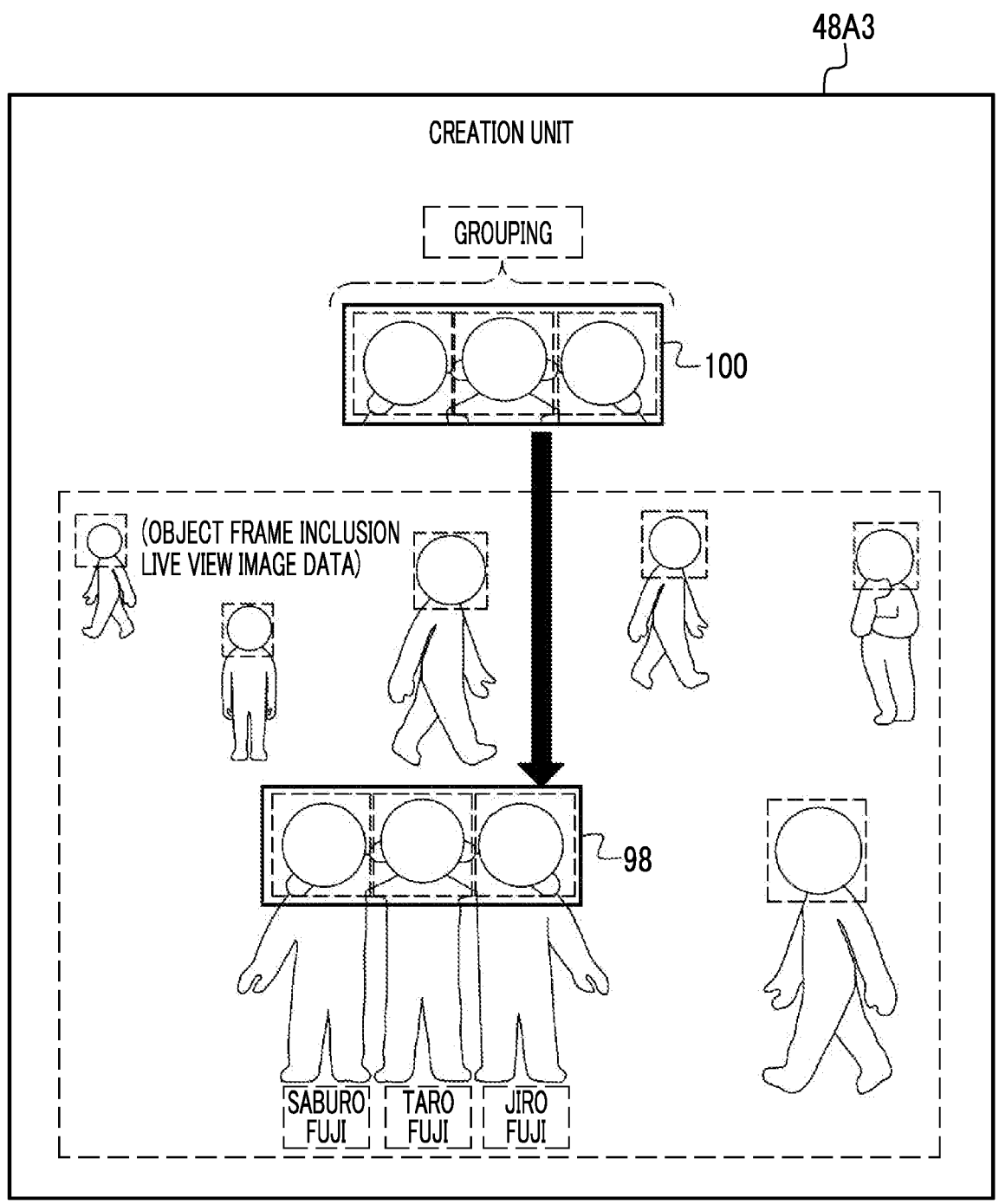
FIG. 15 is a conceptual diagram showing an example of processing contents in a case in which the CPU is operated as the creation unit.

In a case in which the focusing condition is satisfied, as an example, as shown in FIG. 15, the creation unit 48A3 creates the object frame 98 to be superimposed on the live view image. The object frame 98 is a frame that surrounds the plurality of face regions (in the example shown in FIG. 15, the face region of "Taro Fuji", the face region of "Jiro Fuji", and the face region of "Saburo Fuji") satisfying the focusing condition.

The creation unit 48A3 generates object frame inclusion live view image data by deleting the individual frame 96 from the individual frame inclusion live view image data and adding the object frame 98. The object frame inclusion live view image data is image data indicating the live view image (hereinafter, also referred to as an "object frame inclusion live view image") on which the object frame 98 is superimposed. It should be noted that, in the example shown in FIG. 15, in the object frame inclusion live view image data, the position of the deleted individual frame 96 is indicated by a broken line rectangular frame, and the face region of "Taro Fuji", the face region of "Jiro Fuji", and the face region of "Saburo Fuji" are surrounded by the object frame 98 as one object.

In a case in which the creation unit 48A3 creates the object frame 98, first, the creation unit 48A3 generates a grouped image region (in the example shown in FIG. 15, a rectangle region) 100 obtained by grouping the plurality of face regions satisfying the focusing condition (in the example shown in FIG. 15, the face region of "Taro Fuji", the face region of "Jiro Fuji", and the face region of "Saburo Fuji"). Moreover, the creation unit 48A3 creates a boundary line indicating a boundary of the grouped image region 100, that is, a contour line indicating an outer contour of the grouped image region 100 as the object frame 98.

It should be noted that, in the example shown in FIG. 15, since the grouped image region 100 is the rectangle region, the object frame 98 is formed of a rectangle frame. However, in a case in which the contour line of the grouped image region 100 is the object frame 98, the shape of the object frame 98 is also changed depending on the shape of the grouped image region 100.

Figure 16:
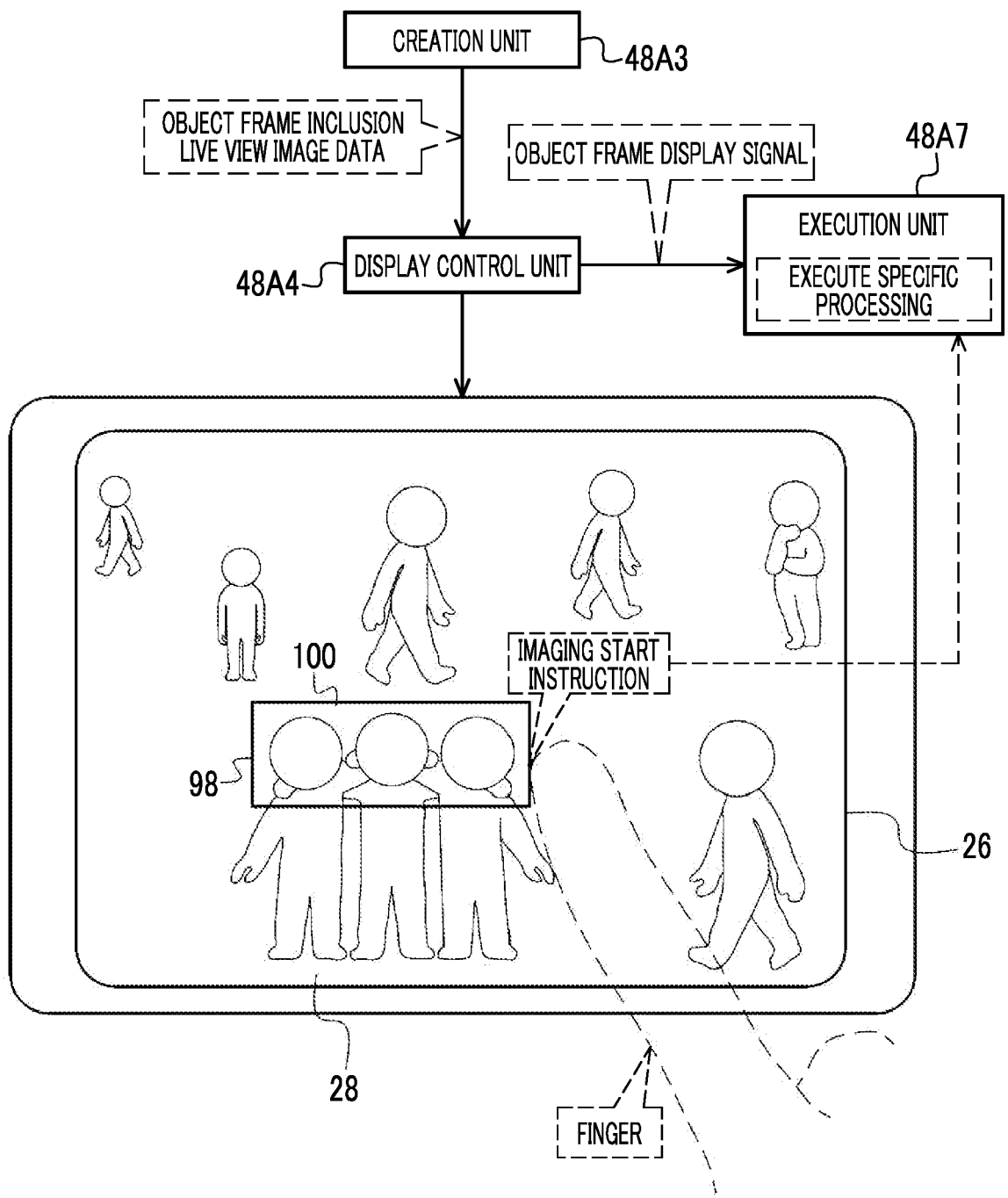
FIG. 16 is a conceptual diagram showing an example of processing contents in a case in which the CPU is operated as the creation unit and the display control unit.

As an example, as shown in FIG. 16, the display control unit 48A4 displays the object frame inclusion live view image indicated by the object frame inclusion live view image data generated by the creation unit 48A3 on the display 26. That is, the display control unit 48A4 displays the grouped image region 100 in the live view image in the aspect that is capable of being identified as one object by displaying the object frame 98 in the live view image. In other words, the display control unit 48A4 displays the plurality of face regions satisfying the focusing condition (in the example shown in FIG. 15, the face region of "Taro Fuji", the face region of "Jiro Fuji", and the face region of "Saburo Fuji") in the live view image in the aspect that is capable of being identified as one object by displaying the object frame 98 in the live view image.

The execution unit 48A7 executes specific processing in a case in which the focusing condition is satisfied in a state in which the object frame inclusion live view image is displayed on the display 26.

In the example shown in FIG. 16, in a case in which the object frame inclusion live view image is displayed on the display 26, the display control unit 48A4 outputs an object frame display signal indicating the object frame is displayed on the display 26 to the execution unit 48A7. In a case in which the object frame display signal is input from the display control unit 48A4 and an instruction to start the imaging accompanied by the main exposure (hereinafter, also referred to as an "imaging start instruction") is received by the touch panel 28, the execution unit 48A7 executes the specific processing. It should be noted that the imaging start instruction with respect to the touch panel 28 is merely an example, and may be, for example, an operation of setting the "full push state" described above. In addition, here, the specific processing refers to, for example, processing of causing the image sensor 16 to perform the imaging accompanied by the main exposure.

In the example shown in FIG. 16, the form example is shown in which the specific processing is performed by using the imaging start instruction as a trigger, but the technology of the present disclosure is not limited to this. For example, in a case in which the object frame display signal is input from the display control unit 48A4, the execution unit 48A7 executes processing of causing the display 26 to display information indicating that the imaging accompanied by the main exposure is prepared to the user, that is, processing of causing the display 26 to perform display prompting the user to start the imaging accompanied by the main exposure. Specific examples of this processing include processing of causing the display 26 to display a message "Please give the imaging start instruction", a message "Please fully push the release button", or a mark prompting the imaging start instruction (for example, the soft key that receives the imaging start instruction).

It should be noted that, in this case, the display is not limited to the visible display on the display 26, and at least one processing of processing of prompting the user to start the imaging accompanied by the main exposure by outputting sound from a speaker (not shown) or processing of prompting the user to start the imaging accompanied by the main exposure by transmitting vibration of a specific rhythm using a vibrator (not shown) to the user may be performed instead of the visible display on the display 26 or together with the visible display on the display 26.

Next, an action of the imaging apparatus 10 will be described with reference to FIGS. 17 to 20.

Figure 17:
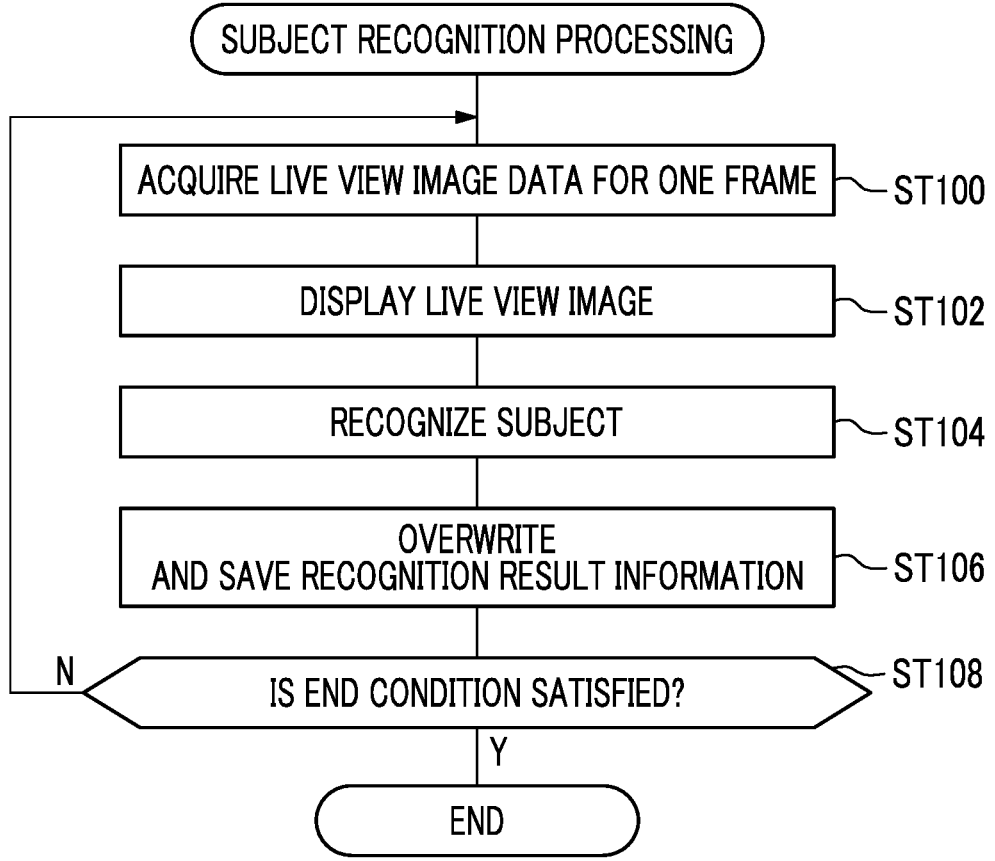
FIG. 17 is a flowchart showing an example of a flow of subject recognition processing.
Figure 18:
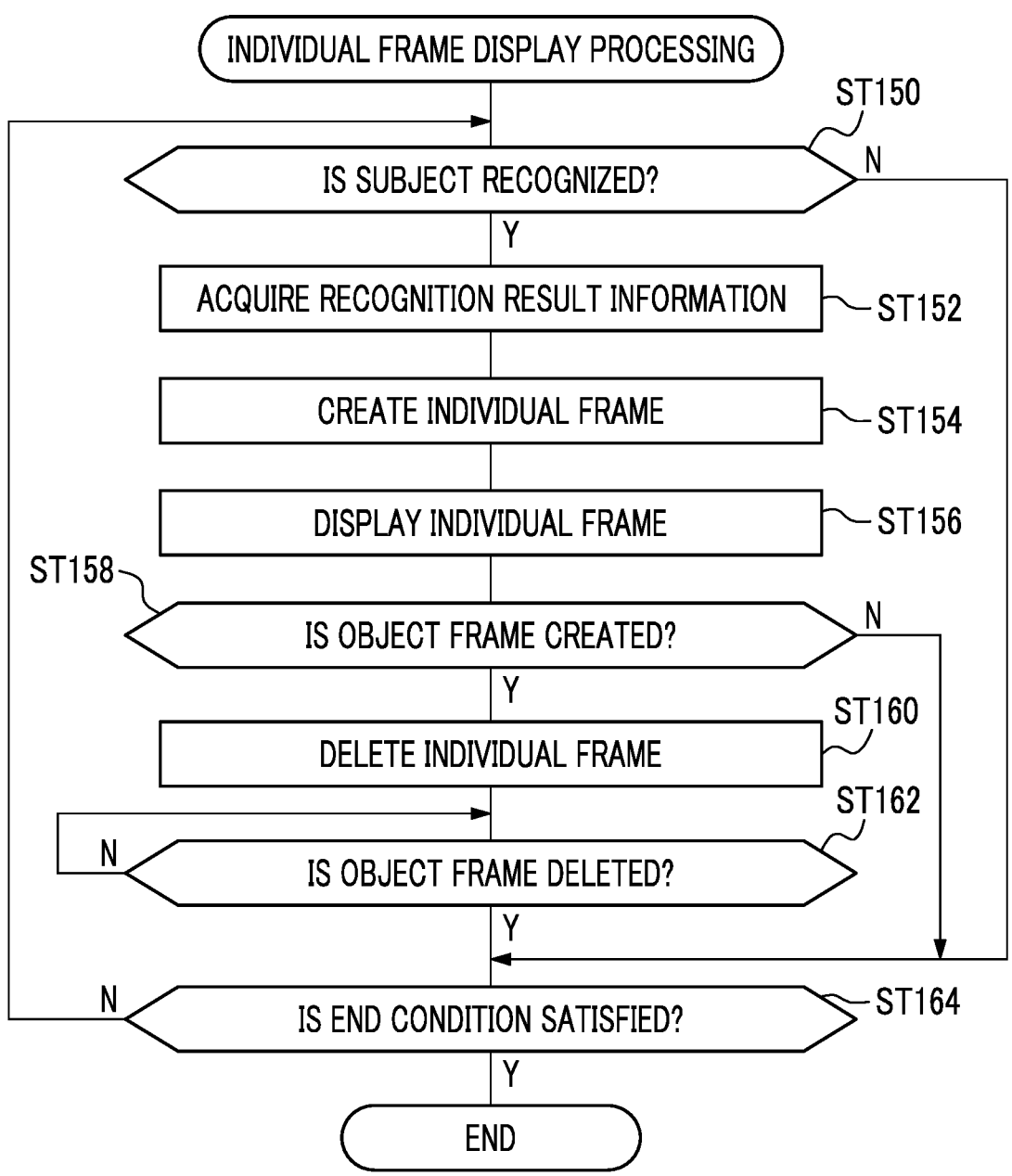
FIG. 18 is a flowchart showing an example of a flow of individual frame display processing.
Figure 19A:
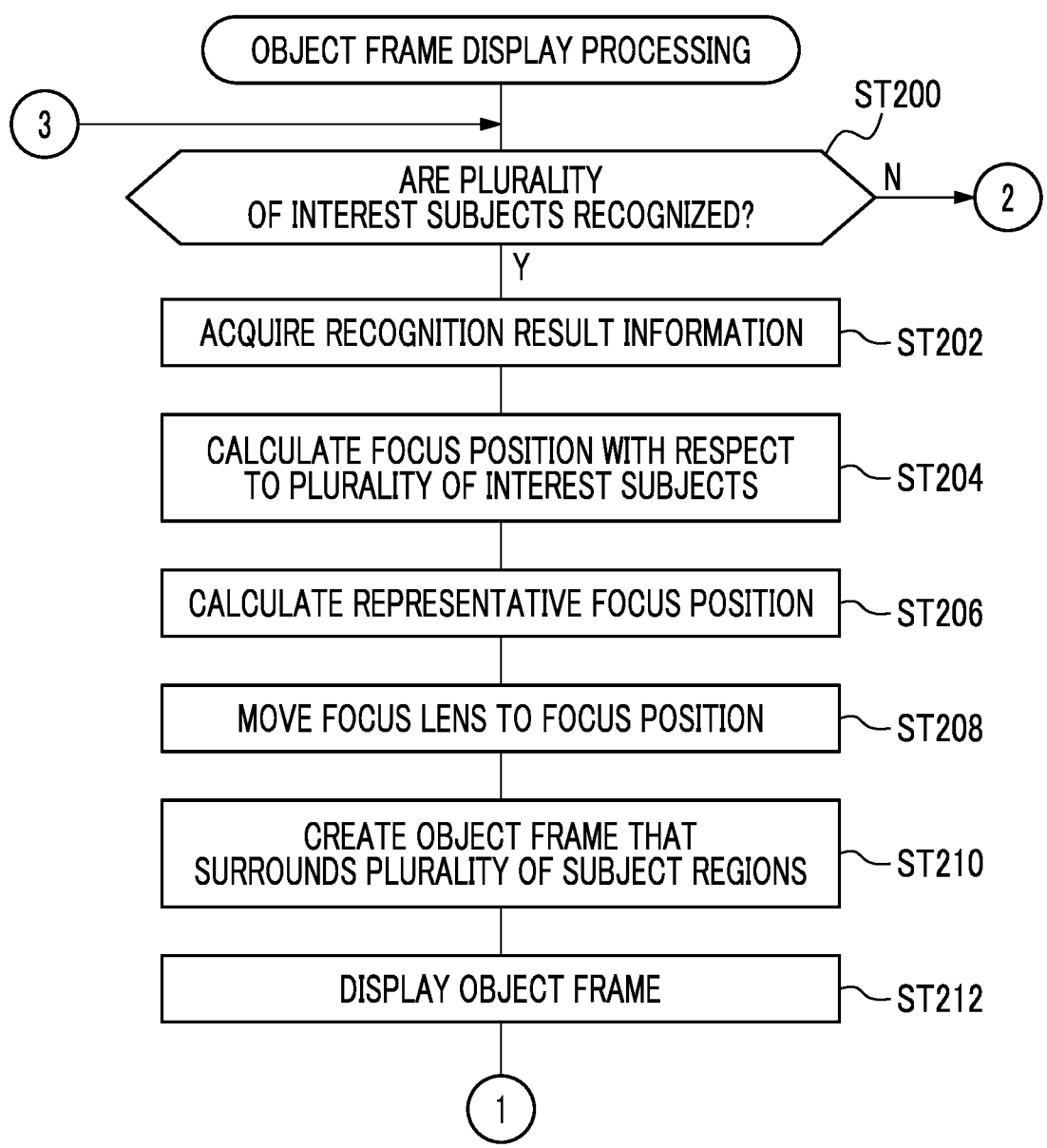
FIG. 19A is a flowchart showing an example of a flow of object frame display processing.
Figure 19B:
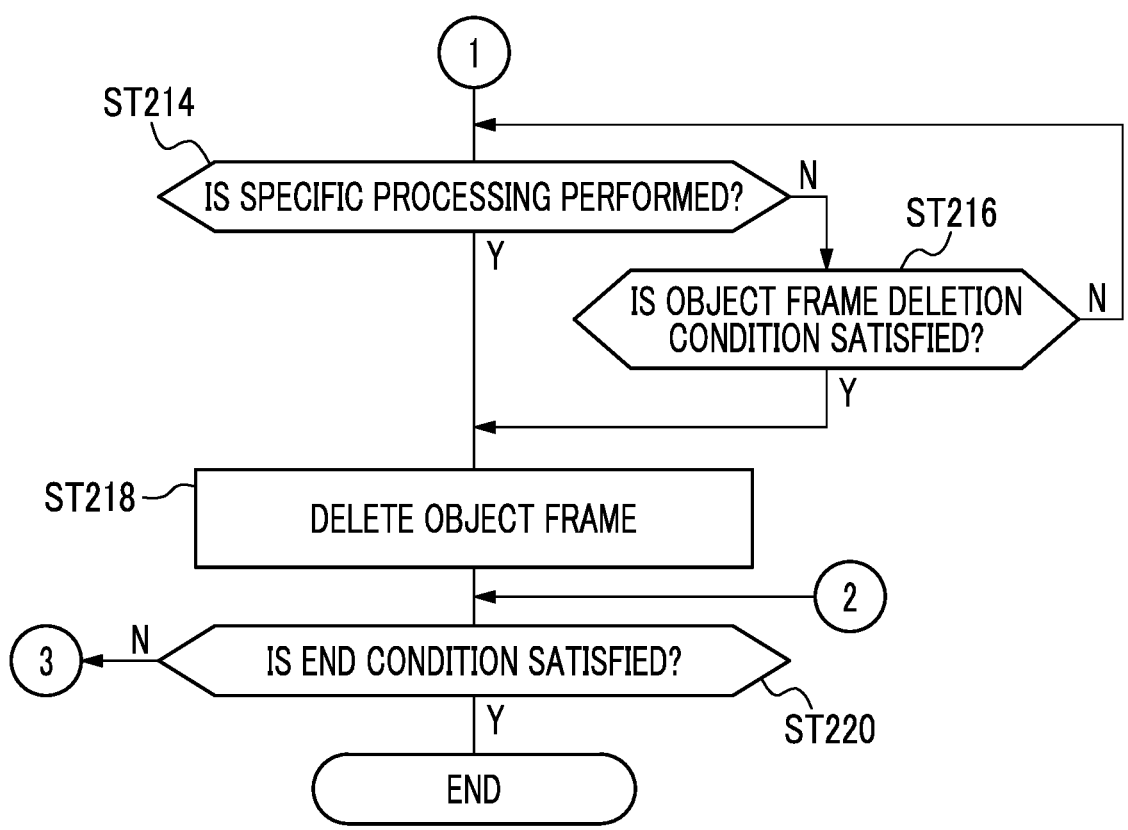
FIG. 19B is a continuation of the flowchart shown in FIG. 19A.
Figure 20:
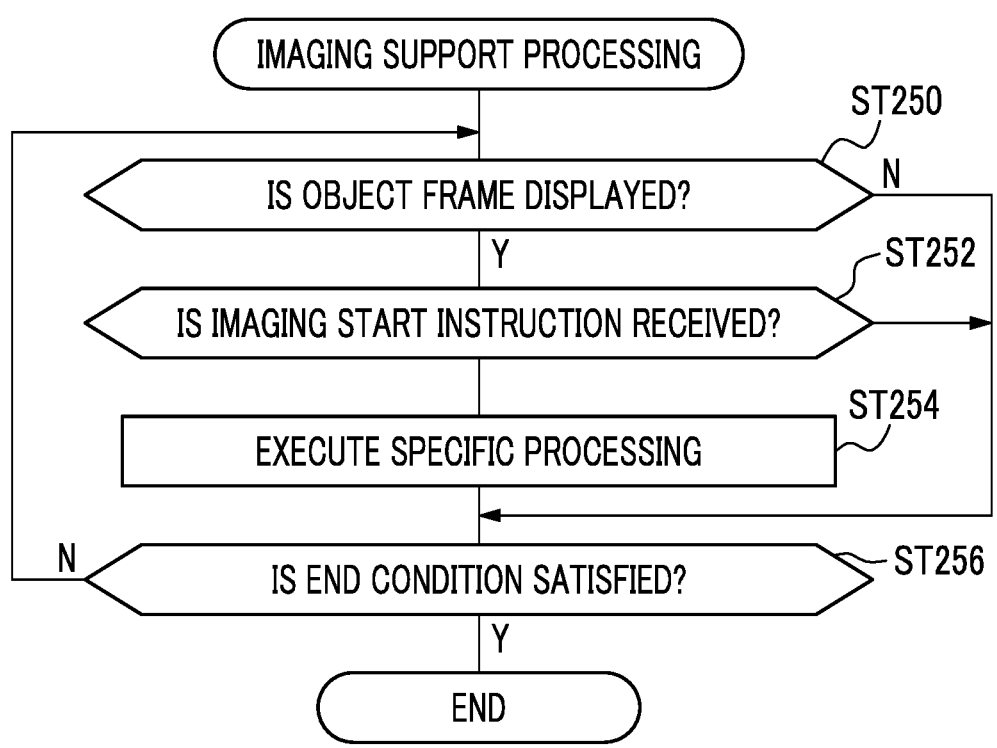
FIG. 20 is a flowchart showing an example of a flow of imaging support processing.

FIG. 17 shows an example of a flow of the subject recognition processing executed by the CPU 48A in a case in which the imaging mode is set for the imaging apparatus 10. FIG. 18 shows an example of a flow of the individual frame display processing executed by the CPU 48A in a case in which the imaging mode is set for the imaging apparatus 10. FIGS. 19A and 19B show an example of a flow of the object frame display processing executed by the CPU 48A in a case in which the imaging mode is set for the imaging apparatus 10. FIG. 20 shows an example of a flow of the imaging support processing executed by the CPU 48A in a case in which the imaging mode is set for the imaging apparatus 10. It should be noted that, in the following description, for convenience of description, the description will be made on the premise that the imaging apparatus 10 performs the imaging for the live view image at the predetermined frame rate.

In the subject recognition processing shown in FIG. 17, first, in step ST100, the acquisition unit 48A1 acquires the live view image data for one frame from the image memory 50.

In next step ST102, the display control unit 48A4 displays the live view image indicated by the live view image data, which is acquired by the acquisition unit 48A1 in step ST100, on the display 26.

In next step ST104, the subject recognition unit 48A2 recognizes the face of the person included in the imaging region as the subject based on the live view image data acquired by the acquisition unit 48A1 in step ST100.

In next step ST106, the subject recognition unit 48A2 overwrites and saves the recognition result information 94 indicating the result of recognizing the face of the person included in the imaging region as the subject in step ST104 in the memory 48C.

In next step ST108, the subject recognition unit 48A2 determines whether or not a condition for ending the subject recognition processing (hereinafter, also referred to as a "subject recognition processing end condition") is satisfied. Examples of the subject recognition processing end condition include a condition that the imaging mode set for the imaging apparatus 10 is released, and a condition that an instruction to end the subject recognition processing is received by the reception device 80. In step ST108, in a case in which the subject recognition processing end condition is not satisfied, a negative determination is made, and the subject recognition processing proceeds to step ST100. In step ST108, in a case in which the subject recognition processing end condition is satisfied, a positive determination is made, and the subject recognition processing ends.

In the individual frame display processing shown in FIG. 18, first, in step ST150, the creation unit 48A3 executes the subject recognition processing shown in FIG. 17 based on the live view image data for one frame to determine whether or not the face of the person included in the imaging region is recognized as the subject. In step ST150, in a case in which the face of the person included in the imaging region is not recognized as the subject, a negative determination is made, and the individual frame display processing proceeds to step ST164. In step ST150, in a case in which the face of the person included in the imaging region is recognized as the subject, a positive determination is made, and the individual frame display processing proceeds to step ST152.

In step ST152, the creation unit 48A3 acquires the latest recognition result information 94 from the memory 48C.

In next step ST154, the creation unit 48A3 creates the individual frame 96 based on the recognition result information 94 acquired in step ST152 to generate the individual frame inclusion live view image data.

In next step ST156, the display control unit 48A4 displays the individual frame inclusion live view image indicated by the individual frame inclusion live view image data on the display 26. That is, the display control unit 48A4 displays the individual frame 96 created in step ST154 on the live view image in a superimposed manner.

In next step ST158, the display control unit 48A4 determines whether or not the object frame 98 is created by executing the processing of step ST210 included in the object frame display processing shown in FIG. 19A. In step ST158, in a case in which the object frame 98 is not created, a negative determination is made, and the individual frame display processing proceeds to step ST164. In a case in which the object frame 98 is created in step ST158, a positive determination is made, and the individual frame display processing proceeds to step ST160.

In step ST160, the display control unit 48A4 deletes the individual frame 96 from the individual frame inclusion live view image.

In next step ST162, the display control unit 48A4 determines whether or not the object frame 98 is deleted by executing the processing of step ST218 included in the object frame display processing shown in FIG. 19B. In a case in which the object frame 98 is not deleted in step ST162, a negative determination is made, and the determination in step ST162 is made again. In a case in which the object frame 98 is deleted in step ST162, a positive determination is made, and the individual frame display processing proceeds to step ST164.

In step ST164, the display control unit 48A4 determines whether or not a condition for ending the individual frame display processing (hereinafter, also referred to as an "individual frame display processing end condition") is satisfied. Examples of the individual frame display processing end condition include a condition that the imaging mode set for the imaging apparatus 10 is released, and a condition that an instruction to end the individual frame display processing is received by the reception device 80. In step ST164, in a case in which the individual frame display processing end condition is not satisfied, a negative determination is made, and the individual frame display processing proceeds to step ST150. In step ST164, in a case in which the individual frame display processing end condition is satisfied, a positive determination is made, and the individual frame display processing ends.

In the object frame display processing shown in FIG. 19A, first, in step ST200, the calculation unit 48A5 executes the subject recognition processing shown in FIG. 17 based on the live view image data for one frame to determine whether or not the plurality of interest faces included in the imaging region are recognized as a plurality of interest subjects. In step ST200, in a case in which the plurality of interest faces included in the imaging region are not recognized as the plurality of interest subjects, a negative determination is made, and the object frame display processing proceeds to step ST220 shown in FIG. 19B. In step ST200, in a case in which the plurality of interest faces included in the imaging region are recognized as the plurality of interest subjects, a positive determination is made, and the object frame display processing proceeds to step ST202.

In step ST202, the calculation unit 48A5 acquires the latest recognition result information 94 from the memory 48C.

In next step ST204, the calculation unit 48A5 calculates the focus position with respect to the plurality of interest faces recognized as the plurality of interest subjects in step ST200.

In next step ST206, the calculation unit 48A5 calculates the representative focus position based on the plurality of focus positions calculated for the plurality of interest faces in step ST204.

In next step ST208, the mechanism control unit 48A6 controls the motor 44 via the motor driver 58 to move the focus lens 40B to the representative focus position calculated in step ST206.

In next step ST210, the creation unit 48A3 specifies the plurality of interest face regions indicating the plurality of interest faces, which are recognized as the plurality of interest subjects, as the plurality of subject regions satisfying the focusing condition. Moreover, the creation unit 48A3 creates the object frame 98 that surrounds the plurality of face regions specified as the plurality of subject regions satisfying the focusing condition. That is, the creation unit 48A3 generates the object frame inclusion live view image data from the individual frame inclusion live view image data.

In next step ST212, the display control unit 48A4 displays the object frame 98, which is created in step ST210, in the live view image. That is, the display control unit 48A4 displays the object frame inclusion live view image, which is indicated by the object frame inclusion live view image data generated in step ST210, on the display 26.

Here, the display control unit 48A4 may entirely or partially change the display aspect of the object frame 98 in accordance with the types of the plurality of subject regions surrounded by the object frame 98, a combination of the plurality of subject regions, and/or the appearance of the plurality of subject regions. In a case in which the display aspect of the object frame 98 is partially changed, the display aspect of only a portion closest to the position of the subject region of a specific type, the positions of the plurality of subject regions of a specific combination, and/or the position of the subject region of a specific appearance among lines constituting the object frame 98 may be changed. Examples of the display aspect of the object frame 98 include a thickness of the frame line of the object frame 98, a color of the frame line, transparency of the frame line, and/or a turning-on-and-off time interval. It should be noted that the technology of entirely or partially changing the display aspect of the object frame 98 in accordance with the types of the plurality of subject regions surrounded by the object frame 98, a combination of the plurality of subject regions, and/or the appearance of the plurality of subject regions can be applied to all of the form examples described below.

In step ST214 shown in FIG. 19B, the display control unit 48A4 determines whether or not the specific processing of step ST254 included in the imaging support processing shown in FIG. 20 is performed. In step ST214, in a case in which the specific processing is not performed, a negative determination is made, and the object frame display processing proceeds to step ST216. In a case in which the specific processing is performed in step ST214, a positive determination is made, and the object frame display processing proceeds to step ST218.

In step ST216, the display control unit 48A4 determines whether or not an object frame deletion condition for deleting the object frame 98 from the object frame inclusion live view image displayed on the display 26 is satisfied. Examples of the object frame deletion condition include a condition that an instruction to delete the object frame 98 from the object frame inclusion live view image is received by the reception device 80, and a condition that a negative determination in step ST214 is repeated a predetermined number of times. In step ST216, in a case in which the object frame deletion condition is not satisfied, a negative determination is made, and the object frame display processing proceeds to step ST214. In step ST216, in a case in which the object frame deletion condition is satisfied, a positive determination is made, and the object frame display processing proceeds to step ST218.

In step ST218, the display control unit 48A4 deletes the object frame 98 from the object frame inclusion live view image displayed on the display 26.

In next step ST220, the display control unit 48A4 determines whether or not a condition for ending the object frame display processing (hereinafter, also referred to as an "object frame display processing end condition") is satisfied. Examples of the object frame display processing end condition include a condition that the imaging mode set for the imaging apparatus 10 is released, and a condition that an instruction to end the object frame display processing is received by the reception device 80. In step ST220, in a case in which the object frame display processing end condition is not satisfied, a negative determination is made, and the object frame display processing proceeds to step ST200 shown in FIG. 19A. In step ST220, in a case in which the object frame display processing end condition is satisfied, a positive determination is made, and the object frame display processing ends.

In the imaging support processing shown in FIG. 20, first, in step ST250, the execution unit 48A7 determines whether or not the object frame 98 is displayed on the display 26. In step ST250, in a case in which the object frame 98 is not displayed on the display 26, a negative determination is made, and the imaging support processing proceeds to step ST256. In step ST250, in a case in which the object frame 98 is displayed on the display 26, a positive determination is made, and the imaging support processing proceeds to step ST252.

In step ST252, the execution unit 48A7 determines whether or not the imaging start instruction is received. In a case in which the imaging start instruction is not received in step ST252, a negative determination is made, and the imaging support processing proceeds to step ST256. In a case in which the imaging start instruction is received in step ST252, a positive determination is made, and the imaging support processing proceeds to step ST254. For example, the imaging start instruction is received by the touch panel 28 or the release button 18.

In step ST254, the execution unit 48A7 executes processing of causing the image sensor 16 to perform the imaging accompanied by the main exposure as the specific processing.

In next step ST256, the execution unit 48A7 determines whether or not a condition for ending the imaging support processing (hereinafter, also referred to as an "imaging support processing end condition") is satisfied. Examples of the imaging support processing end condition include a condition that the imaging mode set for the imaging apparatus 10 is released, and a condition that an instruction to end the imaging support processing is received by the reception device 80. In step ST256, in a case in which the imaging support processing end condition is not satisfied, a negative determination is made, and the imaging support processing proceeds to step ST250. In step ST256, in a case in which the imaging support processing end condition is satisfied, a positive determination is made, and the imaging support processing ends.

As described above, in the imaging apparatus 10 according to the present embodiment, the plurality of subject regions satisfying the predetermined condition are displayed in the live view image in the aspect that is capable of being identified as one object based on the recognition result information 94. Therefore, with the present configuration, it is possible to make it easier to visually grasp a plurality of specific subjects than in a case in which the results of recognizing all the subjects are individually displayed for each of all the subjects. It should be noted that, here, the live view image is described, but the technology of the present disclosure is not limited to this, and a postview image, a still picture, or a video for recording may be used instead of the live view image or together with the live view image.

In addition, in the imaging apparatus 10 according to the present embodiment, the grouped image region 100 in which the plurality of subject regions satisfying the predetermined condition are grouped is displayed in the live view image in the aspect that is capable of being identified as one object. Therefore, with the present configuration, it is possible to make it easier to visually grasp a block of the plurality of specific subjects than in a case in which the plurality of subject regions are not grouped.

In addition, in the imaging apparatus 10 according to the present embodiment, the boundary line indicating the boundary of the grouped image regions 100 is displayed in the live view image, so that the plurality of subject regions are displayed in the live view image in the aspect that is capable of being identified as one object. Therefore, with the present configuration, it is possible to visually grasp the boundary between a region including the plurality of specific subjects and a region other than the region.

In addition, in the imaging apparatus 10 according to the present embodiment, the boundary line indicating the boundary of the grouped image region 100 is the contour line indicating the outer contour of the grouped image region 100. Therefore, with the present configuration, it is possible to visually grasp the boundary between the grouped image region 100 and the other image region.

In addition, in the imaging apparatus 10 according to the present embodiment, the contour line indicating the outer contour of the grouped image region 100 is the object frame 98 that surrounds the plurality of subject regions. Therefore, with the present configuration, it is possible to visually grasp the boundary between the region including the plurality of specific subjects and a region other than the region. It should be noted that the object frame 98 may be a frame that surrounds the plurality of subject regions satisfying a density condition. That is, the object frame 98 may be a frame that surrounds a region (for example, a region corresponding to the grouped image region 100 described above) in which the plurality of subject regions (for example, the plurality of subject regions corresponding to the plurality of subjects recognized by the subject recognition unit 48A2 as a face not wearing a mask) get together with a density exceeding a predetermined density (for example, a density of the subject region per unit area) in the image. In addition, an alert notifying that the density is equal to or larger than the predetermined density may be issued via the speaker or the display (for example, the display 26 and/or a display other than the display 26) while displaying the object frame 98 on the display (for example, the display 26 and/or a display other than the display 26).

In addition, in the imaging apparatus 10 according to the present embodiment, the object frame 98 that surrounds the plurality of subject regions satisfying the predetermined condition are displayed in the live view image, so that the plurality of subject regions are displayed in the live view image in the aspect that is capable of being identified as one object. Therefore, with the present configuration, it is possible to visually grasp a region including the plurality of specific subjects and a region other than the region.

In addition, in the imaging apparatus 10 according to the present embodiment, the plurality of subject regions satisfying the focusing condition are displayed in the live view image in the aspect that is capable of being identified as one object based on the recognition result information 94. Therefore, with the present configuration, it is possible to visually grasp the plurality of subjects on which the focusing is performed and other subjects.

In addition, in the imaging apparatus 10 according to the present embodiment, the specific processing is executed in a case in which the predetermined condition is satisfied in a state in which the live view image is displayed on the display 26. Therefore, with the present configuration, it is possible to suppress the execution of the specific processing at an inappropriate timing as compared with a case in which the specific processing is executed even though the predetermined condition is not satisfied.

In addition, in the imaging apparatus 10 according to the present embodiment, the focusing is performed on a plurality of subjects by moving the focus lens 40B in a direction of the optical axis OA. Therefore, with the present configuration, the plurality of specific subjects can be imaged in an in-focus state.

In addition, in the imaging apparatus 10 according to the present embodiment, the subject included in the subject group is recognized based on the live view image data and the trained model 92. Therefore, with the present configuration, the subject group can be recognized in a shorter time than in a case in which the subject group is recognized only by visual observation.

In addition, in the imaging apparatus 10 according to the present embodiment, the AF calculation is performed to detect the focus on the plurality of subjects, and the focusing is performed based on the detection result of the focus. Therefore, with the present configuration, the focusing can be performed more quickly than with a manual focus.

In addition, in the imaging apparatus 10 according to the present embodiment, the focusing is performed by moving the focus lens 40B to the intermediate position between the close-side focus position and the infinity-side focus position with respect to the plurality of subjects. Therefore, with the present configuration, it is possible to make the user more sharply visually recognize all of the specific plurality of subject regions than in a case in which the focus lens 40B is moved to the close-side focus position or the infinity-side focus position with respect to the plurality of subjects.

In addition, in the imaging apparatus 10 according to the present embodiment, the focusing is performed by moving the focus lens 40B to the focus position at which the plurality of subjects are included within the depth of field. Therefore, with the present configuration, it is possible to make the user more sharply visually recognize all of the specific plurality of subject regions than in a case in which the focus lens 40B is moved to the focus position other than the focus position at which the plurality of subjects are included within the depth of field.

It should be noted that, in the embodiment described above, the object frame 98 is described, but the technology of the present disclosure is not limited to this. For example, in a case in which only one of two division regions obtained by dividing the live view image into two regions includes the plurality of face regions satisfying the focusing condition, the boundary line indicating the boundary between the two division regions may be displayed in the live view image in a visually recognizable aspect. In this case, it is possible to make the user recognize that any one of the two division regions includes the plurality of face regions satisfying the focusing condition. Here, two divisions are described, but this is merely an example, and the number of divisions may be three or more. In this case as well, the boundary line indicating the boundary between the division regions need only be displayed in the live view image in a visually recognizable aspect.

In addition, in a case in which only one of the two division regions obtained by dividing the live view image into two regions includes the plurality of face regions satisfying the focusing condition, the contrast of one of the two division regions may be made be lower than the contrast of the other to display one of the two division regions in a more enhanced state than other. Here, two divisions are described, but this is merely an example, and the number of divisions may be three or more. In this case as well, the contrasts need only be made different at a visually recognizable level between one or more division regions in which the plurality of face regions satisfying the focusing condition are included and other division regions. In addition, the method of making the contrast different for each division region is merely an example, and the image region in which the plurality of face regions satisfying the focusing condition are one object and other image regions need only be displayed in the live view image in a visually recognizable aspect.

In addition, in the embodiment described above, the plurality of interest face regions satisfying the focusing condition are grouped as one object, but the technology of the present disclosure is not limited to this. For example, even in a case in which the focusing condition is not satisfied, on a condition that the plurality of interest subjects (for example, the plurality of interest faces) are recognized by the subject recognition unit 48A2, the plurality of interest subject regions indicating the plurality of interest subjects recognized by the subject recognition unit 48A2 may be grouped as one object.

Figure 21:
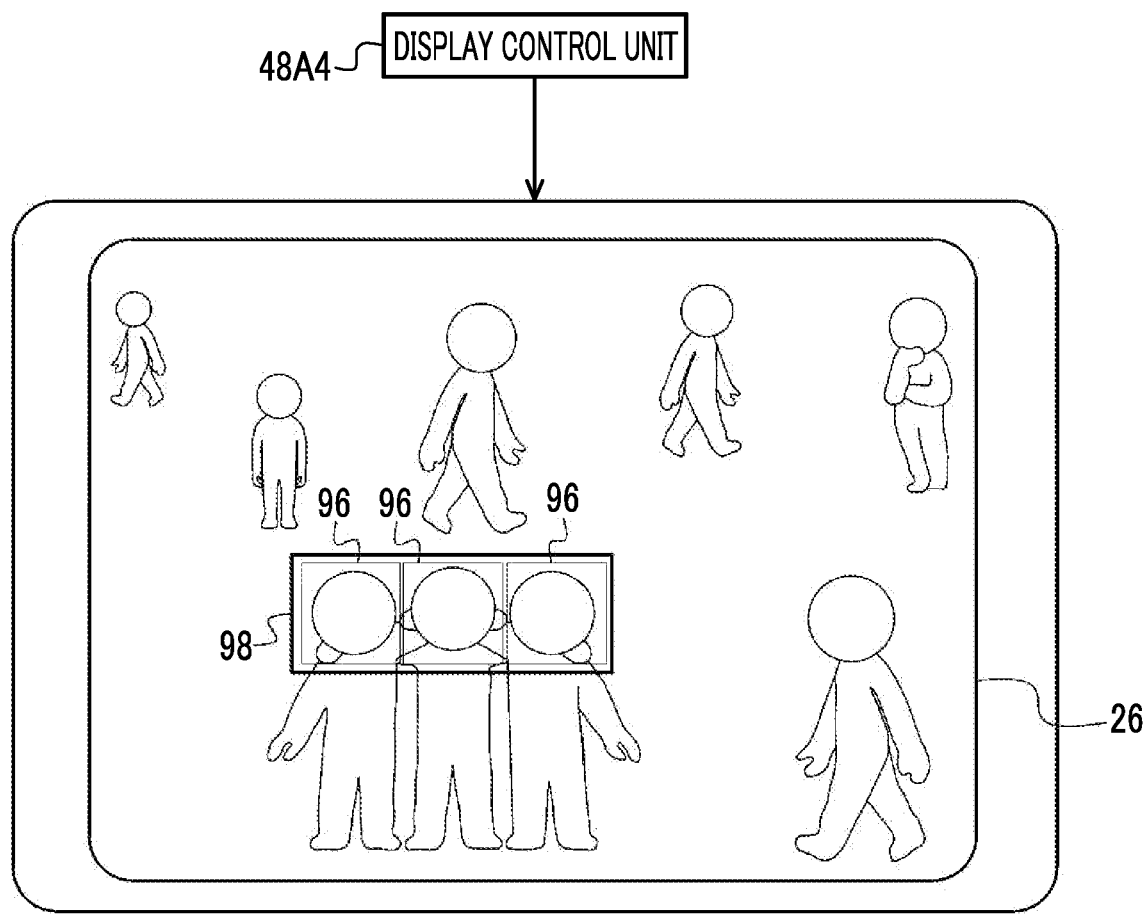
FIG. 21 is a screen view showing an example of an aspect in which individual frames are displayed in an object frame.

In the embodiment described above, the form example has been described in which the individual frame 96 is not displayed in the object frame inclusion live view image, but the technology of the present disclosure is not limited to this. For example, as shown in FIG. 21, the display control unit 48A4 may display the individual frame 96 in the object frame inclusion live view image. In the example shown in FIG. 21, the individual frame 96 that surrounds each of the plurality of face regions (three face regions in the example shown in FIG. 21) is shown in the object frame 98. As described above, with the present configuration, since the plurality of individual frames 96 that individually surround the plurality of face regions satisfying the predetermined condition and the object frame 98 are displayed in the live view image, a relationship between the block of the plurality of specific subjects and each of the plurality of specific subjects can be visually grasped.

In the embodiment described above, the form example has been described in which the object frame 98 is created for the grouped image region 100 in which the plurality of face regions satisfying the focusing condition are grouped, but the technology of the present disclosure is not limited to this, and the object frame 98 may be created after the plurality of face regions satisfying the focusing condition are further narrowed down. For example, the object frame 98 may be created for the grouped image region 100 in which the plurality of face regions satisfying the focusing condition and satisfying a subject size condition are grouped. Here, the subject size condition refers to a condition that the degree of difference in a size between the plurality of subject regions is within a predetermined range. Here, a size of the face frame is used as the size of the subject region. In addition, examples of the sizes of the plurality of subject regions include the sizes of the plurality of face regions satisfying the focusing condition, but the technology of the present disclosure is not limited to this, and the sizes of the plurality of face regions that do not satisfy the focusing condition may be used.

Figure 22:
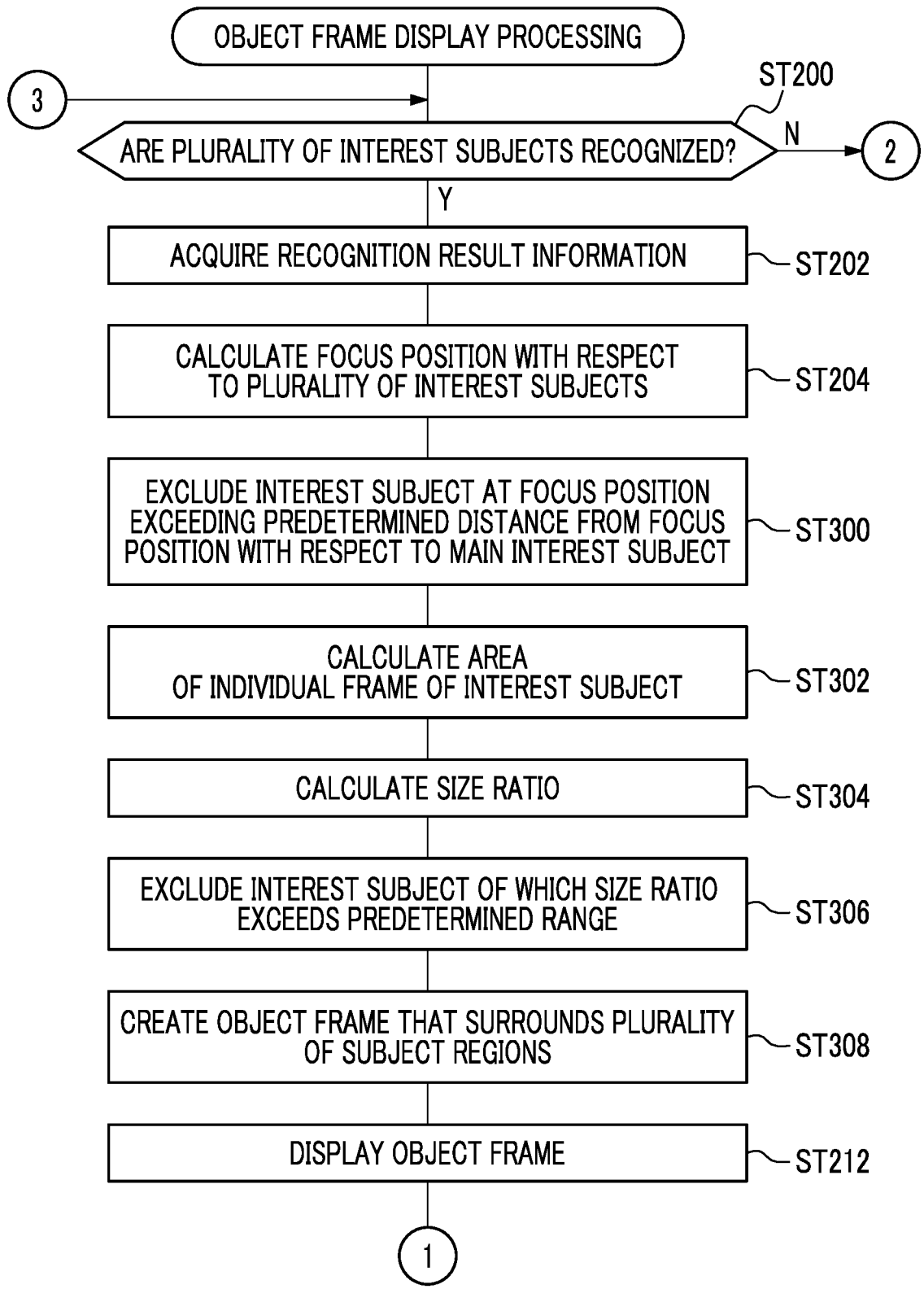
FIG. 22 is a flowchart showing a first modification example of the flow of the object frame display processing.

In a case in which the object frame 98 is created for the grouped image region 100 in which the plurality of face regions satisfying the focusing condition and satisfying the subject size condition are grouped, for example, the object frame display processing shown in FIG. 22 is executed by the CPU 48A. The flowchart shown in FIG. 22 is different from the flowchart shown in FIG. 19A in that steps ST300 to ST308 are provided instead of steps ST206 to ST210. Therefore, here, only a part of the object frame display processing shown in FIG. 22 that is different from the object frame display processing shown in FIG. 19A will be described. It should be noted that, here, for convenience of description, the description will be made on the premise that the plurality of face regions satisfying the focusing condition and satisfying the subject size condition remain (plurality of face regions remain in a case in which the processing of step ST306 is executed).

In the object frame display processing shown in FIG. 22, in step ST300, the calculation unit 48A5 excludes the interest subject at the focus position exceeding a predetermined distance from the focus position with respect to a main interest subject from the plurality of interest subjects for which the focus position is calculated. That is, the calculation unit 48A5 excludes the interest face for which the focus position exceeding the predetermined distance is calculated from the focus position calculated with respect to the main interest face (for example, the face of "Taro Fuji" shown in FIG. 15) from the plurality of interest faces for which the focus position is calculated. The predetermined distance may be a fixed value or may be a variable value that is changed in accordance with the instruction received by the reception device 80 or a given condition (for example, an imaging condition).

In next step ST302, the calculation unit 48A5 calculates the area of the face frame of each of the plurality of interest subjects remaining after the exclusion in step ST300, that is, the area of the face frame of each of the plurality of interest faces remaining after the exclusion in step ST300.

In next step ST304, the calculation unit 48A5 calculates a size ratio of the face frame between the plurality of interest faces. The size ratio of the face frame is the calculation result in step ST302, that is, a ratio of the area of the face frame between the plurality of interest faces (for example, a ratio of the area of the face frame corresponding to one interest face of two interest faces, which are to be compared, to the area of the face frame corresponding to the other interest face). It should be noted that, the ratio of the area of the face frame between the plurality of interest faces is the ratio of a "degree of difference in a size between the plurality of subject regions" and a "ratio of the sizes of the face frames between the plurality of subject regions" according to the technology of the present disclosure.

In next step ST306, the calculation unit 48A5 excludes the interest subject of which the size ratio calculated in step ST304 exceeds the predetermined range from the plurality of interest subjects remaining after the exclusion in step ST300. That is, the calculation unit 48A5 excludes the interest face surrounded by the face frame of which the size ratio calculated in ST304 exceeds the predetermined range from the plurality of interest faces remaining after the exclusion in step ST300. Here, the predetermined range is determined in accordance with the size ratio of the face frame between the plurality of interest faces. That is, the predetermined range is different for each size ratio of the face frame between the plurality of interest faces. It should be noted that the predetermined range is not limited to this, and the predetermined range may be a fixed value or may be a variable value that is changed in accordance with the instruction received by the reception device 80 or the given condition (for example, the imaging condition).

In next step ST308, the creation unit 48A3 specifies the plurality of interest subject regions indicating the plurality of interest subjects remaining after the exclusion in step ST306 as the plurality of interest subject regions satisfying the focusing condition and satisfying the subject size condition. That is, the creation unit 48A3 specifies the plurality of interest face regions indicating the plurality of interest faces remaining after the exclusion in step ST306 as the plurality of interest face regions satisfying the focusing condition and satisfying the subject size condition. Moreover, the creation unit 48A3 creates the object frame 98 that surrounds, as one object, the plurality of interest face regions specified as the plurality of interest subject regions satisfying the focusing condition and satisfying the subject size condition.

As described above, by executing the object frame display processing shown in FIG. 22, the plurality of subject regions in which the degree of difference in the size between the plurality of subject regions (for example, the degree of difference in the size of the face frame) is within the predetermined range are displayed on the display in the aspect that is capable of being identified as one object, and thus the subject which is not intended by the user can be prevented from being included in the group of the plurality of specific subjects intended by the user.

In addition, since the predetermined range varies depending on the size ratio of the face frame between the plurality of subject regions, it is possible to make the accuracy of preventing the subject which is not intended by the user from being included in the group of the plurality of specific subjects intended by the user higher than in a case in which the predetermined range is always a fixed range.

Figure 23:
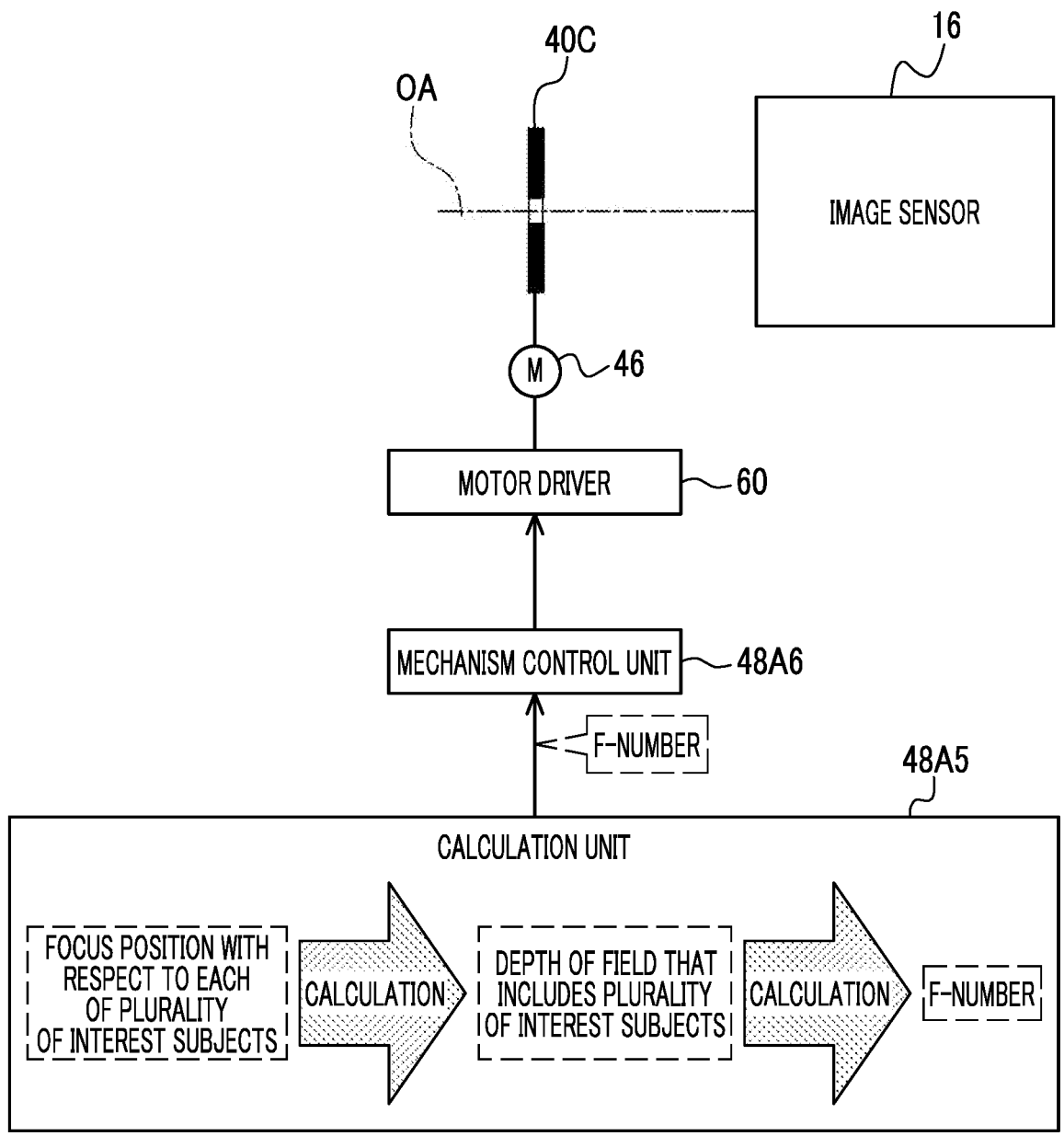
FIG. 23 is a conceptual diagram showing an example of processing contents in which a depth of field is controlled by operating a stop.

In the embodiment described above, the form example has been described in which the focus position for each of the plurality of interest subjects that are included within the predetermined depth of field is calculated by the calculation unit 48A5, but the technology of the present disclosure is not limited to this. For example, the mechanism control unit 48A6 may operate the stop 40C to include a plurality of interest subjects within the depth of field. In this case, as an example, as shown in FIG. 23, the calculation unit 48A5 calculates the focus position for each of the plurality of interest subjects, that is, the focus position for each of the plurality of interest faces. Next, the calculation unit 48A5 calculates the depth of field in which the plurality of interest subjects are included, based on the plurality of focus positions calculated for the plurality of interest subjects. That is, the calculation unit 48A5 calculates the depth of field in which the plurality of interest faces are included, based on the plurality of focus positions calculated for the plurality of interest faces.

The calculation unit 48A5 calculates the depth of field by using a first calculation expression. The first calculation expression used here is, for example, a calculation expression in which the focus position on the closest side and the focus position on the infinity side among the plurality of focus positions are used as independent variables and a value indicating the depth of field is used as a dependent variable. It should be noted that, instead of the first calculation expression, the calculation unit 48A5 may use a first table in which the focus position on the closest side, the focus position on the infinity side, and the value indicating the depth of field are associated with each other.

The calculation unit 48A5 calculates an F-number for realizing the calculated depth of field. The calculation unit 48A5 calculates the F-number by using a second calculation expression. The second calculation expression used here is, for example, a calculation expression in which the value indicating the depth of field is used as an independent variable and the F-number is used as a dependent variable. It should be noted that, instead of the second calculation expression, the calculation unit 48A5 may use a second table in which the value indicating the depth of field and the F-number are associated with each other.

The mechanism control unit 48A6 operates the stop 40C by controlling the motor 46 via the motor driver 60 in accordance with the F-number calculated by the calculation unit 48A5.

Figure 24:
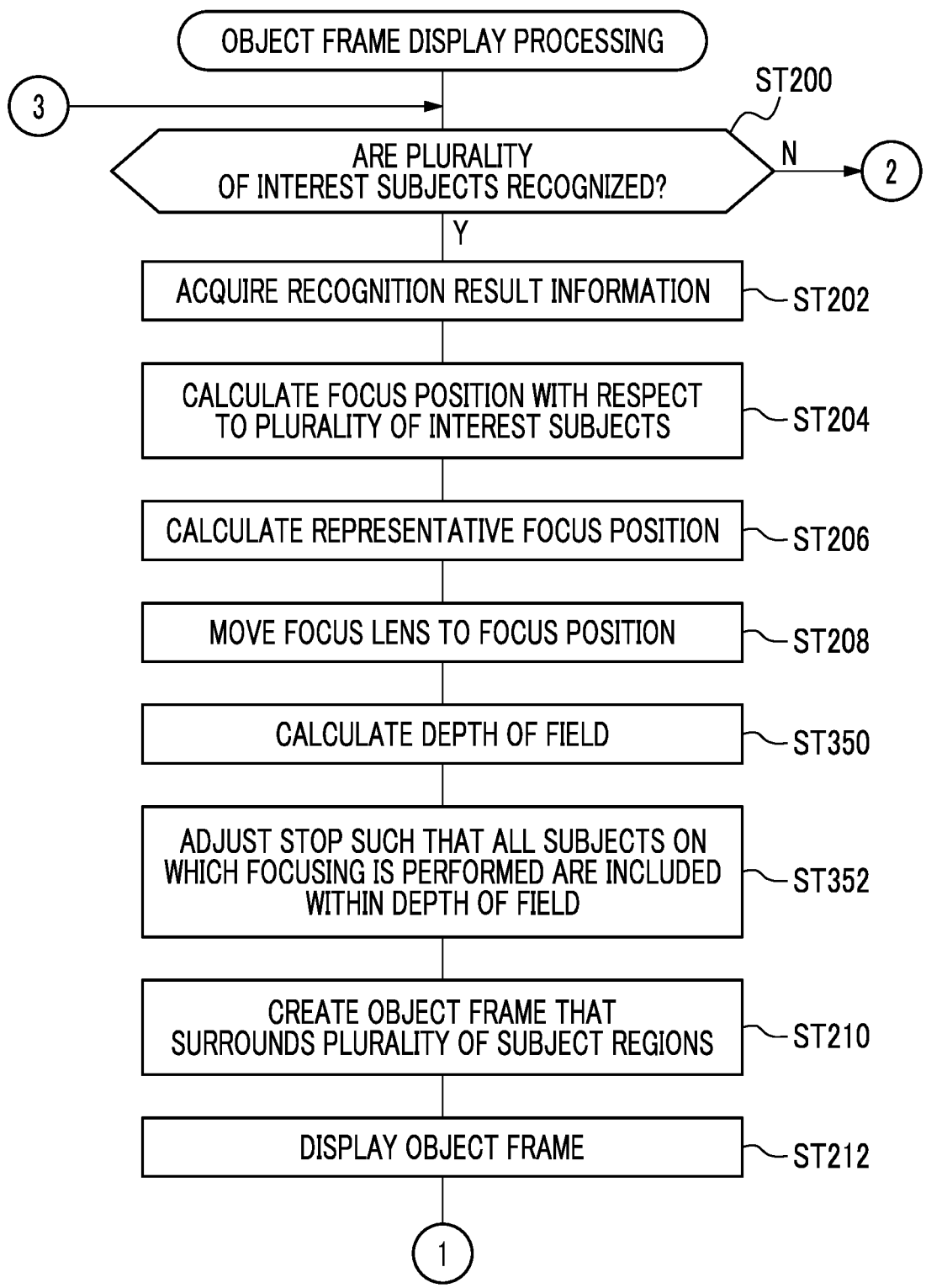
FIG. 24 is a flowchart showing a second modification example of the flow of the object frame display processing.

In a case in which the plurality of interest subjects are included within the depth of field, for example, the object frame display processing shown in FIG. 24 is executed by the CPU 48A. The flowchart shown in FIG. 24 is different from the flowchart shown in FIG. 19A in that step ST350 and step ST352 are provided between step ST208 and step ST210. Therefore, here, only a part of the object frame display processing shown in FIG. 24 that is different from the object frame display processing shown in FIG. 19A will be described.

In step ST350 shown in FIG. 24, the calculation unit 48A5 calculates the depth of field in which the plurality of interest faces are included as the depth of field in which the plurality of interest subjects are included, based on the plurality of focus positions calculated in step ST204.

In next step ST352, the mechanism control unit 48A6 adjusts the stop 40C to include all the subjects on which the focusing is performed (for example, the plurality of interest subjects for which the focus position is calculated in step ST204) within the depth of field calculated in step ST350.

As described above, since the plurality of subjects are included within the depth of field by operating the stop 40C, it is possible to more easily include the plurality of specific subjects within the depth of field than in a case in which the stop 40C is not provided.

In the embodiment described above, the form example has been described in which the individual frame 96 is displayed on the display 26 earlier than the display of the object frame 98 on the display 26, but the technology of the present disclosure is not limited to this, and the object frame 98 may be displayed on the display 26 earlier than the individual frame 96. For example, the display control unit 48A4 may display the object frame 98 earlier than the individual frame 96 in the live view image in a case in which the imaging mode of the imaging apparatus 10 is activated.

Figure 25:
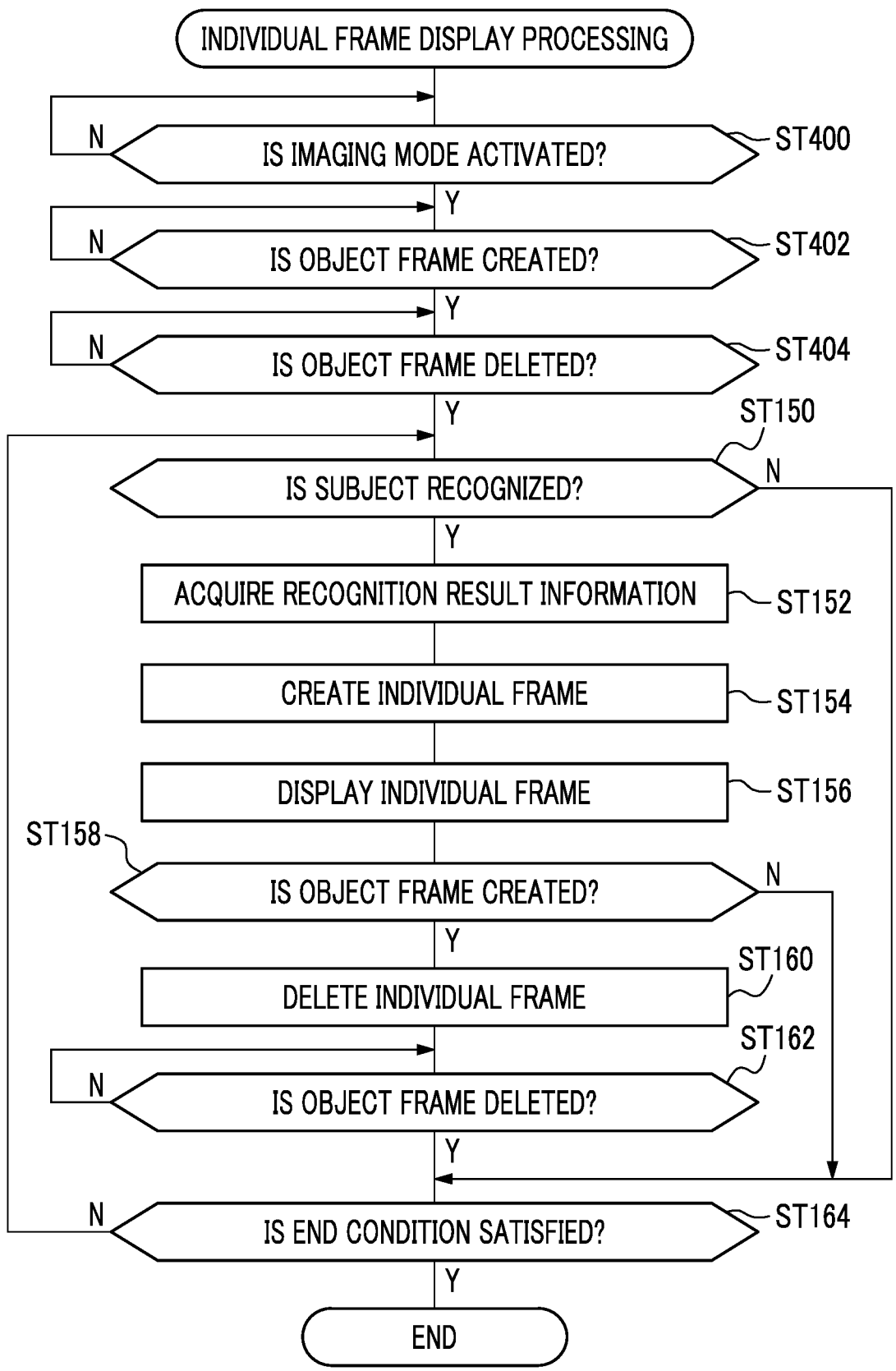
FIG. 25 is a flowchart showing a first modification example of the flow of the individual frame display processing.

In this case, for example, the individual frame display processing shown in FIG. 25 is executed by the CPU 48A. The flowchart shown in FIG. 25 is different from the flowchart shown in FIG. 18 in that steps ST400 to ST404 are provided as steps prior to step ST150. Therefore, here, only a part of the individual frame display processing shown in FIG. 25 that is different from the individual frame display processing shown in FIG. 18 will be described.

In the individual frame display processing shown in FIG. 25, in step ST400, the display control unit 48A4 determines whether or not the imaging mode of the imaging apparatus 10 is activated. In step ST400, in a case in which the imaging mode of the imaging apparatus 10 is not activated, a negative determination is made, and the determination in step ST400 is made again. In a case in which the imaging mode of the imaging apparatus 10 is activated in step ST400, a positive determination is made, and the individual frame display processing proceeds to step ST402.

In step ST402, the display control unit 48A4 determines whether or not the object frame 98 is created by executing the object frame display processing. In a case in which the object frame 98 is not created in step ST402, a negative determination is made, and the determination in step ST402 is made again. In a case in which the object frame 98 is created in step ST402, a positive determination is made, and the individual frame display processing proceeds to step ST404.

In step ST404, the display control unit 48A4 determines whether or not the object frame 98 is deleted by executing the object frame display processing. In a case in which the object frame 98 is not deleted in step ST404, a negative determination is made, and the determination in step ST404 is made again. In a case in which the object frame 98 is deleted in step ST404, a positive determination is made, and the individual frame display processing proceeds to step ST150.

As described above, by executing the individual frame display processing shown in FIG. 25, the object frame 98 is displayed earlier than the individual frame 96 in the live view image in a case in which the imaging mode of the imaging apparatus 10 is activated, so that it is possible to visually grasp the grouping of the plurality of specific subjects in a case in which the imaging mode of the imaging apparatus 10 is activated.

In the embodiment described above, the form example has been described in which the plurality of interest face regions are surrounded by the object frame 98 as one object in a case in which the focusing condition is satisfied, but the technology of the present disclosure is not limited to this, and the plurality of interest face regions may be surrounded by the object frame 98 as one object in a case in which the predetermined condition other than the focusing condition is satisfied.

Figure 26:
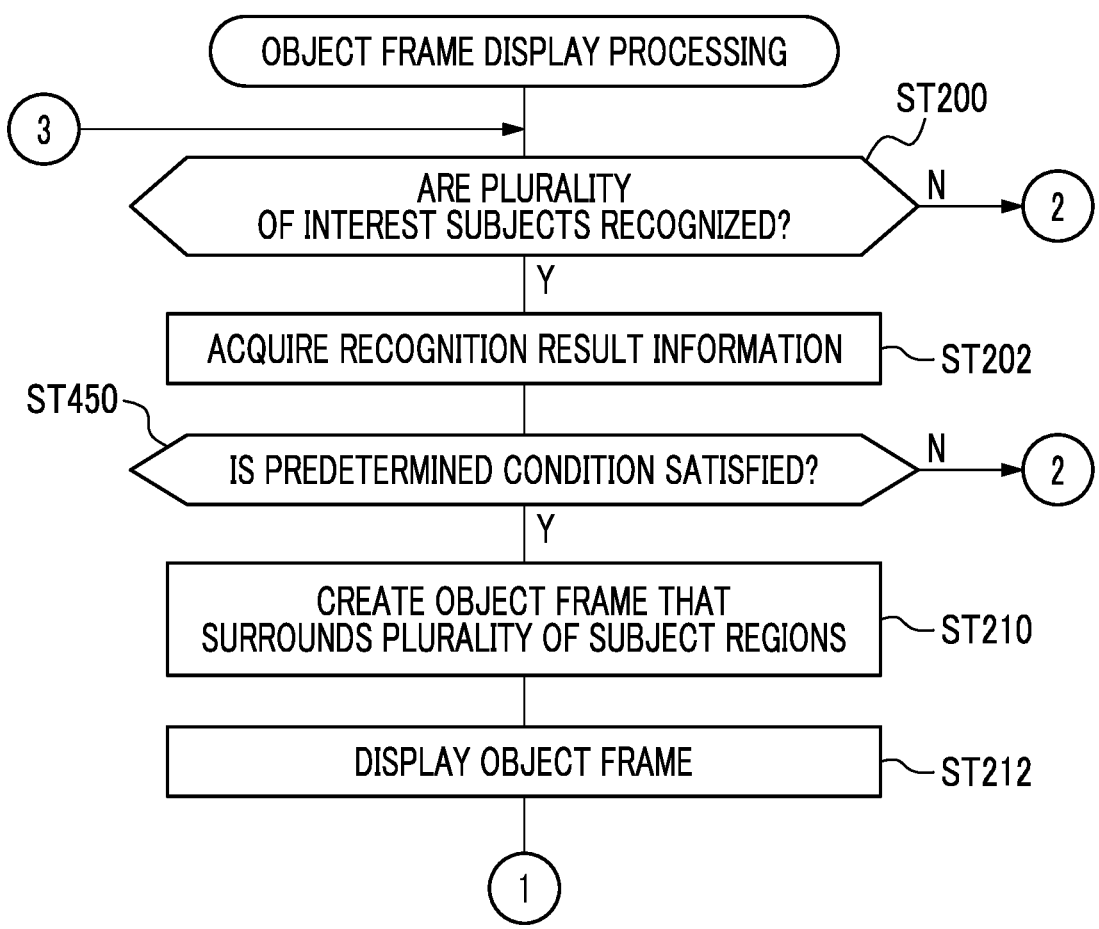
FIG. 26 is a flowchart showing a third modification example of the flow of the object frame display processing.

In this case, for example, the object frame display processing shown in FIG. 26 is executed by the CPU 48A. The flowchart shown in FIG. 26 is different from the flowchart shown in FIG. 19A in that step ST450 is provided instead of steps ST204 to ST208. In step ST450, the CPU 48A determines whether or not the predetermined condition is satisfied. In step ST450, in a case in which the predetermined condition is not satisfied, a negative determination is made, and the object frame display processing proceeds to step ST220 shown in FIG. 19B. In step ST450, in a case in which the predetermined condition is satisfied, a positive determination is made, and the object frame display processing proceeds to step ST210. In the following, various conditions that can be used as the predetermined condition in step ST450 will be described. It should be noted that, it is also possible to apply a combination of at least two of the various conditions described below, the focusing condition described above, or the subject size condition described above as the predetermined condition in step ST450.

Examples of the condition that can be used as the predetermined condition in step ST450 include a close-side focusing condition. The close-side focusing condition is a condition that the focusing is performed on the close side with respect to the predetermined depth of field. The focusing on the close side with respect to the predetermined depth of field is also referred to as soft focus.

Figure 27:
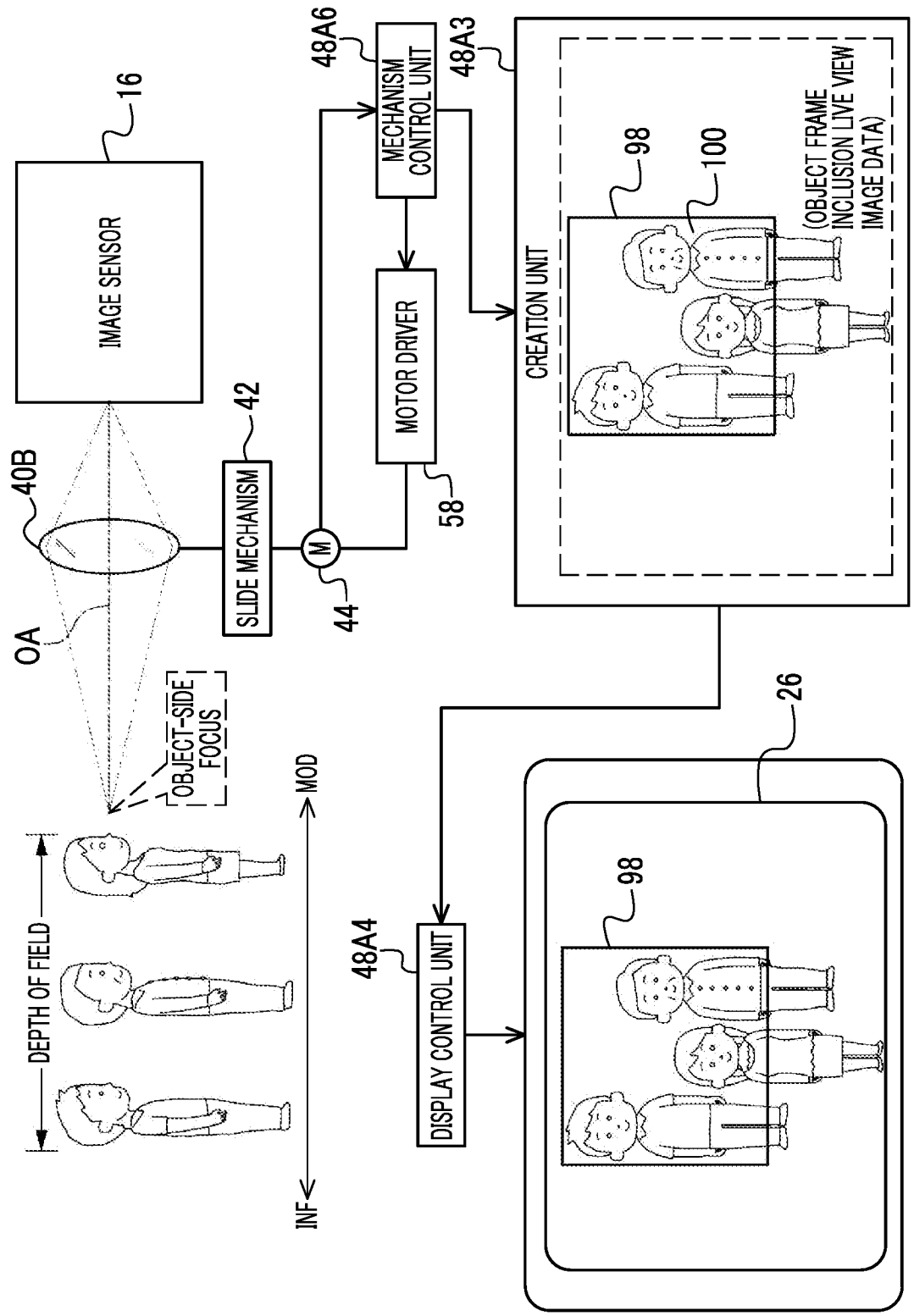
FIG. 27 is a conceptual diagram used for describing a close-side focusing condition.

In a case in which the focusing is performed on the close side with respect to the predetermined depth of field, as an example, as shown in FIG. 27, the mechanism control unit 48A6 controls the motor 44 via the motor driver 58 to move the focus lens 40B to position an object-side focus on the close side with respect to the predetermined depth of field. In the example shown in FIG. 27, three persons are included within the predetermined depth of field as the plurality of interest subjects, and the object-side focus is positioned on the focus lens 40B side with respect to the person who is closest to the focus lens 40B among the three persons. In this case, the close-side focusing condition is satisfied, and the creation unit 48A3 generates the object frame inclusion live view image data by creating the object frame 98 that surrounds the grouped image region 100 obtained by grouping three face regions indicating the faces of the three persons included within the predetermined depth of field. The display control unit 48A4 displays the object frame inclusion live view image indicated by the object frame inclusion live view image data generated by the creation unit 48A3 on the display 26.

In the example shown in FIG. 27, by using the close-side focusing condition as the predetermined condition in step ST450, it is possible to make the sharpness of the subject region indicating the subject included within the predetermined depth of field weaker than in a case in which the focusing is always performed within the predetermined depth of field. In this case, the sharpness is decreased as the distance from the position of the object-side focus is increased in the subject region, and for example, the sharpness is decreased in the order of the person in the lower center, the person in the right of the center, and the person in the upper left of the center in the front view of the display 26. The order of the sharpness can be optionally or selectively changed by changing the position of the object-side focus. Therefore, it may be possible to change the order of the sharpness by receiving input for changing the position of the object-side focus.

Examples of the condition that can be used as the predetermined condition in step ST450 include the subject size condition described above. In the example shown in FIG. 22, the form example has been shown in which the subject size condition is used together with the focusing condition, but the subject size condition may be separated from the focusing condition and used as an independent condition. In this case, for example, as shown in FIG. 28, the calculation unit 48A5 calculates the sizes (for example, areas) of all the individual frames 96 included in the individual frame inclusion live view image data. Moreover, the calculation unit 48A5 specifies the face region in which the degree of difference in the size between the individual frames 96 is within the predetermined range. In the example shown in FIG. 28, four face regions are specified as face regions in which the degree of difference in the size between the individual frames 96 is within the predetermined range. The display control unit 48A4 displays the live view image on which the object frame 98 that surrounds the four face regions specified by the calculation unit 48A5 is superimposed, as the object frame inclusion live view image on the display 26.

As described above, in the example shown in FIG. 28, since the subject size condition is used as the predetermined condition in step ST450, the subject which is not intended by the user can be prevented from being included in the group of the plurality of specific subjects intended by the user. It should be noted that, in the example shown in FIG. 28 or other embodiments, the subject determined to be out of the condition may be acceptable in the object frame 98. For example, in a case in which a certain mode (such as an out-of-condition subject addition mode) is set, a function of, in a case in which an area of the subject determined to be out of the condition is touched, generating the object frame 98 including the touched subject may be added. In addition, in a case in which a subject in the object frame 98 is touched, the object frame 98 that does not include the subject may be generated.

Examples of the condition that can be used as the predetermined condition in step ST450 include a subject interval condition. The subject interval condition is a condition that the interval between the plurality of subjects (example of a "second interval" according to the technology of the present disclosure) is smaller than a predetermined interval (an example of a "second predetermined interval" according to the technology of the present disclosure). The predetermined interval may be a fixed value or may be a variable value that is changed in accordance with the instruction received by the reception device 80 or the given condition (for example, the imaging condition).

Figure 29:
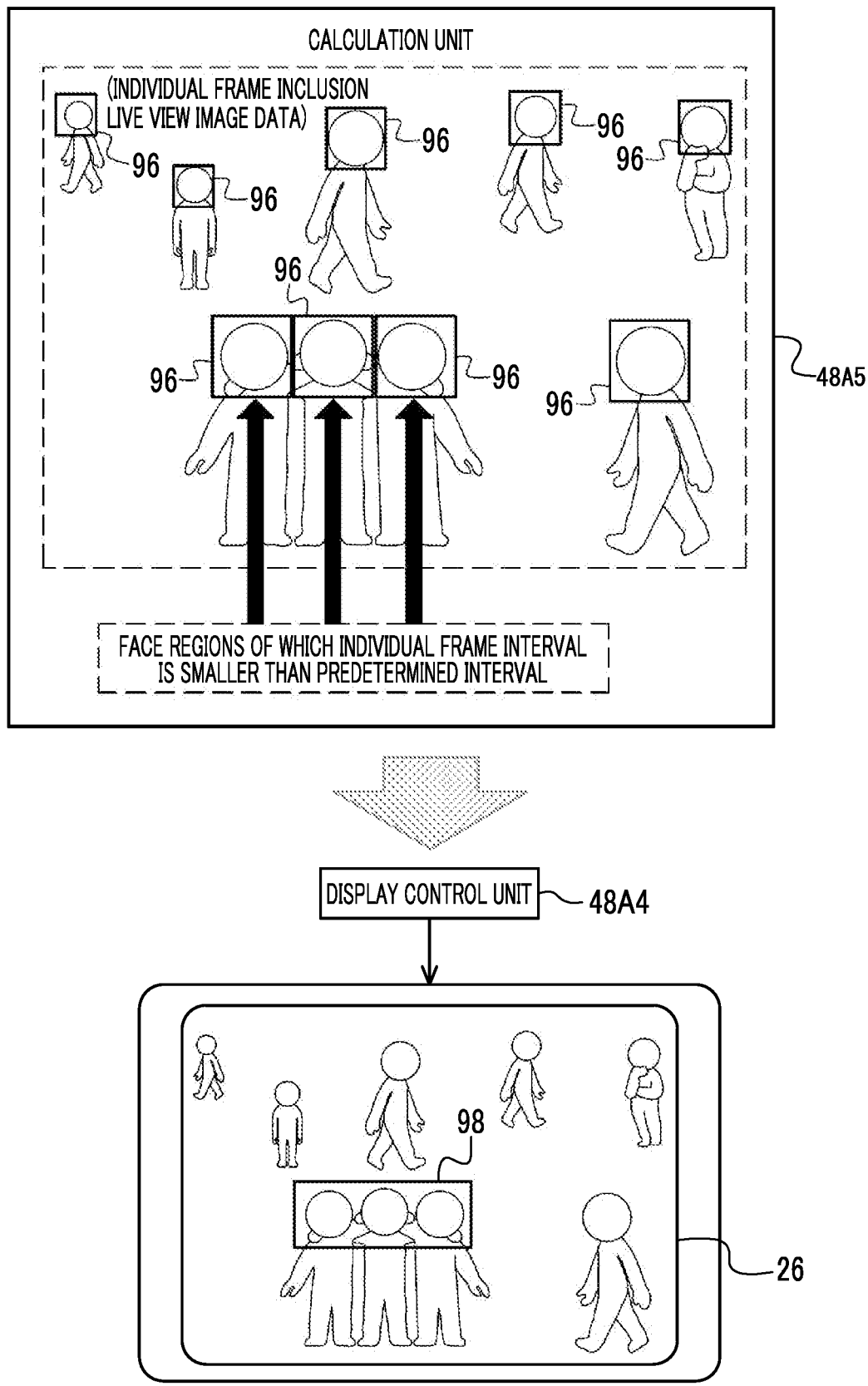
FIG. 29 is a conceptual diagram used for describing a subject interval condition.

In a case in which the subject interval condition is used as the predetermined condition in step ST450, for example, as shown in FIG. 29, the calculation unit 48A5 calculates the interval between all the individual frames 96 included in the individual frame inclusion live view image data (hereinafter, also referred to as an "individual frame interval"). Moreover, the calculation unit 48A5 specifies the face regions surrounded by the individual frames 96 having a relationship in which the individual frame interval is smaller than the predetermined interval. In the example shown in FIG. 29, three face regions are specified as the face regions surrounded by individual frames 96 having the relationship in which the individual frame interval is smaller than the predetermined interval. The display control unit 48A4 displays the live view image on which the object frame 98 that surrounds the three face regions specified by the calculation unit 48A5 is superimposed, as the object frame inclusion live view image on the display 26.

As described above, since the subject interval condition is used as the predetermined condition in step ST450, the subject which is not intended by the user can be prevented from being included in the group of the plurality of specific subjects intended by the user.

Examples of the condition that can be used as the predetermined condition in step ST450 include a gesture common condition. The gesture common condition is a condition that gestures expressed by the plurality of subject regions are common.

Figure 30:
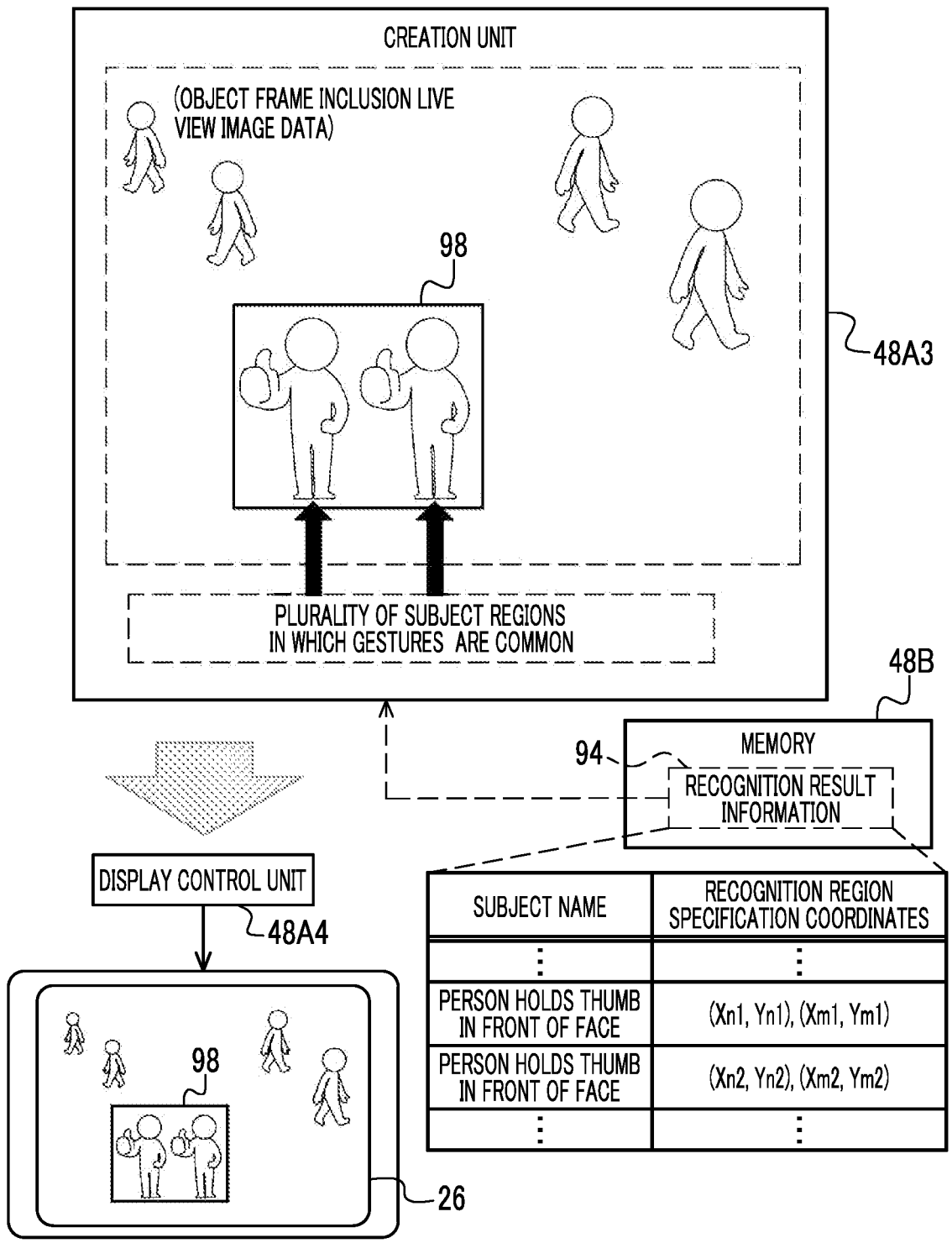
FIG. 30 is a conceptual diagram used for describing a gesture common condition.

In a case in which the gesture common condition is used as the predetermined condition in step ST450, the creation unit 48A3 specifies the plurality of subject regions in which the gestures are common, from the live view image data (for example, the individual frame inclusion live view image data) based on the recognition result information 94. For example, as shown in FIG. 30, the recognition result information 94 used here includes information that the subject name is "person holds a thumb in front of the face". That is, the creation unit 48A3 specifies the subject region indicating the person performing the gesture of "holding a thumb in front of the face" from the live view image data with reference to the recognition result information 94. It should be noted that the gesture of "holding a thumb in front of the face" is merely an example, and the gesture includes, for example, an act of "jumping" and a pose of "raising both arms".

The creation unit 48A3 generates the object frame inclusion live view image data by creating the object frame 98 that surrounds the plurality of subject regions in which the gestures are common as one object. Moreover, the display control unit 48A4 displays the object frame inclusion live view image indicated by the object frame inclusion live view image data generated by the creation unit 48A3 on the display 26. That is, the display control unit 48A4 displays the live view image on which the object frame 98 that surrounds the plurality of subject regions in which the gestures are common as one object is superimposed, as the object frame inclusion live view image on the display 26.

As described above, since the gesture common condition is used as the predetermined condition in step ST450, the subject which is not intended by the user can be prevented from being included in the group of the plurality of specific subjects intended by the user.

In the embodiment described above, the form example has been described in which the object frame 98 is displayed in accordance with the outer contour of the grouped image region 100 from the beginning without a sign operation in a case in which the grouped image region 100 is determined, but the technology of the present disclosure is not limited to this, and the position of the object frame 98 may be confirmed in the live view image after the sign operation is inserted. In this case, for example, as shown in FIG. 31, the display control unit 48A4 creates the object frame 98 by dynamically changing the size of the frame from the outside of the outer contour of the grouped image region 100 to the outer contour of the grouped image region 100 in the live view image. In addition, the display control unit 48A4 may create the object frame 98 by dynamically changing the size of the frame from the inside of the outer contour of the grouped image region 100 to the outer contour of the grouped image region 100 in the live view image.

As described above, since the object frame 98 is created by dynamically changing the size of the frame from the outside or the inside of the outer contour of the grouped image region 100 to the outer contour of the grouped image region 100 in the live view image, it is possible to more easily grasp the position of the object frame 98 than in a case in which the object frame 98 is suddenly fitted to the outer contour of the grouped image region 100 without the sign operation.

Examples of the condition that can be used as the predetermined condition in step ST450 include a movement direction same condition. The movement direction same condition is a condition that the movement directions of the plurality of subject regions are the same. In a case in which the movement direction same condition is used as the predetermined condition in step ST450, the creation unit 48A3 specifies the plurality of subject regions in which the movement directions are the same, from the live view image data (for example, the individual frame inclusion live view image data) based on the recognition result information 94 described above. The movement direction of the subject region is specified, for example, by calculating a movement vector by the creation unit 48A3 using the recognition result information 94.

Figure 32:
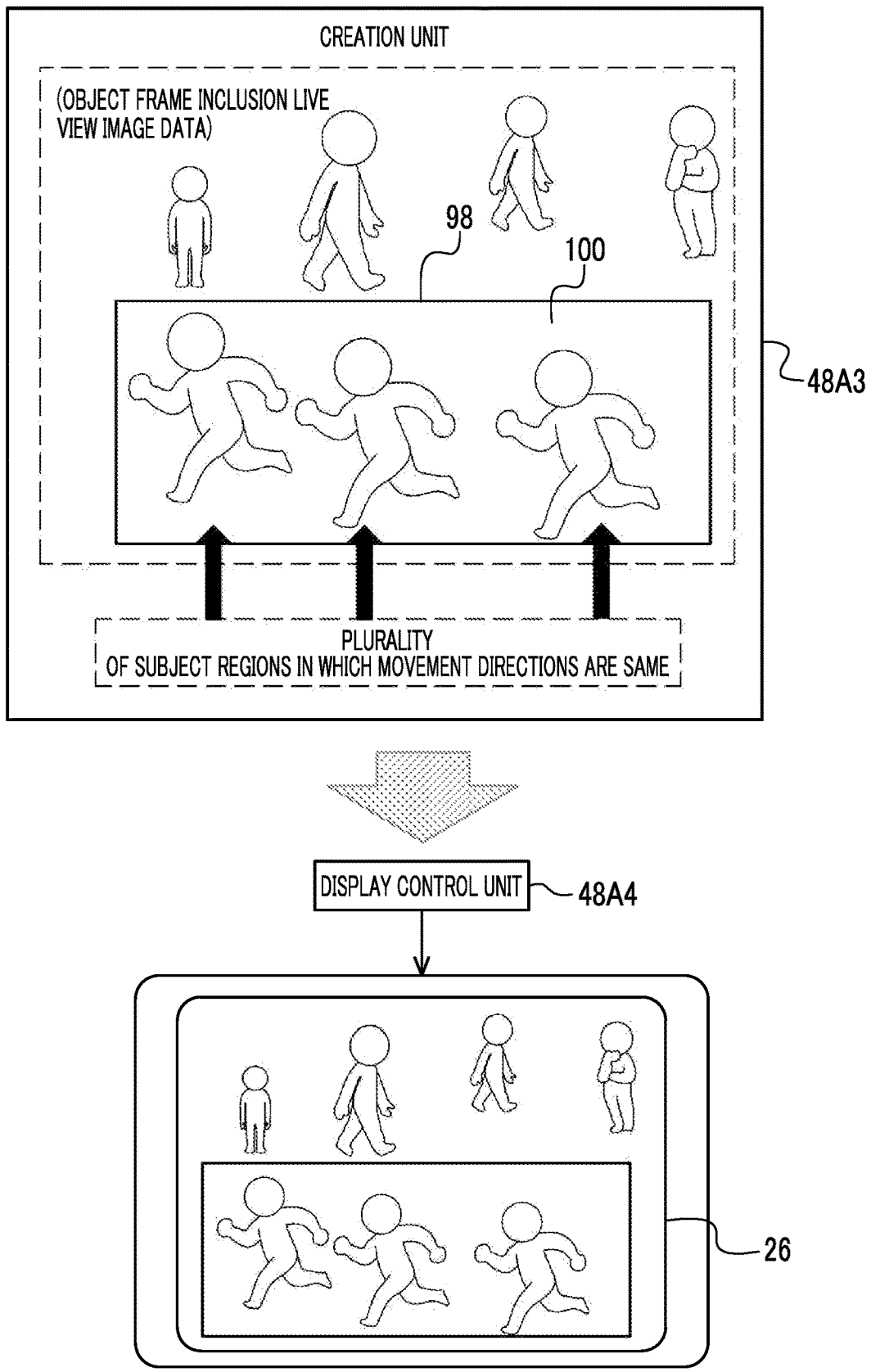
FIG. 32 is a conceptual diagram used for describing a movement direction same condition.

As an example, as shown in FIG. 32, the creation unit 48A3 groups the plurality of subject regions in which the movement directions are the same as one object and creates the contour line indicating the outer contour of the grouped image region 100 obtained by grouping as the object frame 98 to generate the object frame inclusion live view image data. Moreover, the display control unit 48A4 displays the object frame inclusion live view image indicated by the object frame inclusion live view image data generated by the creation unit 48A3 on the display 26. That is, the display control unit 48A4 displays the live view image on which the object frame 98 that surrounds the plurality of subject regions in which the movement directions are the same as one object is superimposed, as the object frame inclusion live view image on the display 26.

As described above, since the movement direction same condition is used as the predetermined condition in step ST450, the subject which is not intended by the user can be prevented from being included in the group of the plurality of specific subjects intended by the user.

It should be noted that the display control unit 48A4 may change the display aspect of the object frame 98 in accordance with the movement directions of the plurality of subject regions, the movement speeds of the plurality of subject regions (for example, an average movement speed), and/or the interval between the plurality of subject regions. Examples of the display aspect of the object frame 98 include a thickness of the frame line of the object frame 98, a color of the frame line, transparency of the frame line, and/or a turning-on-and-off time interval.

Examples of the condition that can be used as the predetermined condition in step ST450 include an individual subject region interval condition. The individual subject region interval condition is a condition that an interval (example of a "third interval" according to the technology of the present disclosure) between a first individual subject region indicating a first individual subject in the subject group in the live view image and a second individual subject region indicating a second individual subject is within a predetermined interval (example of a "third predetermined interval" according to the technology of the present disclosure).

Figure 33:
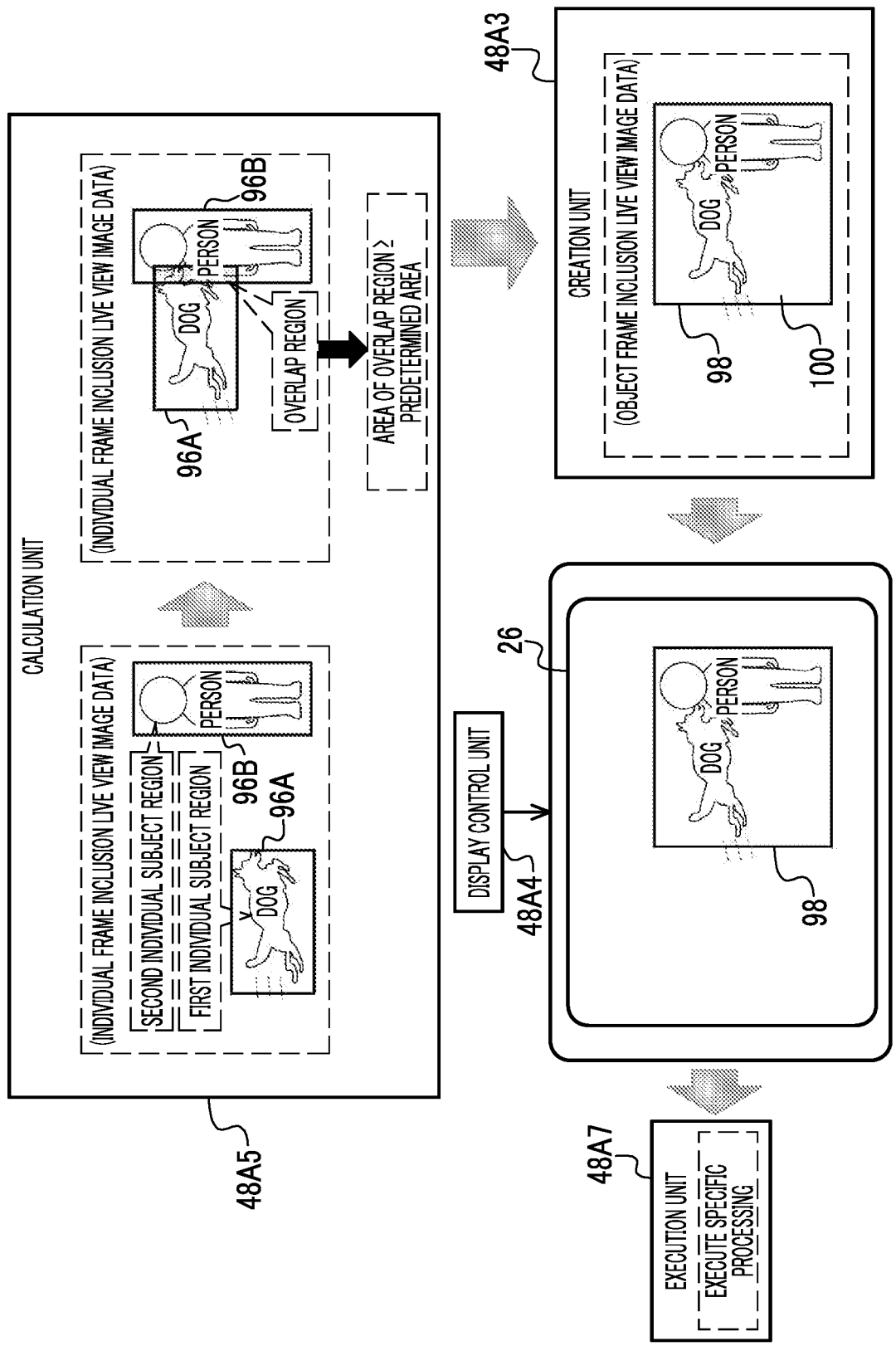
FIG. 33 is a conceptual diagram used for describing an individual subject region interval condition.

The individual subject region interval condition is used as the condition that can be used as the predetermined condition in step ST450, as an example, as shown in FIG. 33, the calculation unit 48A5 specifies the first individual subject region and the second individual subject region based on the recognition result information 94. In the example shown in FIG. 33, an image region indicating a dog is shown as the first individual subject region, and an image region indicating a person is shown as the second individual subject region. It should be noted that this is merely an example, and the first individual subject region and the second individual subject region may be any image region that can be specified as the image region indicating the subject based on the recognition result information 94.

In addition, in the example shown in FIG. 33, a first individual frame 96A that surrounds the first individual subject region and a second individual frame 96B that surrounds the second individual subject region are shown. The first individual frame 96A is a rectangle frame that surrounds the first individual subject region as one object (in the example shown in FIG. 33, an object in the rectangle region), and the second individual frame 96B is a rectangle frame that surrounds the second individual subject region as one object (in the example shown in FIG. 33, an object in the rectangle region). The first individual frame 96A and the second individual frame 96B are displayed in the live view image by the display control unit 48A4 in the same manner as the individual frame inclusion live view image described above. Here, the display in the live view image means, for example, that the display on the display 26 in a state of being superimposed on the live view image.

The calculation unit 48A5 calculates an area of an overlap region (hereinafter, also simply referred to as an "overlap region") between the first individual frame 96A and the second individual frame 96B. Moreover, the calculation unit 48A5 determines whether or not the calculated area is equal to or larger than a predetermined area to determine whether or not the interval between the first individual subject region and the second individual subject region is within the predetermined interval. The predetermined area may be a fixed value or may be a variable value that is changed in accordance with the instruction received by the reception device 80 or the given condition (for example, the imaging condition).

In the example shown in FIG. 33, in a case in which the dog as the first individual subject indicated by the first individual subject region jumps into contact with the person as the second individual subject indicated by the second individual subject region, the area of the overlap region is equal to or larger than the predetermined area. In a case in which the area of the overlap region is equal to or larger than the predetermined area, the interval between the first individual frame subject region and the second individual frame subject region is within the predetermined interval. It should be noted that, here, the form example is described in which the overlap area is calculated, but the technology of the present disclosure is not limited to this, and the interval between the first individual subject region and the second individual subject region may be calculated to determine a magnitude relationship between the calculated interval and the predetermined interval.

In a case in which the area of the overlap region is equal to or larger than the predetermined area, the creation unit 48A3 groups the first individual subject region and the second individual subject region as one object (in the example shown in FIG. 33, the object is the rectangle region). The creation unit 48A3 generates the object frame inclusion live view image data by creating the outer contour line indicating the outer contour of the grouped image region 100 obtained by grouping as the object frame 98. Moreover, the display control unit 48A4 displays the object frame inclusion live view image indicated by the object frame inclusion live view image data generated by the creation unit 48A3 on the display 26. That is, the display control unit 48A4 displays the live view image on which the object frame 98 that surrounds the first individual subject region and the second individual subject region as one object is superimposed, as the object frame inclusion live view image on the display 26.

In addition, the execution unit 48A7 executes the specific processing described above in a case in which the individual subject region interval condition is satisfied. In the example shown in FIG. 33, the specific processing is executed by the execution unit 48A7 on a condition that the object frame 98 is displayed on the display 26 by the display control unit 48A4.

As described above, in the example shown in FIG. 33, since the individual subject region interval condition is used as the predetermined condition in step ST450 and the specific processing is executed in a case in which the individual subject region interval condition is satisfied, it is possible to make the accuracy of executing the specific processing at a timing at which the interval between the first individual subject and the second individual subject is the interval intended by the user higher than in a case in which the specific processing is executed after the user determines the interval between the first individual subject and the second individual subject by visual observation.

In addition, in the example shown in FIG. 33, since a determination is made that the individual subject region interval condition is satisfied in a case in which the area of the overlap region is equal to or larger than the predetermined area, it is possible to make the accuracy of executing the specific processing at a timing at which the area of the overlap region between the first individual frame 96A and the second individual frame 96B is the area intended by the user higher than in a case in which the specific processing is executed after the user determines the area of the overlap region between the first individual frame 96A and the second individual frame 96B by visual observation.

In the embodiment described above, the display aspect (for example, the shape) of the object frame 98 is fixed regardless of the subject distance, but the technology of the present disclosure is not limited to this, and the display control unit 48A4 may change the display aspect of the object frame 98 in accordance with the subject distance acquired for each of the plurality of subjects.

Figure 34:
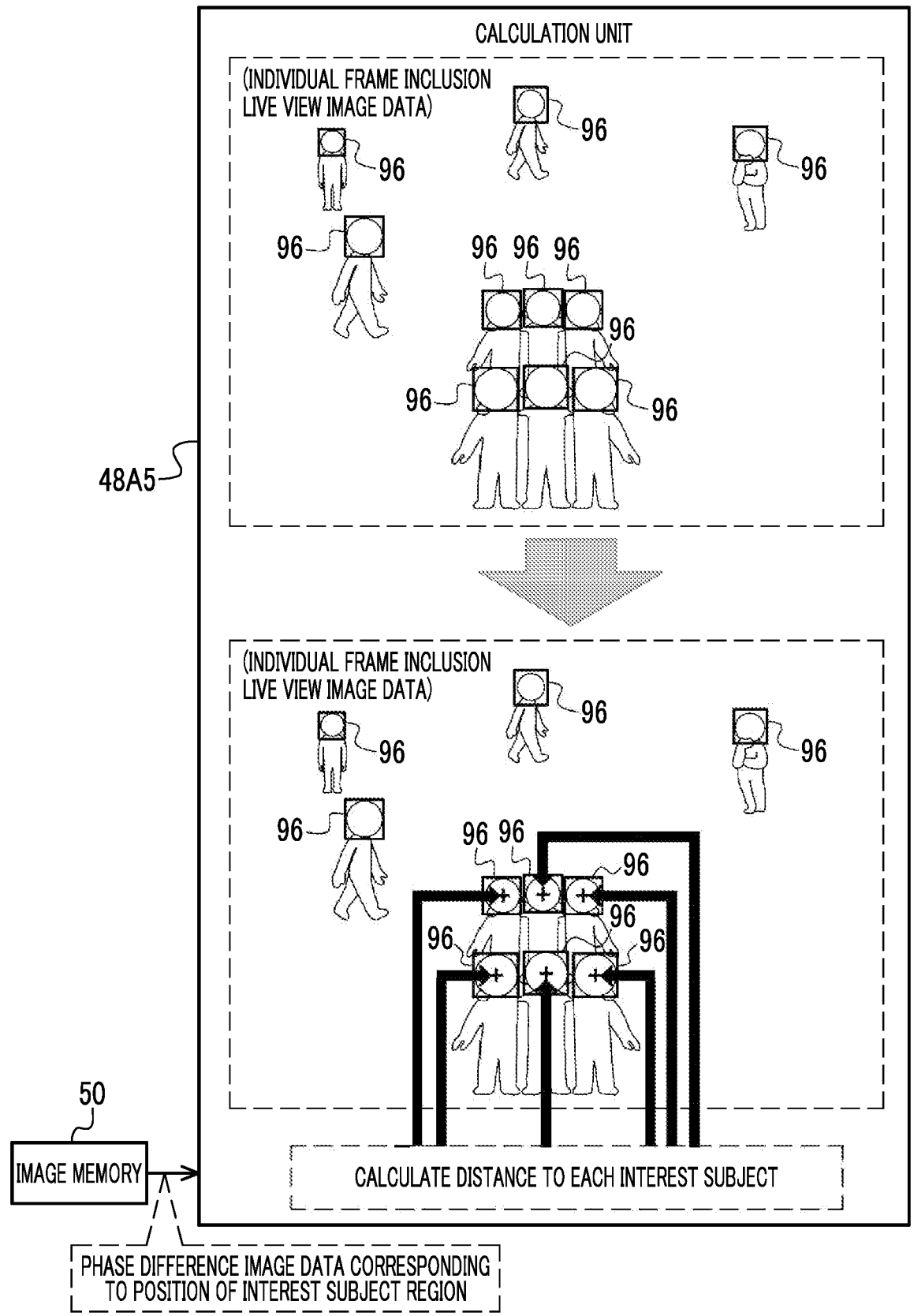
FIG. 34 is a conceptual diagram showing an example of processing contents for calculating a subject distance to each of a plurality of subjects.

In this case, as an example, as shown in FIG. 34, the calculation unit 48A5 specifies the plurality of interest subject regions (in the example shown in FIG. 34, the plurality of interest face regions) from the individual frame inclusion live view image data with reference to the recognition result information 94 described above. The calculation unit 48A5 acquires the distance (subject distance) to each of the plurality of interest subjects indicated by the specified plurality of interest subject regions. In this case, first, the calculation unit 48A5 acquires the phase difference image data corresponding to the position of each of the specified plurality of interest subject regions from the image memory 50. Moreover, the calculation unit 48A5 calculates the subject distance (for example, the distance from the light-receiving surface 30A (see FIG. 6) to each interest subject) to each interest subject based on the acquired phase difference image data.

As an example, as shown in FIG. 35, the creation unit 48A3 groups the plurality of interest subject regions as one object (in the example shown in FIG. 35, one quadrangular region). The creation unit 48A3 generates the object frame inclusion live view image data by creating the outer contour line indicating the outer contour of the grouped image region 100 obtained by grouping as the object frame 98. Here, the object frame 98 is a quadrangular frame, and has a shape which is narrowed from a side on which the subject distance is shortest (side closer to the light-receiving surface 30A) among the plurality of interest subject regions to a side on which the subject distance is longest (side farther from the light-receiving surface 30A). In the example shown in FIG. 35, the object frame 98 is trapezoidal, a lower base thereof is positioned on the side on which the subject distance is shortest among the plurality of interest subject regions, and an upper base thereof, which is shorter than the lower base, is positioned on the side on which the subject distance is longest among the plurality of interest subject regions.

It should be noted that, in the example shown in FIG. 35, a trapezoidal shape is shown as an example of the shape of the object frame 98, but the technology of the present disclosure is not limited to this. A polygonal shape, such as a triangle, may be used or a curved geometric shape frame may be used, and it is preferable to use a frame having a shape which is narrowed from the subject region on the side on which the subject distance is shortest to the subject region on the side on which the subject distance is longest.

The display control unit 48A4 displays the object frame inclusion live view image indicated by the object frame inclusion live view image data generated by the creation unit 48A3 on the display 26. That is, the display control unit 48A4 displays the live view image on which the object frame 98 that surrounds the plurality of interest subject regions as one object is superimposed, as the object frame inclusion live view image on the display 26.

It should be noted that, in the example shown in FIG. 35, the shape of the object frame 98 is deformed in accordance with the subject distance to the interest subject, but the technology of the present disclosure is not limited to this. For example, in accordance with the subject distance to the interest subject, the thickness of the frame line of the object frame 98 may be partially changed, the color of the frame line may be partially changed, the transparency of the frame line may be partially changed, or the frame line may be partially turned on and off.

As described above, in the examples shown in FIGS. 34 and 35, since the display aspect of the object frame 98 is changed in accordance with the subject distance to each of the plurality of subjects, it is possible to make the user estimate the distance to each of the plurality of specific subjects from the imaging apparatus 10.

In addition, in the examples shown in FIGS. 34 and 35, since the shape which is narrowed from the subject region on the side on which the subject distance is shortest to the subject region on the side on which the subject distance is longest is used as the shape of the object frame 98, it is possible to make the user estimate which of the plurality of specific subjects is the subject on the side close to the imaging apparatus 10 and which is the subject on the side far from the imaging apparatus 10.

Figure 36:
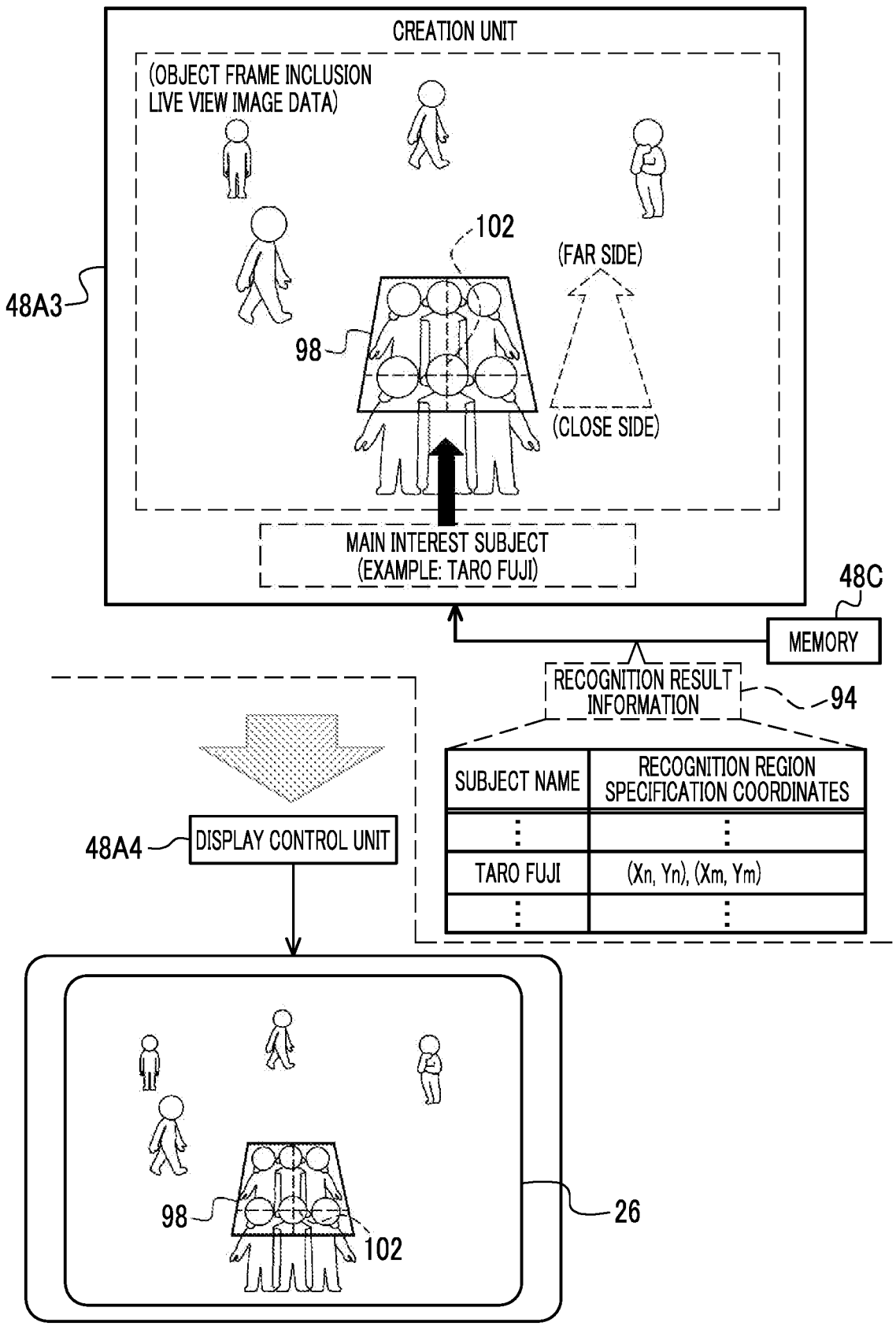
FIG. 36 is a conceptual diagram showing an example of an aspect in which a main interest subject region is displayed in a more enhanced manner than other interest subject regions in the object frame.

The display control unit 48A4 may display one of a target subject region designated from among the plurality of subject regions and the subject region other than the target subject region in a more enhanced manner than the other. As a display enhancement method, various methods, such as changing the brightness, changing the contrast, and/or surrounding with the frame can be considered. However, as an example, as shown in FIG. 36, the creation unit 48A3 may create a cross mark 102 in the object frame 98. It should be noted that the cross mark 102 is merely an example, and may be another type of mark, such as a star mark or an arrow.

As an example, as shown in FIG. 36, the creation unit 48A3 creates the cross mark 102 in the object frame 98 to position an intersection of the cross mark 102 at a reference point (for example, the center of the face region in a case in which the subject is the person) in the main interest subject region. Here, the main interest subject region refers to an image region indicating a subject registered in advance as the main interest subject (hereinafter, also referred to as the "main interest subject"). It should be noted that the main interest subject region is an example of a "target subject region" according to the technology of the present disclosure. In addition, among the plurality of subject regions in the object frame 98, a subject region other than the main interest subject region is an example of a "subject region other than the target subject region" according to the technology of the present disclosure.

The creation unit 48A3 acquires the recognition result information 94 from the memory 48C and specifies the main interest subject region in the object frame 98 with reference to the acquired recognition result information 94. The creation unit 48A3 generates the object frame inclusion live view image data in which the cross mark 102 is disposed in the object frame 98 such that the position of the center of the face region and the position of the intersection of the cross mark 102 match in the main interest subject region indicating the interest subject (in the example shown in FIG. 36, the main interest subject region indicating the main interest subject "Taro Fuji"). Moreover, the display control unit 48A4 displays the object frame inclusion live view image indicated by the object frame inclusion live view image data generated by the creation unit 48A3 on the display 26. That is, the display control unit 48A4 displays the live view image on which the object frame 98 that surrounds the plurality of interest subject regions as one object is superimposed and the cross mark 102 is superimposed on the face region of the main interest subject region, as the object frame inclusion live view image on the display 26.

In the example shown in FIG. 36, the form example is shown in which the main interest subject region is displayed in a more enhanced manner than the remaining subject regions in the object frame 98, but the technology of the present disclosure is not limited to this, and the subject region other than the main interest subject region among the plurality of subject regions in the object frame 98 may be displayed in a more enhanced manner than the main interest subject region.

As described above, in the example shown in FIG. 36, since one of the main interest subject region among the plurality of subject regions in the object frame 98 and the subject region other than the main interest subject region is displayed in a more enhanced manner than the other, it is possible to more easily visually specify the subject desired by the user from among the plurality of subjects than in a case in which the visibility levels of the main interest subject region and the subject region other than the main interest subject region are set to be the same.

The object frame 98 shown in FIGS. 35 and 36 may be deformed with the movement of the interest subject region in the object frame 98. In this case, for example, the CPU 48A deforms the object frame 98 in a case in which an interval between a part of the plurality of subject regions and the remaining subject regions (example of a "first interval" according to the technology of the present disclosure) is equal to or larger than a predetermined interval (example of a "first predetermined interval" according to the technology of the present disclosure) in the object frame inclusion live view image. In addition, the CPU 48A deforms the object frame 98 in a form in which a part of the subject regions is separated from the object frame 98 on a condition that a state in which the interval between a part of the plurality of subject regions and remaining subject regions is equal to or larger than the predetermined interval is maintained for a time equal to or longer than a predetermined time.

Figure 37:
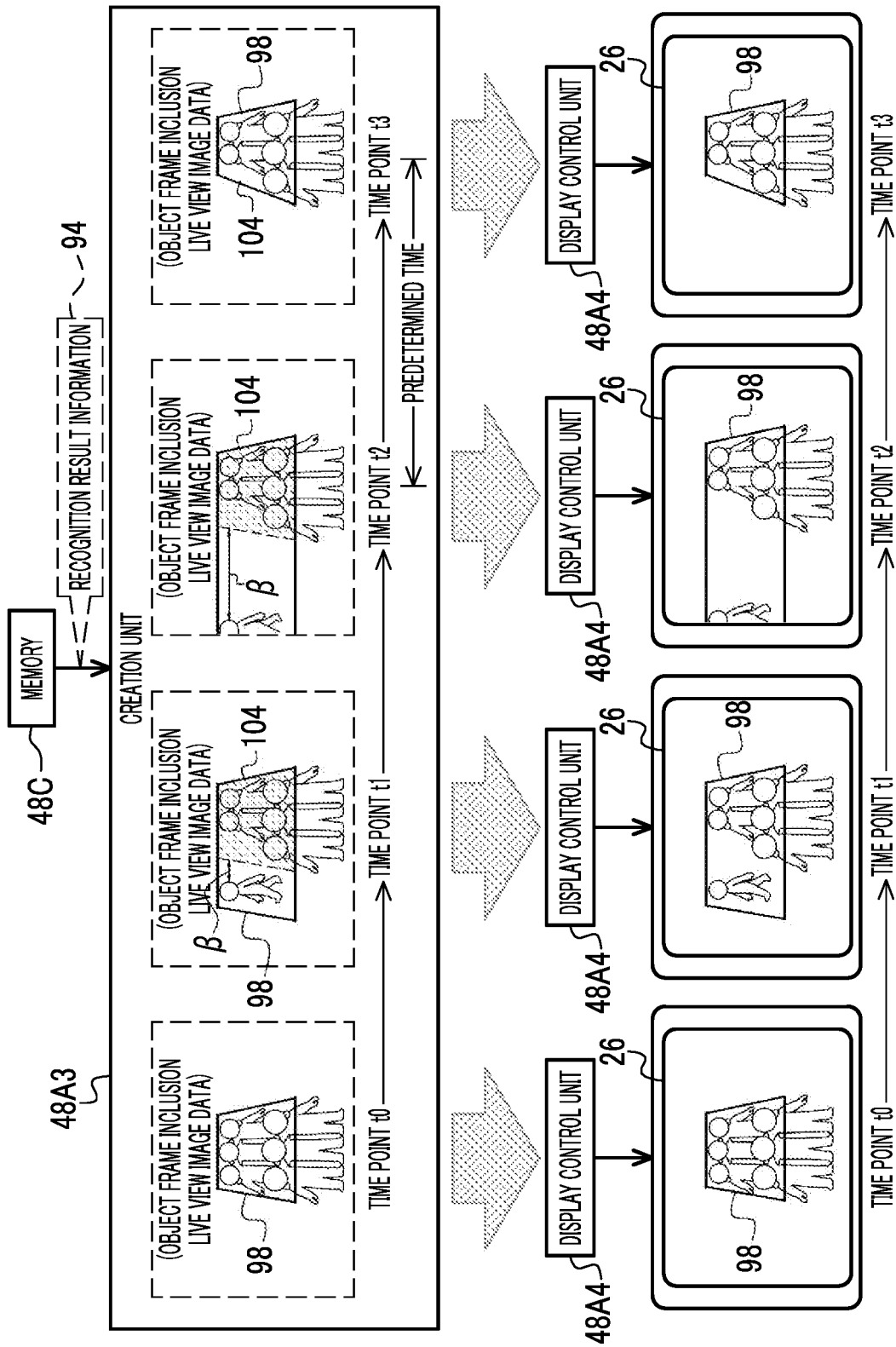
FIG. 37 is a conceptual diagram showing an example of an aspect in which the object frame is deformed in accordance with an interval between the interest subject regions.

In a case in which the object frame 98 is deformed in this way, for example, as shown in FIG. 37, in a case in which the interest subject region in the object frame 98 (in the example shown in FIG. 37, the face region indicating the face of the person) is moved out of a range defined by the current object frame 98, the creation unit 48A3 deforms the object frame 98 while following the movement of a movement interest subject region to include the moved interest subject region (hereinafter, also referred to as a "movement interest subject region") in the object frame 98. The creation unit 48A3 calculates an interval β between the interest subject regions in the object frame 98, and determines whether or not the interval β is equal to or larger than a predetermined interval. The creation unit 48A3 deforms the object frame 98 in a form in which the movement interest subject region is separated from the object frame 98 on a condition that a state in which the interval β is equal to or larger than the predetermined interval is maintained for a time equal to or longer than a predetermined time. Here, the predetermined time may be a fixed value or may be a variable value that is changed in accordance with the instruction received by the reception device 80 or the given condition (for example, the imaging condition).

In the example shown in FIG. 37, a process of deforming the shape of the object frame 98 from time points t0 to t3 is shown. Between the time points t0 to t3, the object frame inclusion live view image indicated by the object frame inclusion live view image data generated by the creation unit 48A3 is displayed on the display 26 by the display control unit 48A4.

From the time point t0 to the time point t1, the movement interest subject region is separated from the other image region 104 (broken line hatching region shown in FIG. 37) in which the remaining interest subject regions in the object frame 98 are set as one object, and, in response to this, the object frame 98 extends to follow the movement of the movement interest subject region. From the time point t1 to the time point t2, the interval β between the movement interest subject region and the other image region 104 is gradually increased, and, in response to this, the object frame 98 also extends. At the time point t2, the interval β reaches the predetermined interval, and the interval β is maintained at an interval equal to or larger than the predetermined interval even after the time point t2. Moreover, in a case in which the state in which the interval β is equal to or larger than the predetermined interval is maintained for a time equal to or longer than the predetermined time, that is, from the time point t2 to the time point t3, the creation unit 48A3 creates the contour line indicating the outer contour of the other image region 104 as a new object frame 98 to separate the movement interest subject region from the new object frame 98.

Figure 38:
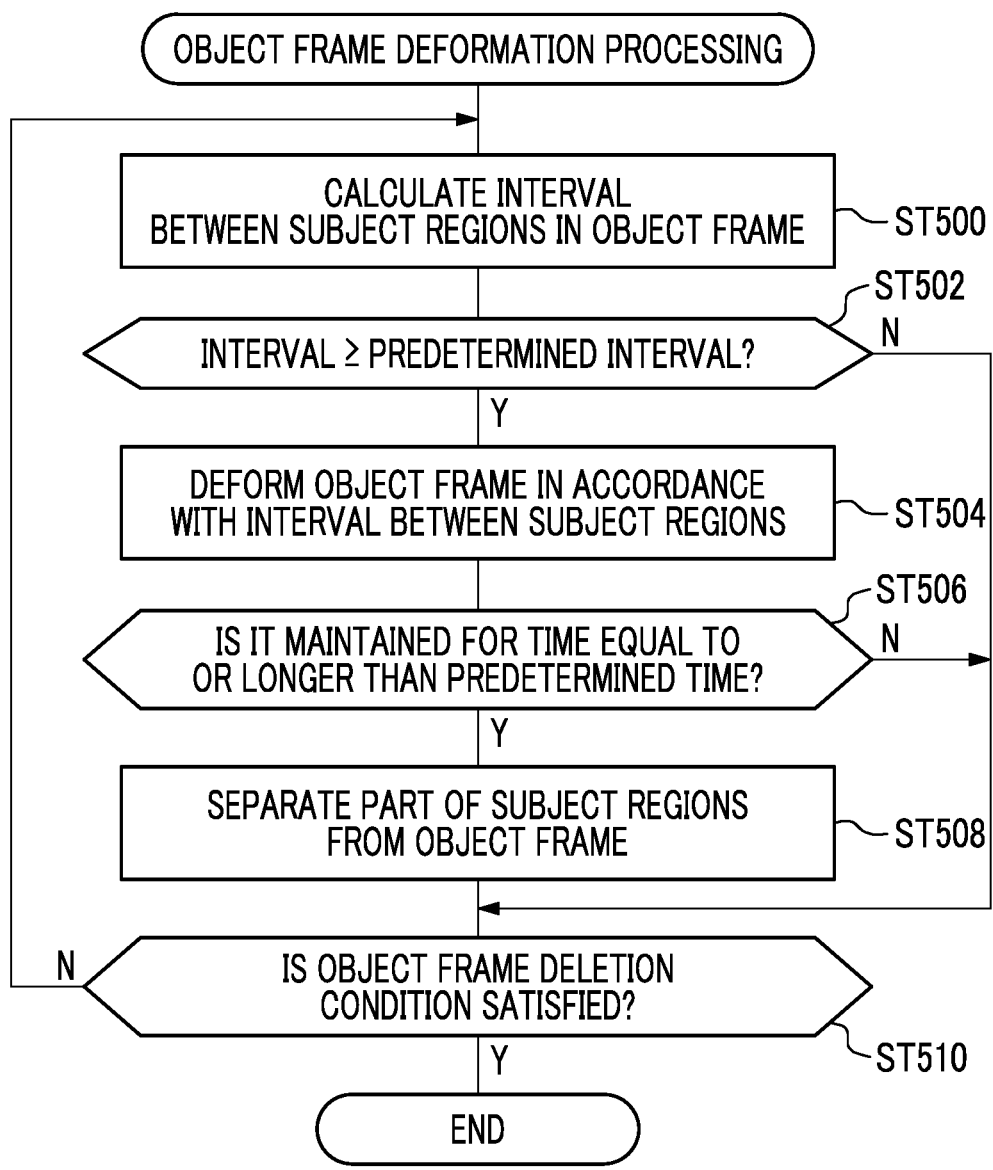
FIG. 38 is a flowchart showing an example of a flow of object frame deformation processing.

FIG. 38 shows an example of a flow of the object frame deformation processing executed by the CPU 48A in accordance with the object frame deformation processing program (not shown) stored in the storage 48B.

In the object frame deformation processing shown in FIG. 38, first, in step ST500, the creation unit 48A3 calculates the interval β between the interest subject regions in the object frame 98.

In next step ST502, the creation unit 48A3 determines whether or not the interval β calculated in step ST500 is equal to or larger than the predetermined interval. In step ST502, in a case in which the interval β is smaller than the predetermined interval, a negative determination is made, and the object frame deformation processing proceeds to step ST510. In step ST502, in a case in which the interval β is equal to or larger than the predetermined interval, a positive determination is made, and the object frame deformation processing proceeds to step ST504.

In step ST504, the creation unit 48A3 deforms the object frame 98 in accordance with the interval β between the interest subject regions. The object frame 98 deformed by executing the processing of step ST504 is displayed on the display 26 in a state of being superimposed on the live view image by the display control unit 48A4.

In next step ST506, the creation unit 48A3 determines whether or not the state of "interval β≥predetermined interval" is maintained for a time equal to or longer than the predetermined time. In step ST506, in a case in which the state of "interval β≥predetermined interval" is not maintained for a time equal to or longer than the predetermined time, a negative determination is made, and the object frame deformation processing proceeds to step ST510. In step ST506, in a case in which the state of "interval β≥predetermined interval" is maintained for a time equal to or longer than the predetermined time, a positive determination is made, and the object frame deformation processing proceeds to step ST508.

In step ST508, the creation unit 48A3 deforms the object frame 98 in a form in which a part of the subject regions, that is, the movement interest subject region described above is separated from the object frame 98. The object frame 98 deformed by executing the processing of step ST508 is displayed on the display 26 in a state of being superimposed on the live view image by the display control unit 48A4.

In next step ST510, the creation unit 48A3 determines whether or not the object frame deletion condition (see step ST216 in FIG. 19B) is satisfied. In step ST510, in a case in which the object frame deletion condition is not satisfied, a negative determination is made, and the object frame deformation processing proceeds to step ST500. In step ST510, in a case in which the object frame deletion condition is satisfied, a positive determination is made, and the object frame deformation processing ends.

As described above, in the examples shown in FIGS. 37 and 38, since the object frame 98 is deformed in a case in which the interval β is equal to or larger than the predetermined interval, it is possible to visually grasp that the interval between the plurality of specific subjects is changed.

In addition, in the examples shown in FIGS. 37 and 38, since the object frame 98 is deformed in a form in which the movement interest subject region is separated from the object frame 98 in a case in which the state of "interval β≥predetermined interval" is maintained for a time equal to or longer than the predetermined time, it is possible to visually grasp the subject excluded from the group consisting of the plurality of specific subjects and the subject remaining in the group.

In the example shown in FIGS. 37 and 38, the form example is shown in which a part of the subject regions is separated from the object frame 98 in a case in which a state in which the interval β is maintained at the interval equal to or larger than the predetermined interval is maintained for a time equal to or longer than the predetermined time, but the CPU 48A may select whether or not to include the plurality of subject regions in one object in accordance with a given instruction. That is, the CPU 48A may separate a part of the subject regions from the object frame 98 or add a part of the subject regions to the object frame 98 in accordance with the given instruction.

Figure 39:
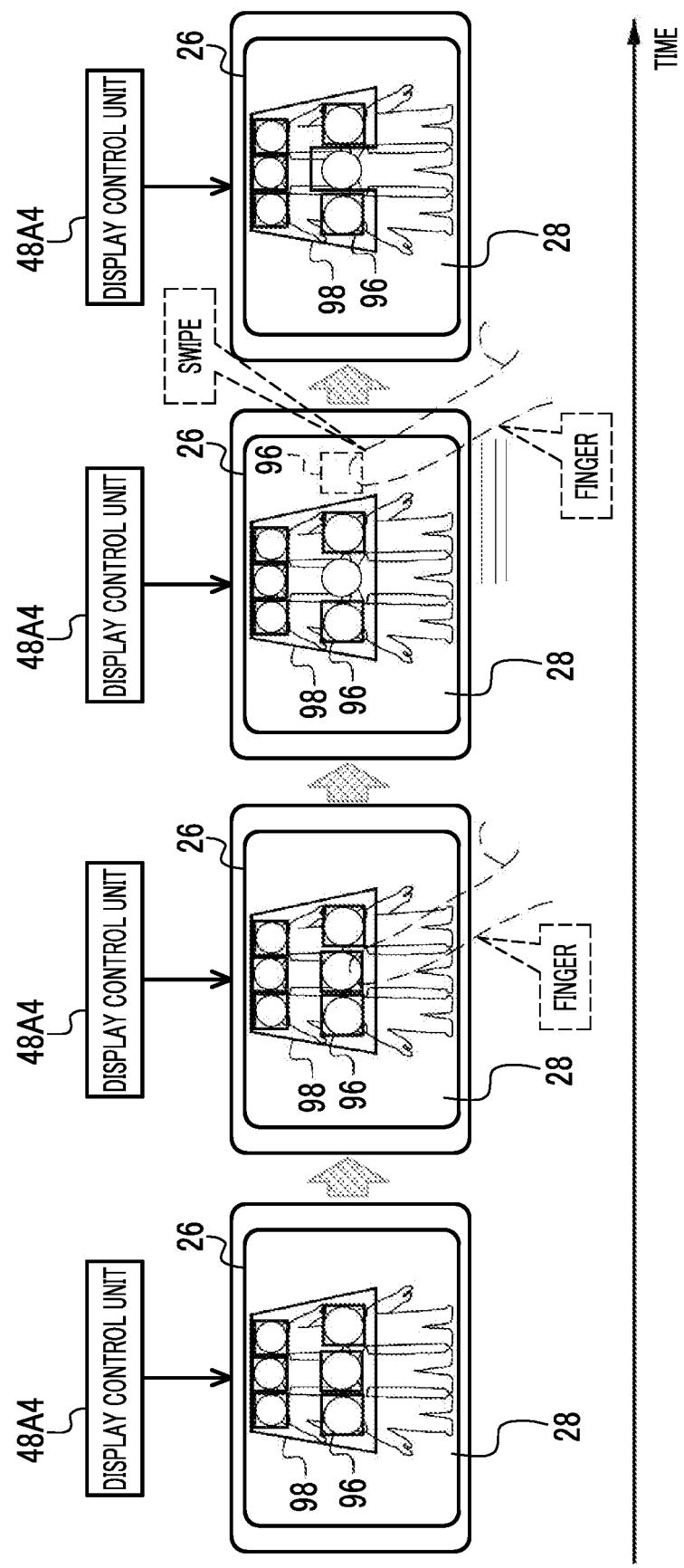
FIG. 39 is a transition diagram showing an example of an aspect in which the object frame is deformed by excluding a part of subject regions from the object frame in accordance with an instruction given by a user.

As an example, as shown in FIG. 39, the display control unit 48A4 displays the object frame inclusion live view image on the display 26. In the example shown in FIG. 39, the individual frame 96 that surrounds the interest subject region (in the example shown in FIG. 39, the interest face region) is displayed in the object frame 98 in the object frame inclusion live view image. The display control unit 48A4 selects the individual frame 96 in the object frame 98 in accordance with the instruction received by the touch panel 28, and excludes the selected individual frame 96 from the object frame 98. In the example shown in FIG. 39, the display control unit 48A4 selects the individual frame 96 in accordance with a touch operation performed on the touch panel 28, and excludes the individual frame 96 from the object frame 98 in accordance with a swipe operation performed on the touch panel 28.

As described above, in a case in which the individual frame 96 is excluded from the object frame 98, the display control unit 48A4 deforms the object frame 98 to avoid a region vacated by excluding the individual frame 96 from the inside of the object frame 98.

Figure 40:
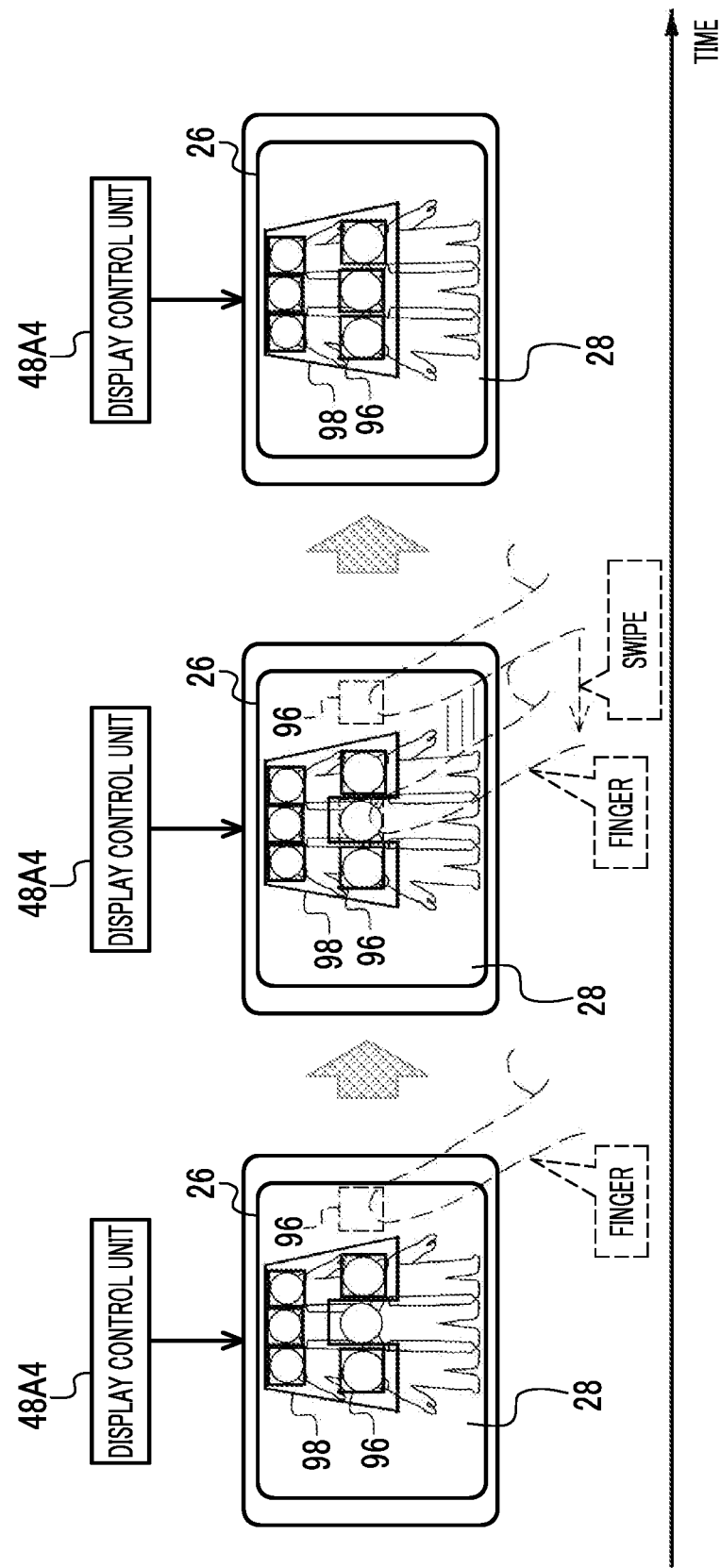
FIG. 40 is a transition diagram showing an example of an aspect in which the object frame is deformed by returning a part of subject regions excluded from the object frame to the inside of the object frame in accordance with the instruction given by the user.

In addition, as an example, as shown in FIG. 40, the display control unit 48A4 returns the individual frame 96 excluded from the object frame 98 to the original position in the object frame 98 in accordance with the instruction received by the touch panel 28 (in the example shown in FIG. 30, the swipe operation) to return the object frame 98 to the original form. It should be noted that the operation of the instruction described above is not limited to the swipe operation. For example, it may be possible to alternately change whether or not the object frame 98 includes the individual frame 96 by touching the individual frame 96 or the subject.

As described above, in the examples shown in FIGS. 39 and 40, since it is selected whether or not to include the plurality of subject regions in one object in accordance with the given instruction, it is possible to intentionally select the subject that is not desired to be included in the group of the plurality of specific subjects and the subject that is desired to be included.

Figure 41:
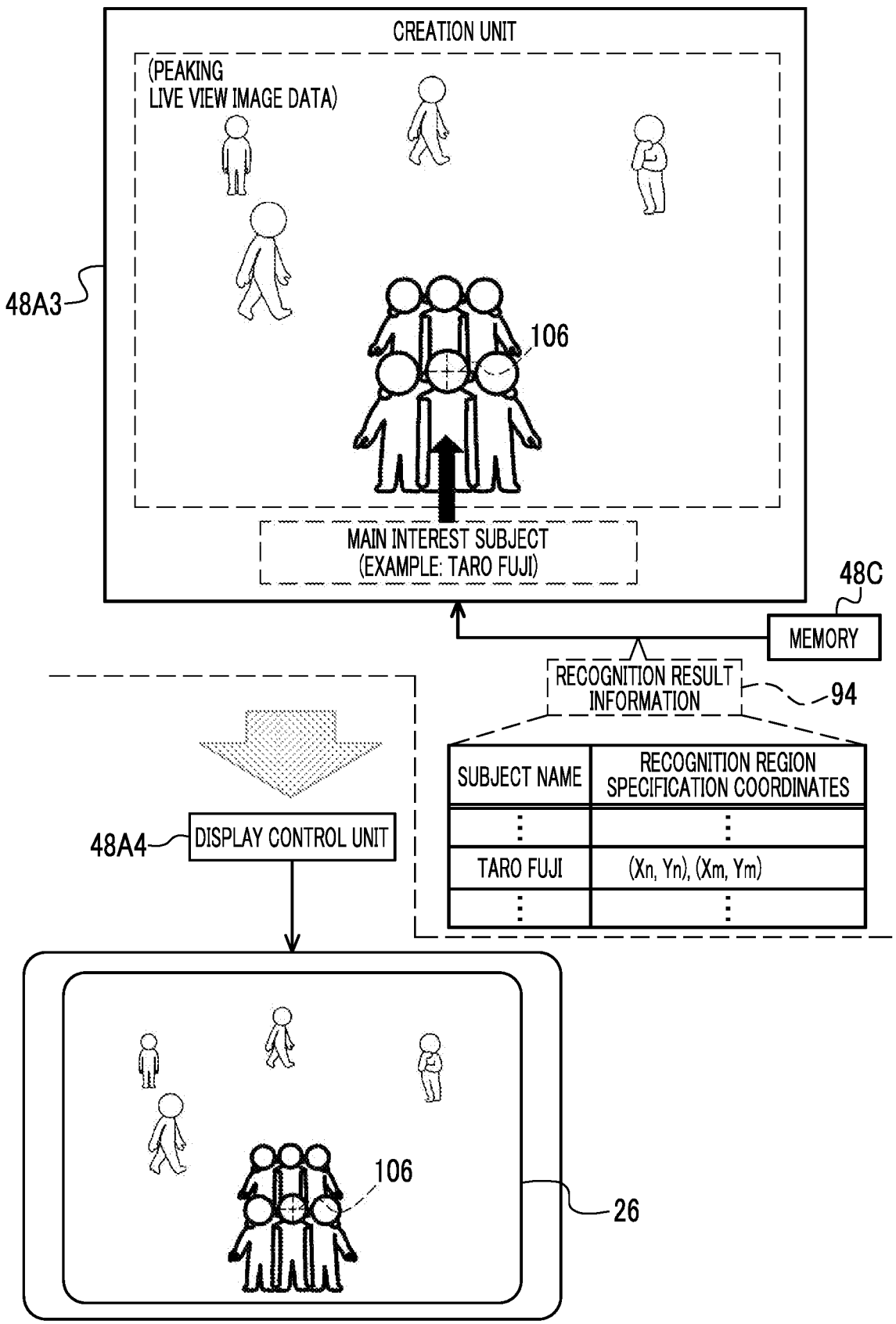
FIG. 41 is a conceptual diagram showing an example of processing contents in which a plurality of interest subject regions (plurality of subject regions satisfying a predetermined condition) are displayed using a peaking method.

In the example shown in FIG. 36, the object frame 98 that surrounds the plurality of interest subject regions as one object is displayed on the live view image in a superimposed manner, so that the plurality of interest subject regions are displayed as one object in an aspect that is capable of being identified from other image regions, but the technology of the present disclosure is not limited to this. For example, the CPU 48A may display the plurality of interest subject regions in the live view image in the aspect that is capable of being identified as one object by displaying the plurality of interest subject regions using a peaking method. In this case, for example, as shown in FIG. 41, the creation unit 48A3 generates peaking live view image data by processing the outer contour of each of the plurality of interest subject regions in the live view image data into an aspect that is displayed using the peaking method, that is, an aspect that is more enhanced than the other image region and by superimposing the cross mark 106 on a specific region of the main interest subject region (in the example shown in FIG. 41, the face region of the main interest subject region indicating the main interest subject "Taro Fuji").

The display control unit 48A4 to display the live view image (hereinafter, also referred to as a "peaking live view image") indicated by the peaking live view image data generated by the creation unit 48A3 on the display 26. As a result, on the display 26, the live view image is displayed and each of the plurality of interest subject regions in the live view image is displayed using the peaking method.

As described above, in the example shown in FIG. 41, since the plurality of interest subject regions are displayed in the live view image in the aspect that is capable of being identified as one object by displaying the plurality of interest subject regions using the peaking method, it is possible to visually distinguish and grasp the plurality of interest subject regions and the subject region other than the interest subject regions.

Figure 42:
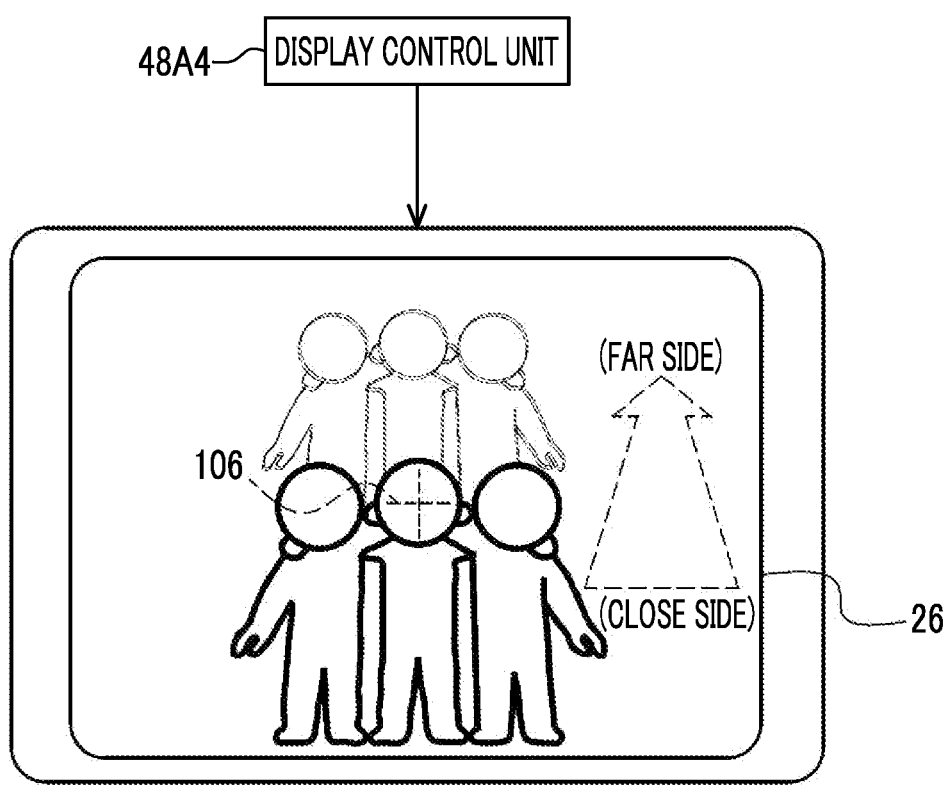
FIG. 42 is a screen view showing an example of a peaking live view image in a case in which the plurality of interest subject regions (plurality of subject regions satisfying the predetermined condition) are displayed in a display aspect corresponding to the subject distance.

In addition, as an example, as shown in FIG. 42, the display control unit 48A4 may change the display aspect of the contour line of the interest subject region in accordance with the distance between the interest subject indicated by the interest subject region and the imaging apparatus 10, that is, the subject distance. Here, the interest subject indicated by the interest subject region is an example of a "subject indicated by the specific subject region" according to the technology of the present disclosure.

In the example shown in FIG. 42, the interest subject region indicating the interest subject on the side on which the subject distance is short among the plurality of interest subject regions, that is, on a side close to the light-receiving surface 30A is displayed on the display 26 in a state of being in focus and using the peaking method. In addition, in the example shown in FIG. 42, the interest subject region indicating the interest subject on the side on which the subject distance is long among the plurality of interest subject regions, that is, on a side far from the light-receiving surface 30A is displayed on the display 26 in a state of being out of focus (blurred state) as compared with the interest subject region displayed using the peaking method.

In the example shown in FIG. 42, since the display aspect of the contour line is changed in accordance with the distance between the interest subject indicated by the interest subject region and the imaging apparatus 10, it is possible to make the user estimate the distance between the interest subject indicated by the interest subject region and the imaging apparatus 10.

Figure 43:
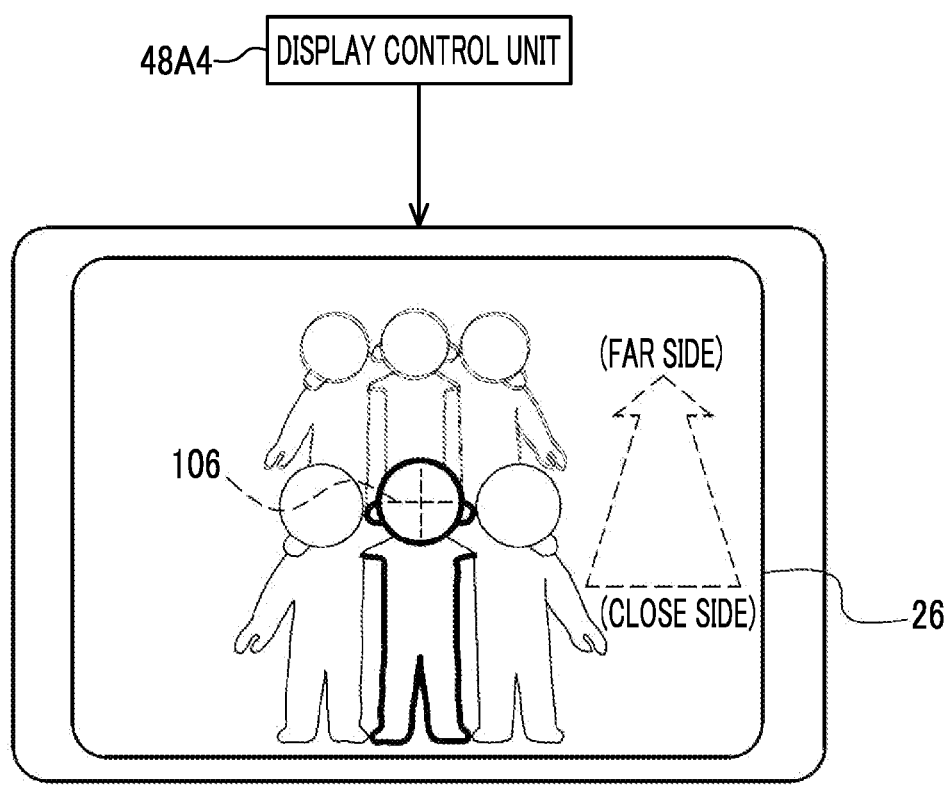
FIG. 43 is a screen view showing an example of a peaking live view image in a case in which only the main interest subject region is displayed using the peaking method among the plurality of interest subject regions (plurality of subject regions satisfying the predetermined condition)

In addition, as an example, as shown in FIG. 43, only the main interest subject region may be displayed using the peaking method. It should be noted that, in this case as well, the interest subject region indicating the interest subject on the side on which the subject distance is short among the plurality of interest subject regions, that is, on the side close to the light-receiving surface 30A is displayed on the display 26 in a state of being in focus, and the interest subject region indicating the interest subject on the side on which the subject distance is long among the plurality of interest subject regions, that is, on the side far from the light-receiving surface 30A is displayed on the display 26 in a state of being out of focus (blurred state).

Figure 44:
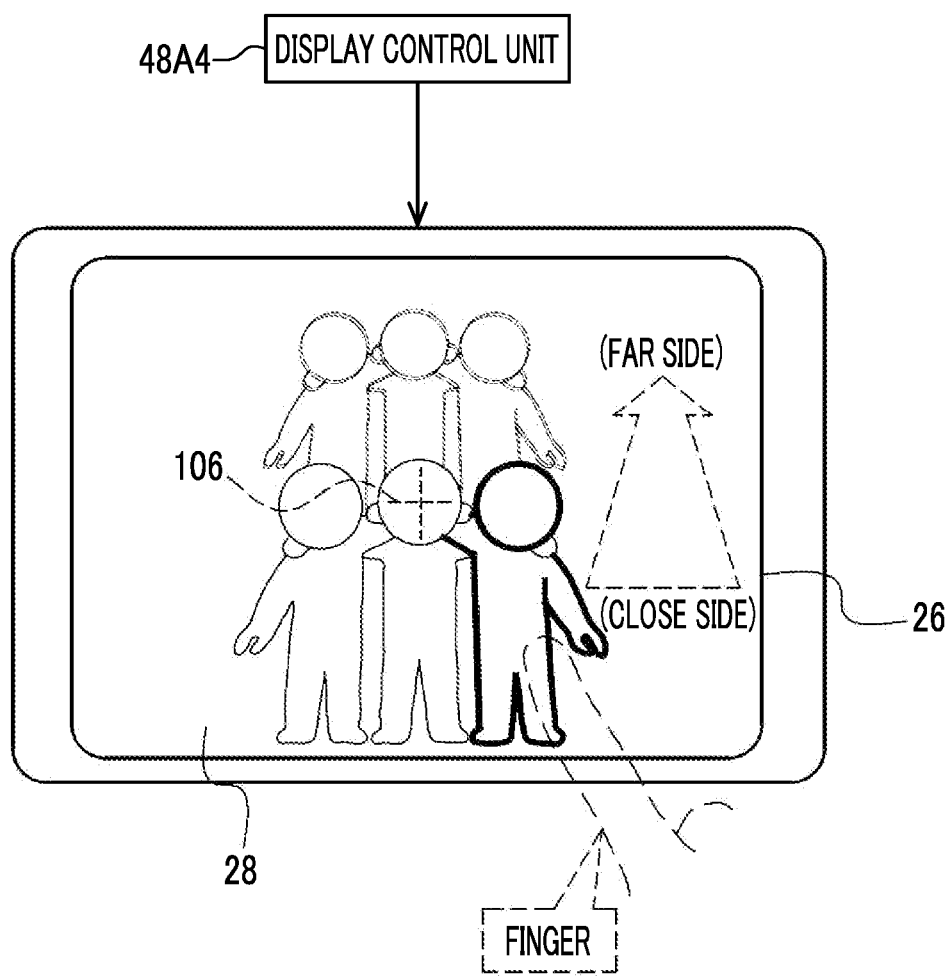
FIG. 44 is a screen view showing an example of a peaking live view image in a case in which only an interest subject region designated by the user from among the plurality of interest subject regions (plurality of subject regions satisfying the predetermined condition) is displayed using the peaking method.

In addition, the interest subject region other than the main interest subject region may be displayed using the peaking method. In this case, for example, as shown in FIG. 44, only the interest subject region selected in accordance with the instruction given to the touch panel 28 (in the example shown in FIG. 44, the touch operation with a finger on the touch panel 28) is displayed on the display 26 using the peaking method. In addition, the interest subject region selected in accordance with the instruction given to the touch panel 28 may be displayed on the display 26 using the peaking method together with the main interest subject region.

In the examples shown in FIGS. 42 to 44, the form example has been shown in which the interest subject region is displayed on the display 26 using the peaking method, but the technology of the present disclosure is not limited to this, and the CPU 48A may display the plurality of interest subject regions in the live view image in the aspect that is capable of being identified as one object by displaying the plurality of interest subject regions using a segmentation method.

Figure 45:
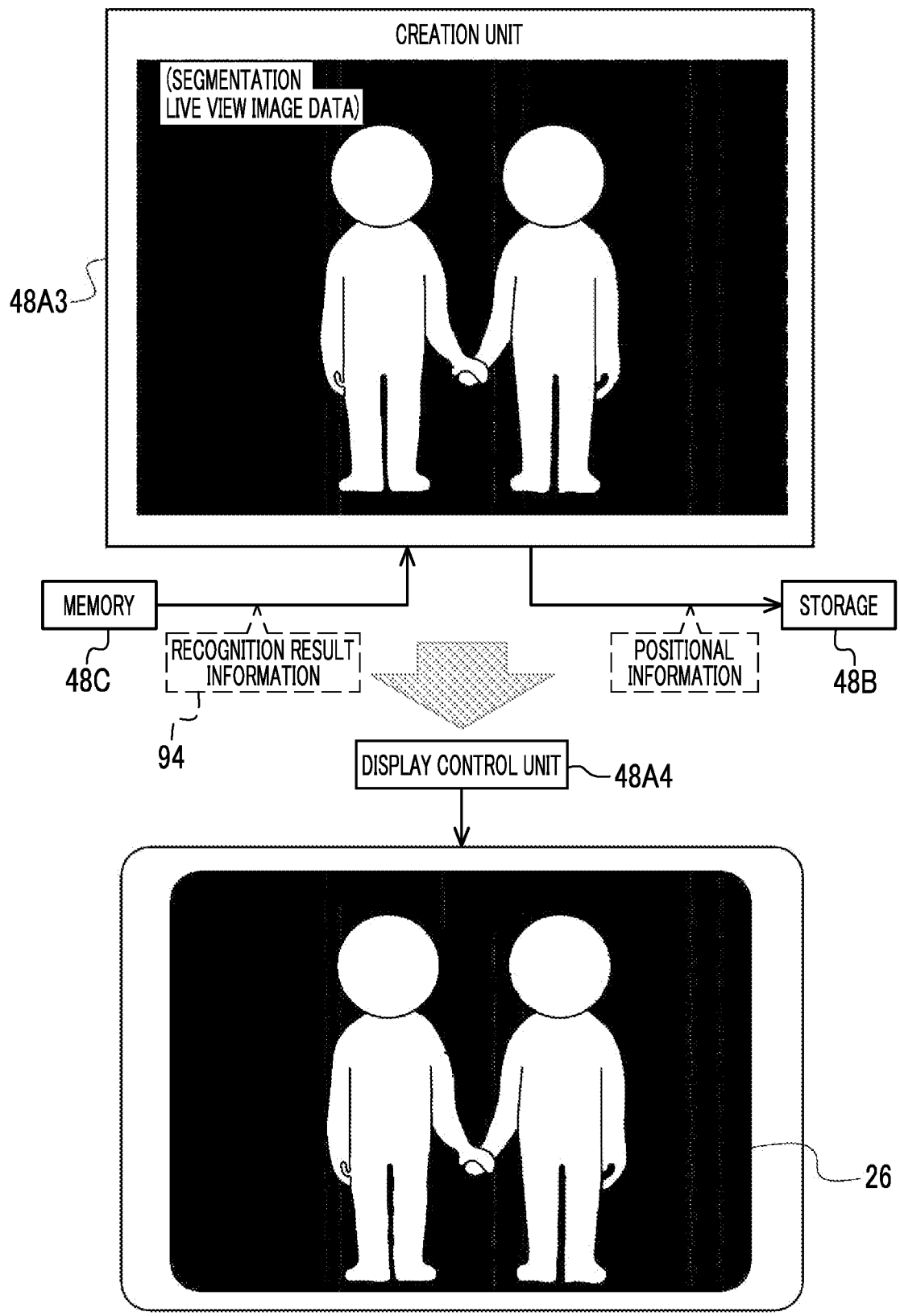
FIG. 45 is a conceptual diagram showing an example of processing contents in which the plurality of interest subject regions (plurality of subject regions satisfying the predetermined condition) are displayed using a segmentation method.

As an example, as shown in FIG. 45, the creation unit 48A3 specifies the plurality of interest subject regions from the live view image data with reference to the recognition result information 94. Moreover, the creation unit 48A3 generates the live view image data of the segmentation method (hereinafter, also referred to as "segmentation live view image data") from the live view image data with reference to the specified plurality of interest subject regions. The creation unit 48A3 acquires positional information (for example, coordinates) indicating the positions of the contour lines of the plurality of interest subject regions from the segmentation live view image data, and stores the acquired positional information in the storage 48B (example of a "storage medium" according to the technology of the present disclosure).

The display control unit 48A4 to display the live view image (hereinafter, also referred to as a "segmentation live view image") indicated by the segmentation live view image data generated by the creation unit 48A3 on the display 26.

In the example shown in FIG. 45, since the plurality of interest subject regions are displayed using the segmentation method, it is possible to visually grasp each of the plurality of interest subject regions and the other region. In addition, in the example shown in FIG. 45, since the positional information indicating the positions of the contour lines of the plurality of interest subject regions is acquired from the segmentation live view image data and stored in the storage 48B, the contour line of the interest subject region is more easily reproduced than in a case in which the positional information is not stored in some storage medium.

Figure 46:
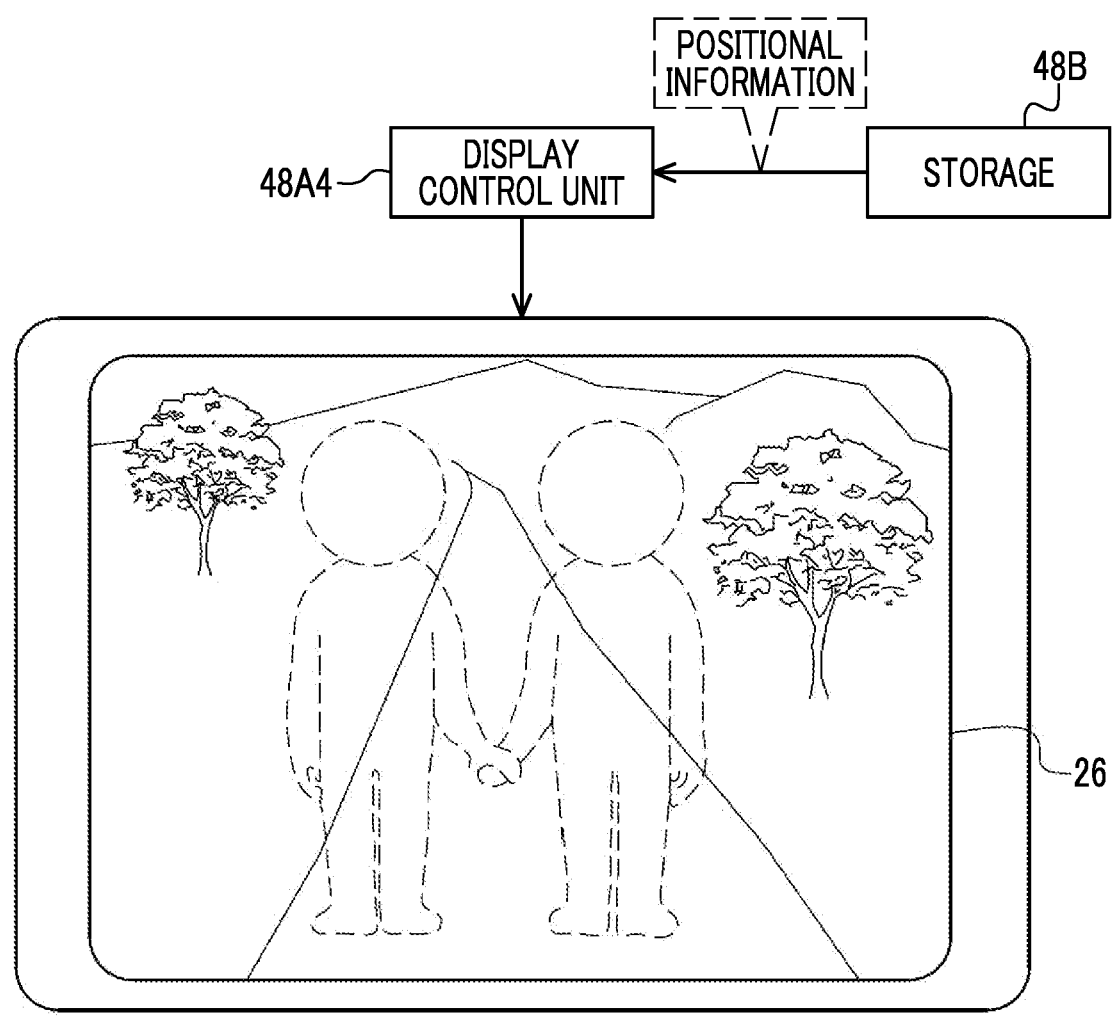
FIG. 46 is a screen view showing an example of a contour line inclusion live view image in a case in which the contour lines of the plurality of interest subject regions are displayed on the live view image.

In addition, the CPU 48A may extract the contour line of at least one interest subject region among the plurality of interest subject regions and display the extracted contour line on the live view image. In this case, as an example, as shown in FIG. 46, the display control unit 48A4 acquires the positional information from the storage 48B. Moreover, the display control unit 48A4 displays the live view image ("contour line inclusion live view image" shown in FIG. 46) on which the contour line indicated by the acquired positional information (the contour lines of two interest subject regions indicated by the broken lines shown in FIG. 46) is superimposed, on the display 26.

As described above, in the example shown in FIG. 46, since the contour line of at least one interest subject region among the plurality of interest subject regions is extracted and the extracted contour line is displayed on the live view image, it is possible to visually grasp a positional relationship between the live view image and the interest subject region. It should be noted that, here, the example is described in which the contour line is displayed on the live view image in a superimposed manner, but the contour line may be displayed on various images, such as the postview image, the still picture, or the video for recording, in a superimposed manner.

In the embodiment described above, the form example has been described in which the individual frame 96 and the object frame 98 are selectively displayed on the display 26, but the technology of the present disclosure is not limited to this. For example, a display method in which the individual frame 96 and the object frame 98 are selectively displayed on the display 26 and a display method in which the individual frame 96 and the object frame 98 are displayed in parallel may be selectively switched.

In this case, the CPU 48A selectively performs parallel display processing of displaying the individual frame 96 and the object frame 98 in parallel in the live view image and selective display processing of selectively displaying the individual frame 96 and the object frame 98 in the live view image. In addition, the CPU 48A selectively performs the parallel display processing and the selective display processing in accordance with at least one of the movement of the plurality of subjects, the movement of the imaging apparatus 10, or the depth of field.

Figure 47:
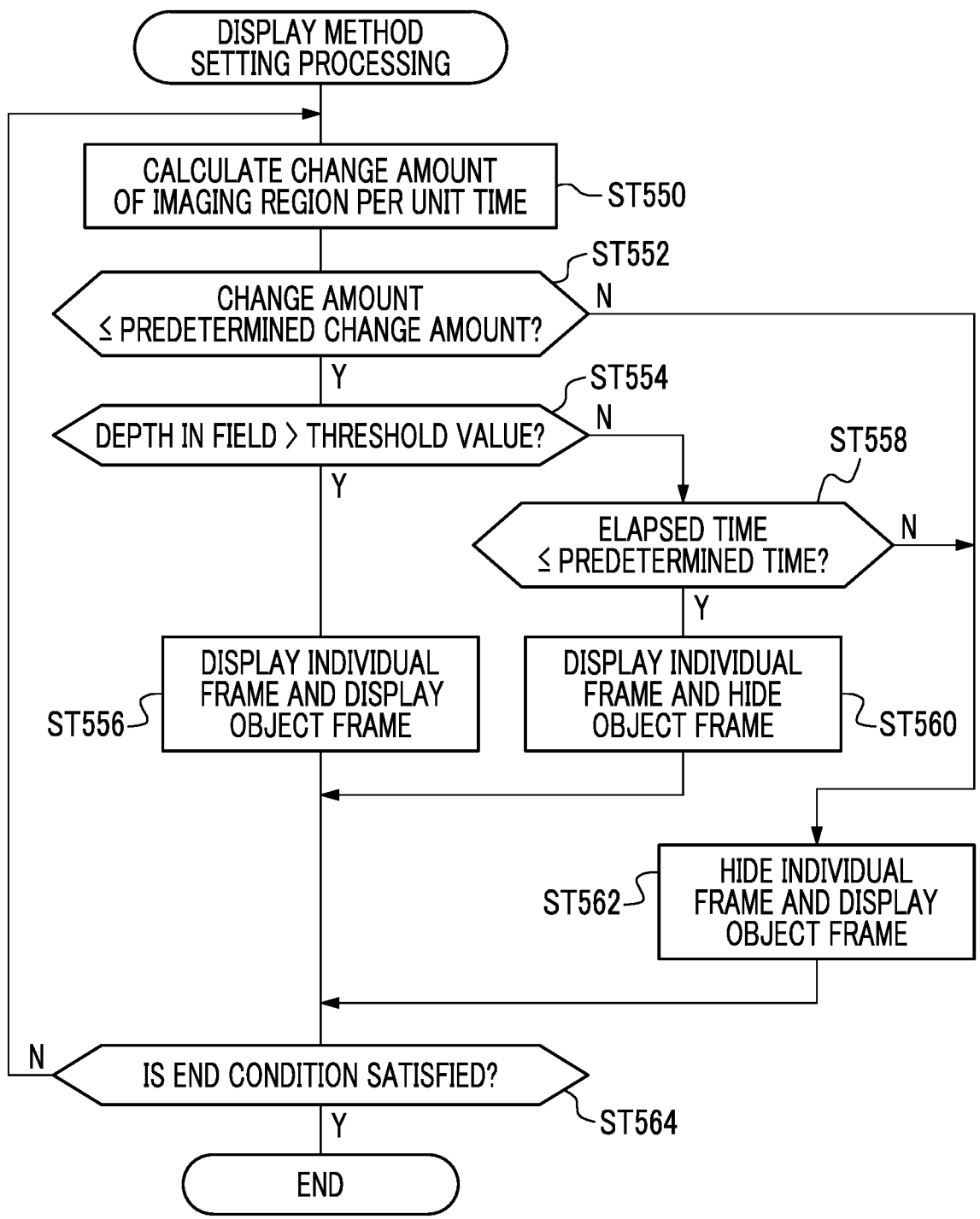
FIG. 47 is a flowchart showing an example of a flow of display method setting processing.

As described above, in a case in which the CPU 48A selectively performs the parallel display processing and the selective display processing, the CPU 48A executes the display method setting processing in accordance with the display method setting processing program (not shown) stored in the storage 48B. FIG. 47 shows an example of a flow of the display method setting processing.

In the display method setting processing shown in FIG. 47, first, in step ST550, the CPU 48A calculates a change amount in the imaging region per unit time. The change amount of the imaging region per unit time is determined in accordance with the movement of the subject included in the imaging region and/or the movement of the imaging apparatus 10 (for example, the movement of the imaging apparatus 10 accompanying a pan operation and/or a tilt operation). For example, the CPU 48A calculates the movement vector between frames of the live view image data, and calculates the change amount in the imaging region per unit time based on the calculated movement vector, the frame rate, and the like.

In next step ST552, the CPU 48A determines whether or not the change amount calculated in step ST550 is equal to or smaller than a predetermined change amount. The predetermined change amount may be a fixed value or may be a variable value that is changed in accordance with the instruction received by the reception device 80 or the given condition (for example, the imaging condition). In step ST552, in a case in which the change amount calculated in step ST550 exceeds the predetermined change amount, a negative determination is made, and the display method setting processing proceeds to step ST562. In step ST552, in a case in which the change amount calculated in step ST550 is equal to or smaller than the predetermined change amount, a positive determination is made, and the display method setting processing proceeds to step ST554.

In step ST554, the CPU 48A determines whether or not the value indicating the depth of field set at the present time exceeds a threshold value. In step ST554, in a case in which the value indicating the depth of field set at the present time exceeds the threshold value, a positive determination is made, and the display method setting processing proceeds to step ST556. In step ST554, in a case in which the value indicating the depth of field set at the present time is equal to or smaller than the threshold value, a positive determination is made, and the display method setting processing proceeds to step ST558.

In step ST556, the CPU 48A sets the display method in which the individual frame 96 is displayed on the display 26 and the object frame 98 is displayed on the display 26. After the processing of step ST556 is executed, the display method setting processing proceeds to step ST564.

In step ST558, the CPU 48A determines whether or not an elapsed time since the subject included in the imaging region is recognized is equal to or shorter than a predetermined time. The predetermined time used in step ST558 may be a fixed value or may be a variable value that is changed in accordance with the instruction received by the reception device 80 or the given condition (for example, the imaging condition). In step ST558, in a case in which the elapsed time since the subject included in the imaging region is recognized is equal to or shorter than the predetermined time, a positive determination is made, and the display method setting processing proceeds to step ST560. In step ST558, in a case in which the elapsed time since the subject included in the imaging region is recognized exceeds the predetermined time, a negative determination is made, and the display method setting processing proceeds to step ST562.

In step ST560, the CPU 48A sets the display method in which the individual frame 96 is displayed on the display 26 and the object frame 98 is not displayed on the display 26. After the processing of step ST560 is executed, the display method setting processing proceeds to step ST564.

In step ST562, the CPU 48A sets the display method in which the individual frame 96 is not displayed on the display 26 and the object frame 98 is displayed on the display 26. After the processing of step ST562 is executed, the display method setting processing proceeds to step ST564.

In step ST564, the CPU 48A determines whether or not a condition for ending the display method setting processing (hereinafter, also referred to as a "display method setting processing end condition") is satisfied. Examples of the display method setting processing end condition include a condition that the imaging mode set for the imaging apparatus 10 is released, and a condition that an instruction to end the display method setting processing is received by the reception device 80. In step ST564, in a case in which the display method setting processing end condition is not satisfied, a negative determination is made, and the display method setting processing proceeds to step ST550. In step ST564, in a case in which the display method setting processing end condition is satisfied, the display method setting processing ends.

As described above, in the example shown in FIG. 47, since the parallel display processing of displaying the individual frame 96 and the object frame 98 in parallel in the live view image and the selective display processing of selectively displaying the individual frame 96 and the object frame 98 in the live view image are selectively performed, the frame intended by the user out of the individual frame 96 and the object frame 98 can be more easily displayed than in a case in which only the individual frame 96 or the object frame 98 is always displayed.

In addition, in the example shown in FIG. 47, since the parallel display processing and the selective display processing are selectively performed in accordance with at least one of the movement of the plurality of subjects, the movement of the imaging apparatus 10, or the depth of field, the frame intended by the user out of the individual frame 96 and the object frame 98 can be more easily displayed than in a case in which only the individual frame 96 or the object frame 98 is always displayed regardless of any of the movement of the plurality of subjects, the movement of the imaging apparatus 10, or the depth of field of the plurality of subjects.

In the embodiment described above, the quadrangular frame is described as the individual frame 96, but the technology of the present disclosure is not limited to this. For example, the CPU 48A may acquire characteristics of the plurality of subjects and change the display aspect of the plurality of individual frames 96 in accordance with the acquired characteristics. Here, the characteristic refers to, for example, a characteristic including at least one of the number of the subjects, the size of the subject, the type of the subject, or the speed of the subject. Here, the subject is an example of a "constituent element" according to the technology of the present disclosure.

Figure 48:
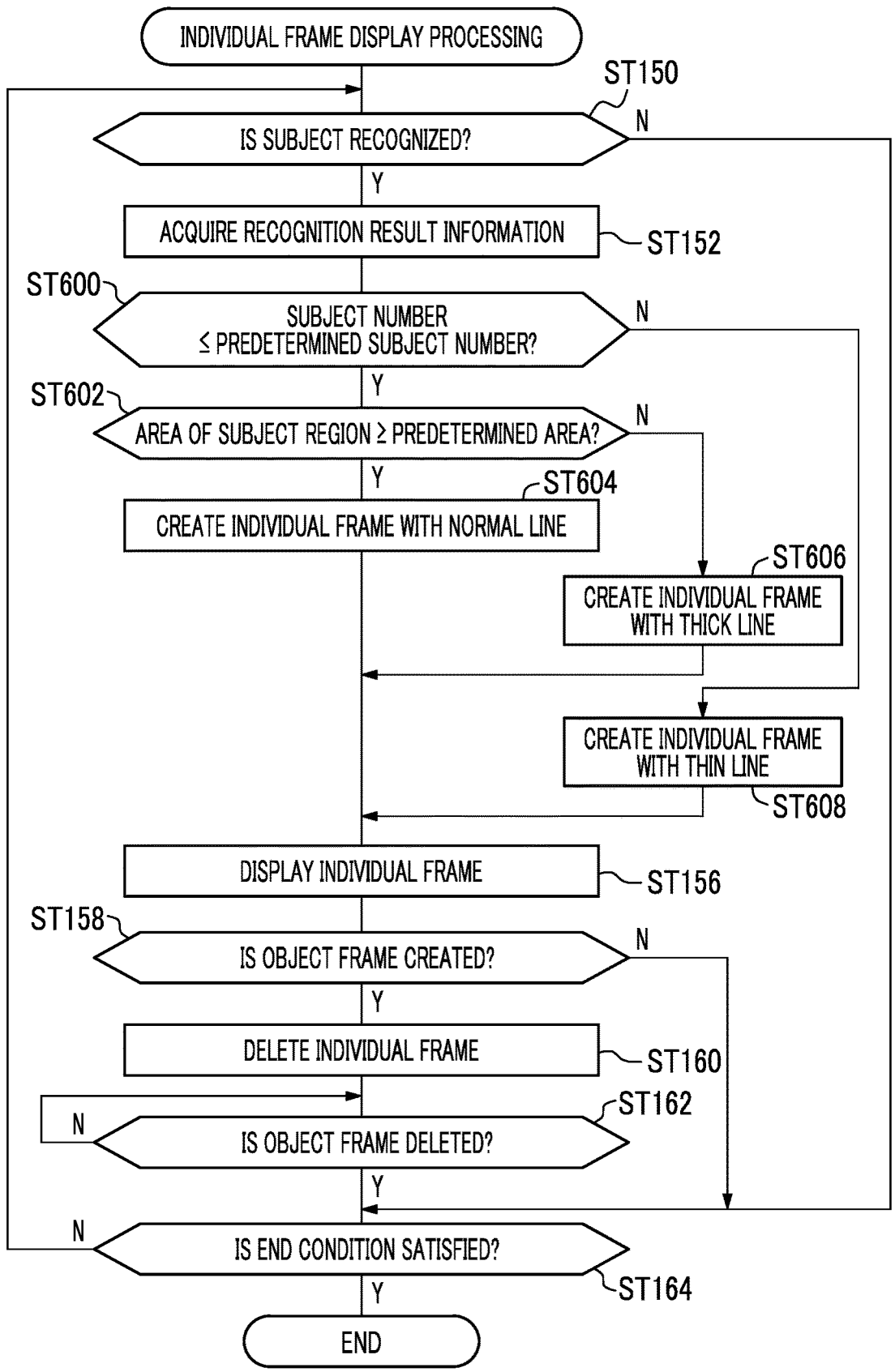
FIG. 48 is a flowchart showing a second modification example of the flow of the individual frame display processing.

As described above, in a case in which the display aspect of the plurality of individual frames 96 is changed in accordance with the characteristics of the plurality of subjects, for example, the individual frame display processing shown in FIG. 48 is executed by the CPU 48A. The flowchart shown in FIG. 48 is different from the flowchart shown in FIG. 18 in that steps ST600 to ST608 are provided instead of step ST154. Therefore, here, only a part of the individual frame display processing shown in FIG. 48 that is different from the individual frame display processing shown in FIG. 18 will be described. It should be noted that, in the following description, between a normal line, a thick line, and a thin line described as the line forming the individual frame 96, the thickness of the line is "thin line<normal line<thick line".

In the individual frame display processing shown in FIG. 48, in step ST600, the creation unit 48A3 determines whether or not the number of the subjects (hereinafter, also referred to as a "subject number") recognized by the subject recognition unit 48A2 is equal to or smaller than a predetermined subject number with reference to the recognition result information 94 acquired in step ST152. The predetermined subject number may be a fixed value or may be a variable value that is changed in accordance with the instruction received by the reception device 80 or the given condition (for example, the imaging condition). In step ST600, in a case in which the subject number is equal to or smaller than the predetermined subject number, a positive determination is made, and the individual frame display processing proceeds to step ST602. In step ST600, in a case in which the subject number exceeds the predetermined subject number, a negative determination is made, and the individual frame display processing proceeds to step ST608.

In step ST602, the creation unit 48A3 calculates the area of the subject region (for example, the average value, the median value, or the most frequent value of the areas of the plurality of subject regions) and determines whether or not the calculated area is equal to or larger than a predetermined area with reference to the recognition result information 94 acquired in step ST152. Here, the predetermined area may be a fixed value or may be a variable value that is changed in accordance with the instruction received by the reception device 80 or the given condition (for example, the imaging condition). In step ST602, in a case in which the area of the subject region is smaller than the predetermined area, a negative determination is made, and the individual frame display processing proceeds to step ST606. In step ST602, in a case in which the area of the subject region is equal to or larger than the predetermined area, a positive determination is made, and the individual frame display processing proceeds to step ST604.

In step ST604, the creation unit 48A3 creates the individual frame 96 with the normal line based on the recognition result information 94 acquired in step ST152 to generate the individual frame inclusion live view image data. After the processing of step ST604 is executed, the individual frame display processing proceeds to step ST156.

In step ST606, the creation unit 48A3 creates the individual frame 96 with the thick line based on the recognition result information 94 acquired in step ST152 to generate the individual frame inclusion live view image data. After the processing of step ST606 is executed, the individual frame display processing proceeds to step ST156.

In step ST608, the creation unit 48A3 creates the individual frame 96 with the thin line based on the recognition result information 94 acquired in step ST152 to generate the individual frame inclusion live view image data. After the processing of step ST608 is executed, the individual frame display processing proceeds to step ST156.

It should be noted that the plurality of individual frames 96 having different types of frame lines may be displayed in a mixed state in the individual frame inclusion live view image. In this case, for example, the type of the frame line of the individual frame 96 may be changed for each area of the subject region. For example, the thickness of the frame line of the individual frame 96 may be made thicker as the area of the subject region is smaller. In addition, instead of indefinitely making the thickness of the frame line thicker, the thickness of the frame line of the individual frame may be limited in accordance with the subject number. For example, the thickness of the frame line need only be maintained in a case in which the number of the subjects recognized by the subject recognition unit 48A2 in one frame exceeds a certain number.

In addition, in the example shown in FIG. 48, the form example has been shown in which the thickness of the frame line of the individual frame 96 is changed in accordance with the condition (for example, the subject number and the area of the subject region), but this is merely an example, and the shape, the color, the transparency, and/or the turning-on-and-off time interval of the frame line of the individual frame 96 may be changed in accordance with the condition.

In addition, the thickness of the frame line, the shape, the color, the transparency, and/or the turning-on-and-off time interval of the individual frame 96 may be changed in accordance with the type of the subject. In addition, the thickness of the frame line, the shape, the color, the transparency, and/or the turning-on-and-off time interval of the individual frame 96 may be changed in accordance with the speed of the subject.

As described above, the characteristics of the plurality of subjects can be visually grasped by changing the display aspect of the plurality of individual frames 96 in accordance with the characteristics of the plurality of subjects. In addition, at least one of the number of the subjects, the size of the subject, the type of the subject, or the speed of the subject can be visually grasped by changing the display aspect of the plurality of individual frames 96 in accordance with the characteristics including at least one of the number of the subjects, the size of the subject, the type of the subject, or the speed of the subject.

In the embodiment described above, the form example has been described in which the individual frame 96 is displayed or hidden and the object frame 98 is displayed or hidden, but the technology of the present disclosure is not limited to this, and the individual frame 96 may be gradually displayed or may be gradually hidden, and the object frame 98 may be gradually displayed or may be gradually hidden.

Figure 49:
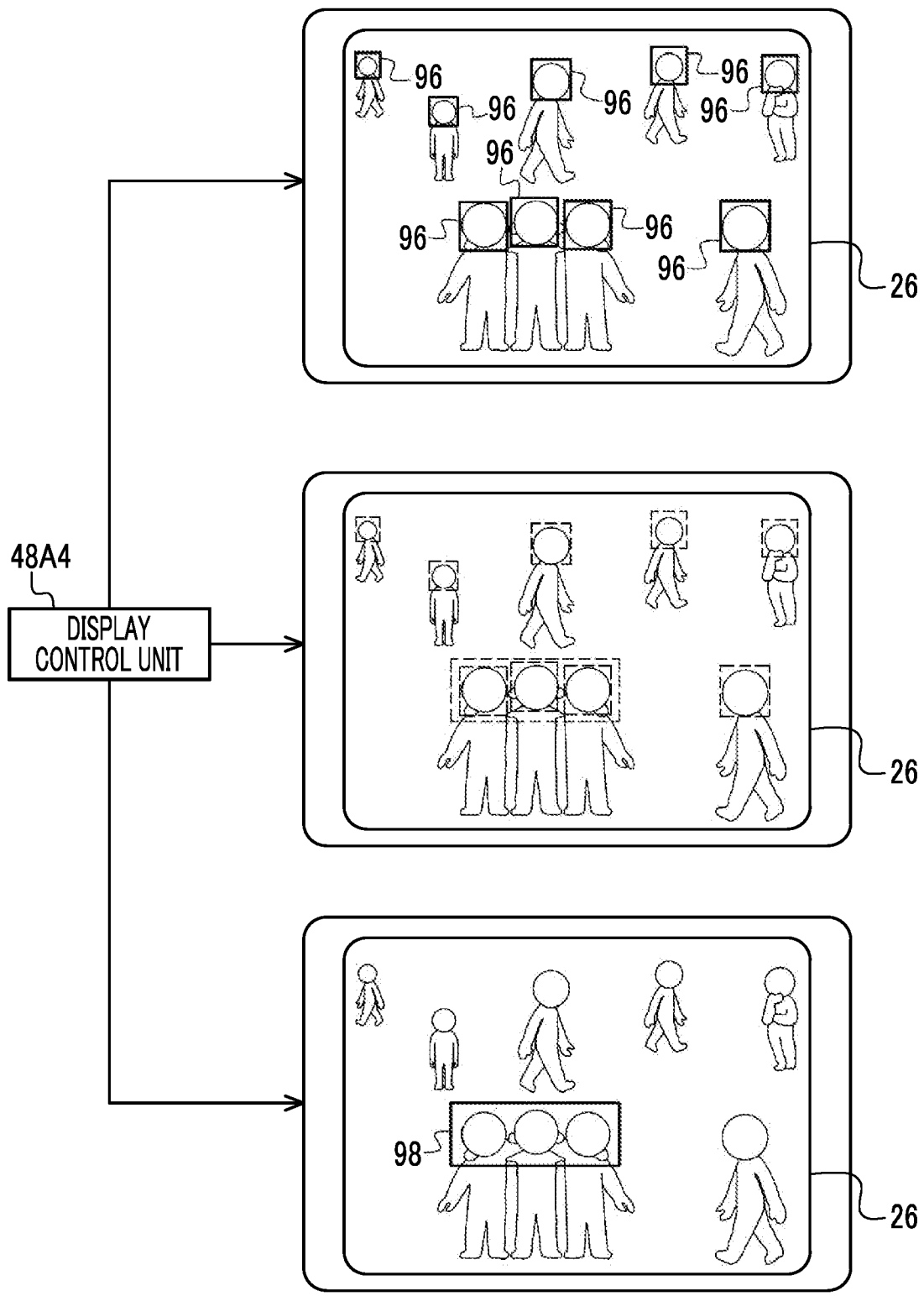
FIG. 49 is a screen transition diagram showing an example of screen contents in a case in which the individual frames are displayed in a fade-out manner and the object frames are displayed in a fade-in manner.
Figure 50:
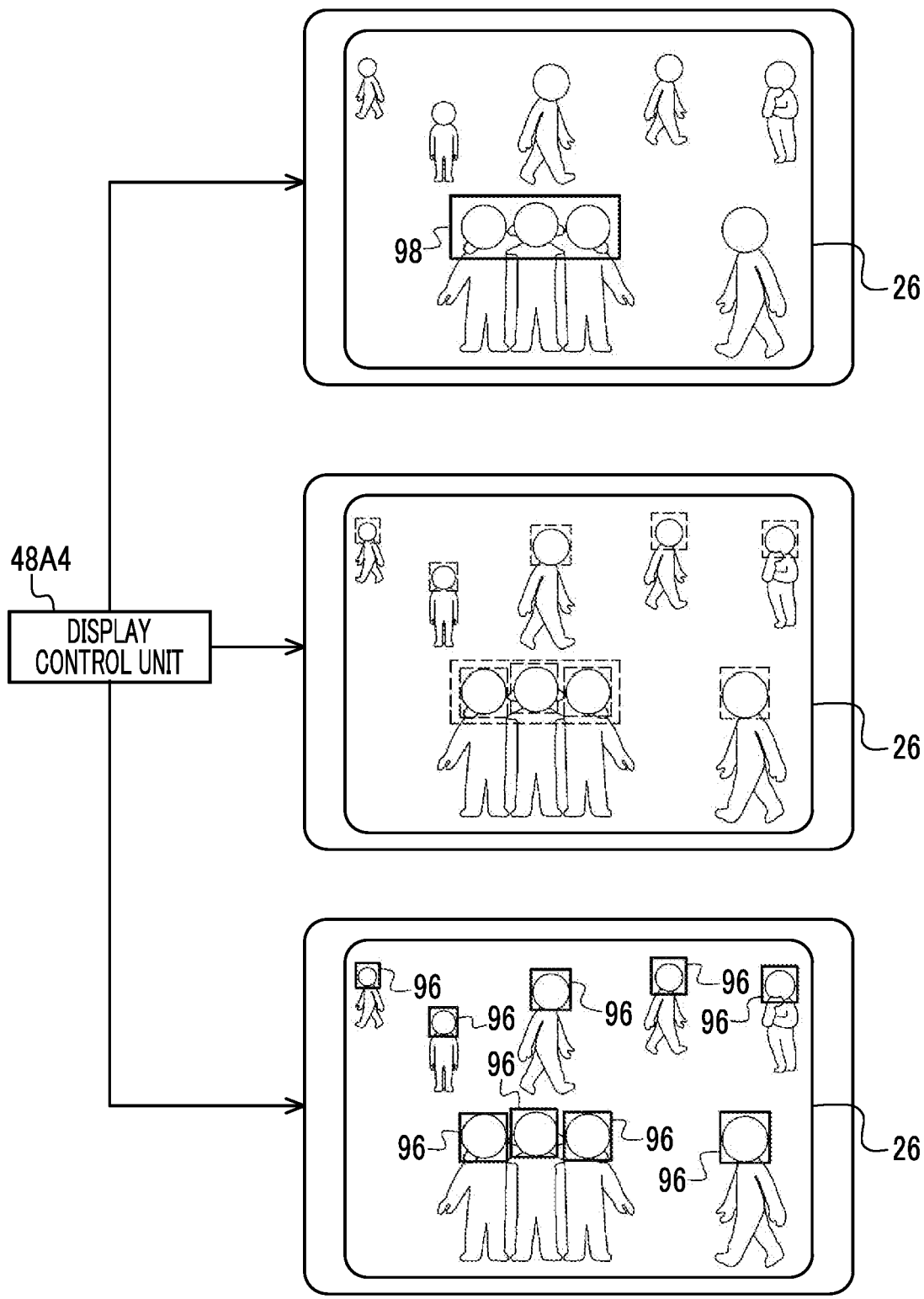
FIG. 50 is a screen transition diagram showing an example of screen contents in a case in which the individual frames are displayed in a fade-in manner and the object frames are displayed in a fade-out manner.

In this case, for example, as shown in FIG. 49, the display control unit 48A4 may display the individual frame 96 using a fade-out method and display the object frame 98 using a fade-in method in the live view image. On the other hand, as an example, as shown in FIG. 50, the display control unit 48A4 may display the individual frame 96 using the fade-in method and display the object frame 98 using the fade-out method in the live view image.

As described above, in the examples shown in FIGS. 49 and 50, since one of the individual frame 96 and the object frame 98 is displayed using the fade-out method and the other is displayed using the fade-in method in the live view image, it is possible to make the visibility to the displayed image higher than in a case in which both the individual frame 96 and the object frame 98 are always displayed.

In the embodiment described above, the form example has been described in which the object frame 98 that surrounds the plurality of interest subject regions indicating the plurality of interest subjects included in the imaging region as one object is displayed on the display 26, but the technology of the present disclosure is not limited to this.

Figure 51:
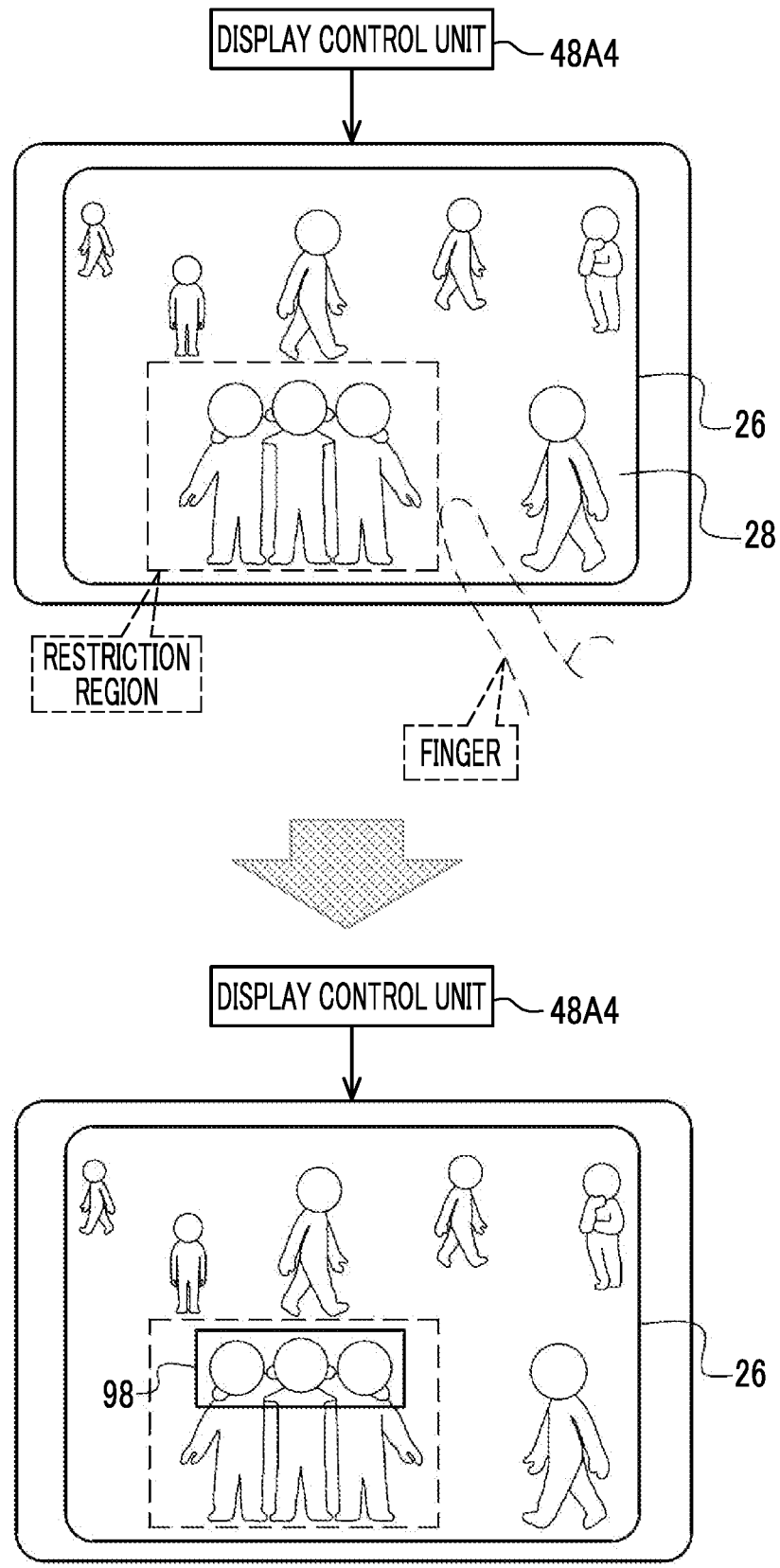
FIG. 51 is a screen transition diagram showing an example of a change of screen contents from designating a restriction region by the user to superimposing the object frame that surrounds the plurality of interest subject regions (plurality of subject regions satisfying the predetermined condition) in the restriction region as one object on the live view image.

For example, as shown in FIG. 51, in a state in which the live view image is displayed on the display 26, the object frame 98 may be created only for the interest subject region included in a restriction region designated in the live view image and displayed on the display 26.

In this case, the display control unit 48A4 displays the plurality of interest subject regions in the aspect that is distinguishable from other image regions in the region (in the example shown in FIG. 51, the "restriction region") determined in accordance with the given instruction in the live view image. In the example shown in FIG. 51, the object frame 98 that surrounds the plurality of interest subject regions (for example, the plurality of face regions satisfying the predetermined condition) in the restriction region determined in accordance with the instruction (in the example shown in FIG. 51, the touch operation by a finger of the user) received by the touch panel 28 as one object is displayed on the display 26 in a state of being superimposed on the live view image.

As described above, in the example shown in FIG. 51, since the plurality of interest subject regions are displayed in the aspect that is distinguishable from other image regions in the restriction region determined in accordance with the given instruction in the live view image, it is possible to intentionally exclude the subject that is not desired to be included in the group of the plurality of specific subjects.

In the embodiment described above, the live view image has been described as an example of the "image" according to the technology of the present disclosure, but the technology of the present disclosure is not limited to this, and an image other than the live view image, such as the postview image or the video for recording, may be used.

In the embodiment described above, a physical camera (hereinafter, also referred to as a "physical camera") is described as the imaging apparatus 10, but the technology of the present disclosure is not limited to this, and a virtual camera that generates virtual viewpoint image data by virtually imaging the subject from a virtual viewpoint based on captured image data obtained by the imaging with a plurality of physical cameras set at different positions may be applied instead of the physical camera. In this case, the individual frame 96 and the object frame 98 need only be displayed in the image indicated by the virtual viewpoint image data, that is, a virtual viewpoint image.

In the embodiment described above, the form example is described in which the non-phase difference pixel divided region 30N and the phase difference pixel divided region 30P are used in combination, but the technology of the present disclosure is not limited to this. For example, an area sensor may be used in which the phase difference image data and the non-phase difference image data are selectively generated and read out instead of the non-phase difference pixel divided region 30N and the phase difference pixel divided region 30P. In this case, on the area sensor, a plurality of photosensitive pixels are two-dimensionally arranged. For the photosensitive pixels included in the area sensor, for example, a pair of independent photodiodes in which the light shielding member is not provided are used. In a case in which the non-phase difference image data is generated and read out, the photoelectric conversion is performed by the entire region of the photosensitive pixels (pair of photodiodes), and in a case in which the phase difference image data is generated and read out (for example, a case in which passive method distance measurement is performed), the photoelectric conversion is performed by at one photodiode of the pair of photodiodes. Here, one photodiode of the pair of photodiodes is a photodiode corresponding to the first phase difference pixel L described in the above embodiment, and the other photodiode of the pair of photodiodes is a photodiode corresponding to the second phase difference pixel R described in the above embodiment. It should be noted that the phase difference image data and the non-phase difference image data may be selectively generated and read out by all the photosensitive pixels included in the area sensor, but the technology of the present disclosure is not limited to this, and the phase difference image data and the non-phase difference image data may be selectively generated and read out by a part of the photosensitive pixels included in the area sensor.

In the embodiment described above, the image plane phase difference pixel is described as the phase difference pixel P, but the technology of the present disclosure is not limited to this. For example, the non-phase difference pixels N may be disposed in place of the phase difference pixels P included in the photoelectric conversion element 30, and a phase difference AF plate including a plurality of phase difference pixels P may be provided in the imaging apparatus body 12 separately from the photoelectric conversion element 30.

In the embodiment described above, an AF method using the distance measurement result based on the phase difference image data, that is, the phase difference AF method is described, but the technology of the present disclosure is not limited to this. For example, the contrast AF method may be adopted instead of the phase difference AF method. In addition, the AF method based on the distance measurement result using the parallax of a pair of images obtained from a stereo camera, or the AF method using a TOF method distance measurement result using a laser beam or the like may be adopted.

In the embodiment described above, the focal plane shutter is described as an example of the mechanical shutter 72, but the technology of the present disclosure is not limited to this, and the technology of the present disclosure is established even in a case in which another type of mechanical shutter, such as a lens shutter, is applied instead of the focal plane shutter.

Figure 52:
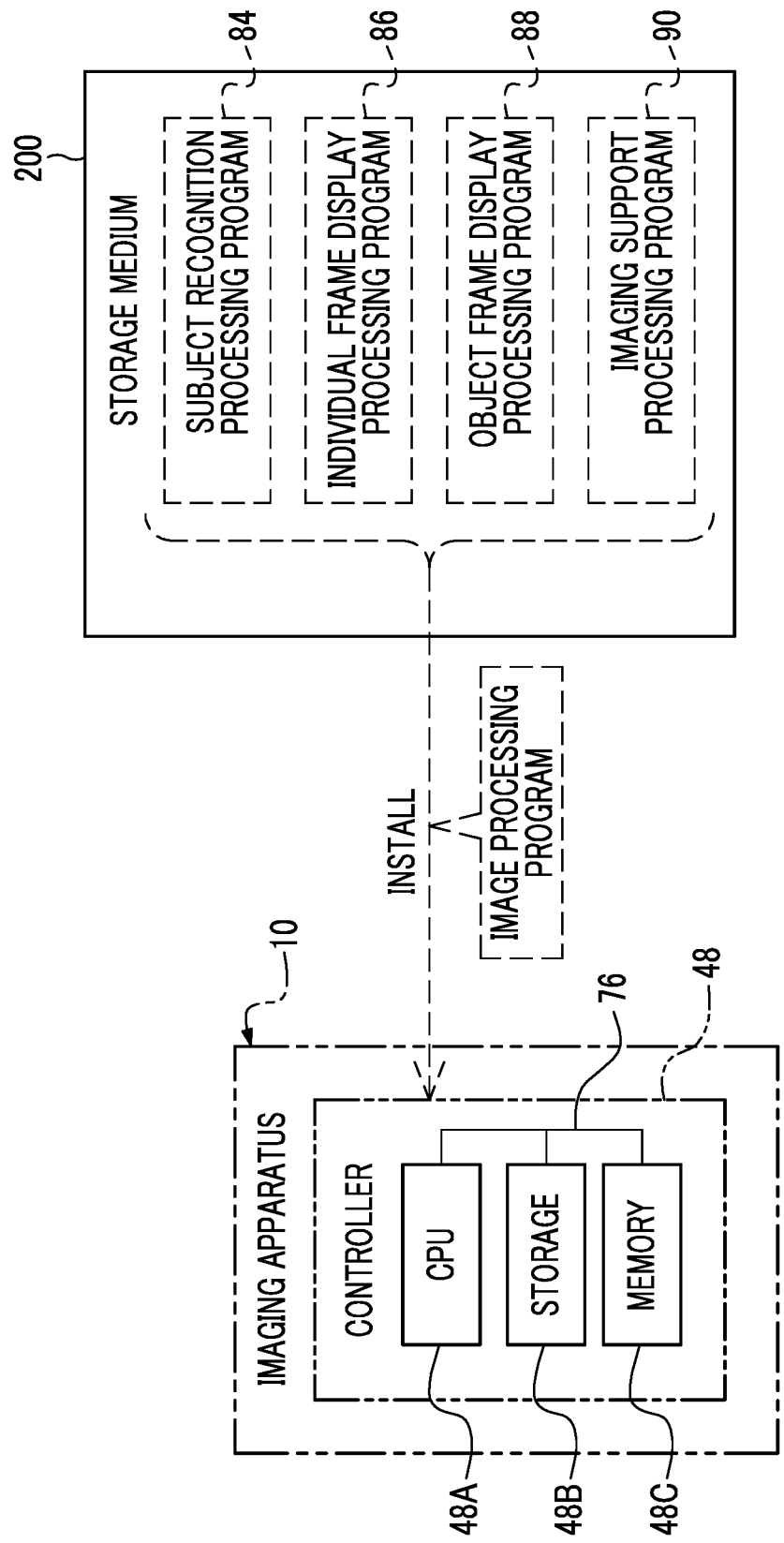
FIG. 52 is a block diagram showing an example of an aspect in which an image processing program is installed in the controller in the imaging apparatus from a storage medium in which the image processing program is stored.

In the embodiment described above, the form example is described in which the image processing program is stored in the storage 48B, but the technology of the present disclosure is not limited to this. For example, as shown in FIG. 52, the image processing program may be stored in a storage medium 200. The storage medium 200 is a non-transitory storage medium. Examples of the storage medium 200 include any portable storage medium, such as an SSD or a USB memory.

The image processing program, which is stored in the storage medium 200, is installed in the controller 48. The CPU 48A executes the image processing in accordance with the image processing program.

In addition, the image processing program may be stored in a storage unit of another computer or server device connected to the controller 48 via a communication network (not shown), and the image processing program may be downloaded in response to a request of the imaging apparatus 10 and installed in the controller 48.

It should be noted that it is not required to store the entire image processing program in the storage unit of another computer or server device connected to the controller 48 or the storage 48B, and a part of the image processing program may be stored.

In the example shown in FIG. 52, the aspect example is described in which the controller 48 is built in the imaging apparatus 10, but the technology of the present disclosure is not limited to this, and for example, the controller 48 may be provided outside the imaging apparatus 10.

In the example shown in FIG. 52, the CPU 48A is a single CPU, but may be a plurality of CPUs. In addition, a GPU may be applied instead of the CPU 48A.

In the example shown in FIG. 52, the controller 48 is described, but the technology of the present disclosure is not limited to this, and a device including an ASIC, an FPGA, and/or a PLD may be applied instead of the controller 48. In addition, a hardware configuration and a software configuration may be used in combination, instead of the controller 48.

As a hardware resource for executing the image processing described in the embodiment, the following various processors can be used. Examples of the processor include a CPU which is a general-purpose processor functioning as the hardware resource for executing the image processing by executing software, that is, a program. In addition, examples of the processor include a dedicated electric circuit which is a processor having a circuit configuration designed to be dedicated for executing specific processing, such as the FPGA, the PLD, or the ASIC. A memory is built in or connected to any processor, and any processor executes the image processing by using the memory.

The hardware resource for executing the image processing may be composed of one of these various processors, or may be composed of a combination (for example, a combination of a plurality of FPGAs or a combination of a CPU and an FPGA) of two or more processors of the same type or different types. In addition, the hardware resource for executing the image processing may be one processor.

As a configuring example of one processor, first, there is a form in which one processor is composed of a combination of one or more CPUs and software and the processor functions as the hardware resource for executing the image processing. Secondly, as represented by SoC, there is a form in which a processor that realizes the functions of the entire system including a plurality of hardware resources for executing the image processing with one IC chip is used. As described above, the image processing is realized by using one or more of the various processors as the hardware resources.

Further, as the hardware structure of these various processors, more specifically, it is possible to use an electric circuit in which circuit elements, such as semiconductor elements, are combined. In addition, the image processing is merely an example. Therefore, it is needless to say that the deletion of an unneeded step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

With respect to the embodiment described above, the following supplementary notes will be further disclosed.

(Supplementary Note 1)

An image processing device comprising a processor, and a memory connected to or built in the processor, in which the processor recognizes a subject included in a subject group based on image data obtained by imaging the subject group with an imaging apparatus, displays an image indicated by the image data on a display, and displays a plurality of subject regions, which are included in the image, correspond to a plurality of subjects included in the subject group, and satisfy a predetermined condition, in the image in an aspect that is capable of being identified as one object based on a result of recognizing the subject.

(Supplementary Note 2)

The image processing device according to Supplementary Note 1, in which the processor displays a grouped image region, which is obtained by grouping the plurality of subject regions satisfying the predetermined condition, in the image in the aspect that is capable of being identified as the one object.

(Supplementary Note 3)

The image processing device according to Supplementary Note 2, in which the processor displays the plurality of subject regions in the image in the aspect that is capable of being identified as the one object by displaying a boundary line indicating a boundary of the grouped image region in the image.

(Supplementary Note 4)

The image processing device according to Supplementary Note 3, in which the boundary line is a contour line indicating an outer contour of the grouped image region.

(Supplementary Note 5)

The image processing device according to Supplementary Note 4, in which the contour line is an object frame which surrounds the plurality of subject regions.

(Supplementary Note 6)

The image processing device according to any one of Supplementary Note 5, in which the processor displays, in the image, a plurality of individual frames, which individually surround at least the plurality of subject regions satisfying the predetermined condition among a plurality of constituent element image regions indicating a plurality of constituent elements constituting the subject group, and the object frame.

(Supplementary Note 7)

The image processing device according to Supplementary Note 6, in which the processor displays the individual frames using a fade-out method and displays the object frame using a fade-in method in the image.

(Supplementary Note 8)

The image processing device according to Supplementary Note 6, in which the processor displays the individual frames using a fade-in method and displays the object frame using a fade-out method in the image.

(Supplementary Note 9)

The image processing device according to any one of Supplementary Notes 1 to 8, in which the processor recognizes the subject included in the subject group based on the image data and a trained model.

(Supplementary Note 10)

The image processing device according to any one of Supplementary Notes 1 to 9, in which the processor displays the plurality of subject regions in an aspect that is distinguishable from other image regions in a region determined in accordance with a given instruction in the image.

(Supplementary Note 11)

An imaging apparatus comprising the image processing device according to any one of Supplementary Notes 1 to 10, and an image sensor that images an imaging region including the subject group.

(Supplementary Note 12)

The imaging apparatus according to Supplementary Note 11, further comprising an imaging optical system that includes a focus lens which is movable in an optical axis direction, in which the processor performs focusing on the plurality of subjects by moving the focus lens in the optical axis direction.

(Supplementary Note 13)

The imaging apparatus according to Supplementary Note 12, in which the processor performs detection of a focus with respect to the plurality of subjects, and performs the focusing based on a detection result of the focus.

(Supplementary Note 14)

The imaging apparatus according to Supplementary Note 12 or 13, in which the processor performs the focusing by moving the focus lens to an intermediate position between a close-side focus position and an infinity-side focus position with respect to the plurality of subjects.

(Supplementary Note 15)

The imaging apparatus according to any one of Supplementary Notes 12 to 14, in which the processor performs the focusing by moving the focus lens to a focus position in which the plurality of subjects are included within a depth of field.

(Supplementary Note 16)

The imaging apparatus according to any one of Supplementary Notes 12 to 15, in which the imaging optical system includes a stop, and the processor operates the stop to include the plurality of subjects within a depth of field.

What is claimed is:

1. An image processing device comprising:
a processor; and
a memory connected to or built in the processor,
wherein the processor
recognizes a subject included in a subject group based on image data obtained by imaging the subject group with an imaging apparatus,
displays an image indicated by the image data on a display, and
displays a plurality of subject regions, which are included in the image, correspond to a plurality of subjects included in the subject group, and satisfy a predetermined condition, in the image in an aspect that is capable of being identified as one object based on a result of recognizing the subject, wherein the predetermined condition is a condition including a gesture common condition that gestures expressed by the plurality of subject regions are common.

2. The image processing device according to claim 1,
wherein the processor displays a grouped image region, which is obtained by grouping the plurality of subject regions satisfying the predetermined condition, in the image in the aspect that is capable of being identified as the one object.

3. The image processing device according to claim 2,
wherein the processor displays the plurality of subject regions in the image in the aspect that is capable of being identified as the one object by displaying a boundary line indicating a boundary of the grouped image region in the image.

4. The image processing device according to claim 3,
wherein the boundary line is a contour line indicating an outer contour of the grouped image region.

5. The image processing device according to claim 4,
wherein the contour line is an object frame which surrounds the plurality of subject regions.

6. The image processing device according to claim 5,
wherein the processor creates the object frame by dynamically changing a size of a frame from an outside or an inside of the outer contour to the outer contour in the image.

7. The image processing device according to claim 5,
wherein the processor
acquires a distance from the imaging apparatus to each of the plurality of subjects, and
changes a display aspect of the object frame in accordance with the distances acquired for the plurality of subjects.

8. The image processing device according to claim 5,
wherein the image is a first video, and
the processor deforms the object frame in a case in which a first interval between a part of the plurality of subject regions and a remaining subject region is equal to or larger than a first predetermined interval in the first video.

9. The image processing device according to claim 8,
wherein the processor deforms the object frame in a form in which the part of the subject regions is separated from the object frame on a condition that a state in which the first interval is equal to or larger than the first predetermined interval is maintained for a time equal to or longer than a predetermined time.

10. The image processing device according to claim 5,
wherein the processor displays, in the image, a plurality of individual frames, which individually surround the plurality of subject regions satisfying at least the predetermined condition among a plurality of constituent element image regions indicating a plurality of constituent elements constituting the subject group, and the object frame.

11. The image processing device according to claim 10,
wherein the processor
acquires characteristics of the plurality of constituent elements, and
changes display aspects of the plurality of individual frames in accordance with the acquired characteristics.

12. The image processing device according to claim 11,
wherein the characteristic includes a characteristic including at least one of the number, a size, a type, or a speed of the constituent elements.

13. The image processing device according to claim 10,
wherein the processor selectively performs parallel display processing of displaying the individual frames and the object frame in parallel in the image and selective display processing of selectively displaying the individual frames and the object frame in the image.

14. The image processing device according to claim 1,
wherein the processor displays the plurality of subject regions in the image in the aspect that is capable of being identified as the one object by displaying an object frame, which surrounds the plurality of subject regions satisfying the predetermined condition, in the image.

15. The image processing device according to claim 1,
wherein the processor displays the plurality of subject regions in the image in the aspect that is capable of being identified as the one object by displaying the plurality of subject regions using a peaking method.

16. The image processing device according to claim 1,
wherein the processor displays the plurality of subject regions in the image in the aspect that is capable of being identified as the one object by displaying the plurality of subject regions using a segmentation method.

17. The image processing device according to claim 1,
wherein the processor
extracts a contour line of at least one specific subject region among the plurality of subject regions, and
displays the extracted contour line on the image.

18. The image processing device according to claim 1,
wherein the processor displays one of a target subject region designated from among the plurality of subject regions and a subject region other than the target subject region in a more enhanced manner than the other.

19. The image processing device according to claim 1,
wherein the predetermined condition is a condition including a focusing condition that focusing is performed on the plurality of subjects.

20. The image processing device according to claim 1,
wherein the predetermined condition is a condition including a subject size condition that a degree of difference in a size between the plurality of subject regions is within a predetermined range.

21. The image processing device according to claim 20,
wherein the subject region is a face region indicating a face, and
the size is a size of a face frame which surrounds the face region.

22. The image processing device according to claim 21,
wherein the predetermined range varies depending on a ratio of the size of the face frame between the plurality of subject regions.

23. The image processing device according to claim 1,
wherein the predetermined condition is a condition including a subject interval condition that a second interval between the plurality of subjects is smaller than a second predetermined interval.

24. The image processing device according to claim 1,
wherein the predetermined condition is a condition including a movement direction same condition that movement directions of the plurality of subject regions are the same.

25. The image processing device according to claim 1,
wherein the processor selects whether or not to include the plurality of subject regions in the one object in accordance with a given instruction.

26. The image processing device according to claim 1, wherein the image is a second video, and
the processor executes specific processing in a case in which the predetermined condition is satisfied in a state in which the second video is displayed on the display.

27. The image processing device according to claim 26, wherein the predetermined condition is a condition including an individual subject region interval condition that a third interval between a first individual subject region indicating a first individual subject in the subject group and a second individual subject region indicating a second individual subject is within a third predetermined interval in the image, and
the processor executes the specific processing in a case in which the individual subject region interval condition is satisfied.

28. The image processing device according to claim 27, wherein the processor displays, in the second video, a first individual frame which surrounds the first individual subject region and a second individual frame which surrounds the second individual subject region, and
in a case in which an area of an overlap region between the first individual frame and the second individual frame is equal to or larger than a predetermined area, the third interval is within the third predetermined interval.

29. An imaging apparatus comprising:
the image processing device according to claim 1; and
an image sensor that images an imaging region including the subject group.

30. The imaging apparatus according to claim 29, further comprising:
an imaging optical system that includes a focus lens which is movable in an optical axis direction,
wherein the processor performs focusing on the plurality of subjects by moving the focus lens in the optical axis direction.

31. The imaging apparatus according to claim 30, wherein the predetermined condition is a condition including a close-side focusing condition that the focusing is performed on a close side with respect to a predetermined depth of field.

32. An image processing method comprising:
recognizing a subject included in a subject group based on image data obtained by imaging the subject group with an imaging apparatus;
displaying an image indicated by the image data on a display; and
displaying a plurality of subject regions, which are included in the image, correspond to a plurality of subjects included in the subject group, and satisfy a predetermined condition, in the image in an aspect that is capable of being identified as one object based on a result of recognizing the subject,
wherein the predetermined condition is a condition including a gesture common condition that gestures expressed by the plurality of subject regions are common.

33. A non-transitory computer-readable storage medium storing a program executable by a computer to perform a process comprising:
recognizing a subject included in a subject group based on image data obtained by imaging the subject group with an imaging apparatus;
displaying an image indicated by the image data on a display; and
displaying a plurality of subject regions, which are included in the image, correspond to a plurality of subjects included in the subject group, and satisfy a predetermined condition, in the image in an aspect that is capable of being identified as one object based on a result of recognizing the subject,
wherein the predetermined condition is a condition including a gesture common condition that gestures expressed by the plurality of subject regions are common.

* * * * *